US008862616B2

(12) United States Patent
Skeen et al.

(10) Patent No.: US 8,862,616 B2
(45) Date of Patent: *Oct. 14, 2014

(54) MULTI-MEDIA MANAGEMENT AND STREAMING TECHNIQUES IMPLEMENTED OVER A COMPUTER NETWORK

(71) Applicant: Opus Deli, Inc., Emeryville, CA (US)

(72) Inventors: Wayne Donald Maddock Skeen, Berkeley, CA (US); Christopher Thomas Ross, Berkeley, CA (US); Howard Gregg Cockrill, Albany, CA (US); Sara Anne Mertz, Oakland, CA (US); Matthew Paul Smith, Berkeley, CA (US)

(73) Assignee: Opus Deli, Inc., Emeryville, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/280,581

(22) Filed: May 17, 2014

(65) Prior Publication Data

US 2014/0258553 A1 Sep. 11, 2014

Related U.S. Application Data

(63) Continuation of application No. 13/517,505, filed on Jun. 13, 2012, now Pat. No. 8,732,193.

(60) Provisional application No. 61/639,870, filed on Apr. 28, 2012, provisional application No. 61/496,452, filed on Jun. 13, 2011.

(51) Int. Cl.

| | |
|---|---|
| ***G06F 17/30*** | (2006.01) |
| ***G06Q 10/00*** | (2012.01) |
| ***G06Q 30/00*** | (2012.01) |
| ***H04L 29/06*** | (2006.01) |

(52) U.S. Cl.

CPC .................................. *H04L 65/4069* (2013.01)
USPC ........... 707/769; 707/736; 707/803; 709/201; 709/231; 715/716; 715/719; 715/727; 705/5; 705/14.23; 705/26.1

(58) Field of Classification Search

CPC .................... G06F 17/30743; G06F 17/30749; G06F 17/30772; G06Q 10/02; G10H 2240/125
USPC ................. 707/736, 769, 803; 709/201, 231; 715/716, 719, 727; 705/5, 14.23, 705/14.38, 14.58, 27.1, 26.1

See application file for complete search history.

(56) References Cited

U.S. PATENT DOCUMENTS 6,925,458 B2 * 8/2005 Scaturro et al. ........................ 1/1
7,693,978 B2 * 4/2010 Eliason et al. ................ 709/223

(Continued)

OTHER PUBLICATIONS

Roger Zimmermann, Elaine Chew, Sakire Arslan, and Moses Pawar (University of Southern California), "Distributed Musincal Performances: Architecture and Stream Management", ACM Transactions on Multimedia Computing, Communications and Applications, vol. 4, No. 2, May 2008, pp. 1-23.*

(Continued)

*Primary Examiner* — Cheryl Lewis

(74) *Attorney, Agent, or Firm* — EcoTech Law Group, P.C.; Dean E. Wolf, Esq.

(57) ABSTRACT

Various aspects described or referenced herein are directed to different methods, systems, and computer program products relating to multi-media management and streaming techniques implemented over a computer network. In one embodiment, a Multi-Media Management and Streaming (MMMS) System may be configured or designed to provide online users with "location based" streaming radio functionality. Users from different geographic locations may access a variety of MMMS System GUIs to access information relating to one or more artists/bands, songs, venues, and/or events such as live music performances. Users may also access a variety of MMMS System GUIs to search for, create, and/or share customized streaming radio stations which may be configured to identify, present information relating to, and/or play/stream music associated with one or more artists/bands, songs, venues, and/or events.

16 Claims, 53 Drawing Sheets

(56) References Cited

U.S. PATENT DOCUMENTS

| | | | | |
|---|---|---|---|---|
| 8,392,206 | B2 * | 3/2013 | Parekh et al. | 705/1.1 |
| 8,732,193 | B2 * | 5/2014 | Skeen et al. | 707/769 |
| 2003/0076963 | A1 * | 4/2003 | Wells | 381/1 |
| 2008/0104627 | A1 * | 5/2008 | Avedissian | 725/25 |
| 2012/0047077 | A1 * | 2/2012 | Humphrey | 705/300 |
| 2012/0330697 | A1 * | 12/2012 | Smith et al. | 705/5 |
| 2014/0032325 | A1 * | 1/2014 | Weiss et al. | 705/14.58 |

OTHER PUBLICATIONS

Yves Raimond, Christopher Sutton, and Mark Sandler, “The Many Faces of Semantics: Interlinking Musinc-Related Data on the Web”, IEEE, 2009, pp. 1-12.*

Alain B. Renaud, Alexander Corot, and Pedro Rebelo, “Networked Music Performance: State of the Art”, AES 30th International Conference, Saariselka, Finland, Mar. 15-17, 2007, pp. 1-7.*

* cited by examiner

1400

2400

2600

2800

3100

3500

3700

3600

4500

4400

4300

7000

7200

7500

7400

7300

Fig. 77
High Sierra Music Festival:
July 5 - 8, 2012
7702
7704
Elephant Revival
Americana, Folk - Nederland, CO, US
Embed
7706
Thu
Jul 05
High Sierra Music Festival
Quincy, CA, US
7708
01:42
03:15
7710
Elephant Revival - Point of You
Steve Poltz - Dreamhouse - Thu Jul 05 at
Ryan Bingham - Sunshine - Thu Jul 05 at
Ben Sollee - Electrified - Thu Jul 05 at High
Stooges Brass Band - Wind It Up - Fri Jul 06
Split Lip Rayfield - Used to Call Me Baby
7720
7700

MULTI-MEDIA MANAGEMENT AND STREAMING TECHNIQUES IMPLEMENTED OVER A COMPUTER NETWORK

RELATED APPLICATION DATA

This application is a continuation application, pursuant to the provisions of 35 U.S.C. §120, of prior U.S. patent application Ser. No. 13/517,505, Published as U.S. Pat. No. 8,732, 193) titled "MULTI-MEDIA MANAGEMENT AND STREAMING TECHNIQUES IMPLEMENTED OVER A COMPUTER NETWORK" naming SKEEN, et. al. as inventors, and filed 13 Jun. 2012, the entirety of which is incorporated herein by reference for all purposes.

U.S. patent application Ser. No. 13/517,505 claims benefit, pursuant to the provisions of 35 U.S.C. §119, of U.S. Provisional Patent Application Ser. No. 61/639,870, titled "MULTI-MEDIA MANAGEMENT AND STREAMING TECHNIQUES IMPLEMENTED OVER A COMPUTER NETWORK", naming SKEEN, et. al. as inventors, and filed 28 Apr. 2012, the entirety of which is incorporated herein by reference for all purposes. U.S. patent application Ser. No. 13/517,505 also claims benefit, pursuant to the provisions of 35 U.S.C. §119, of U.S. Provisional Patent Application Ser. No. 61/496,452, titled "MULTI-MEDIA MANAGEMENT AND STREAMING TECHNIQUES IMPLEMENTED OVER A COMPUTER NETWORK", naming SKEEN, et. al. as inventors, and filed Jun. 13, 2011, the entirety of which is incorporated herein by reference for all purposes.

BACKGROUND

The present disclosure relates to network-based information searching and content delivery. More particularly, the present disclosure relates to multi-media management and streaming techniques implemented over a computer network.

DETAILED DESCRIPTION OF EXAMPLE EMBODIMENTS

Overview

Figure 1:
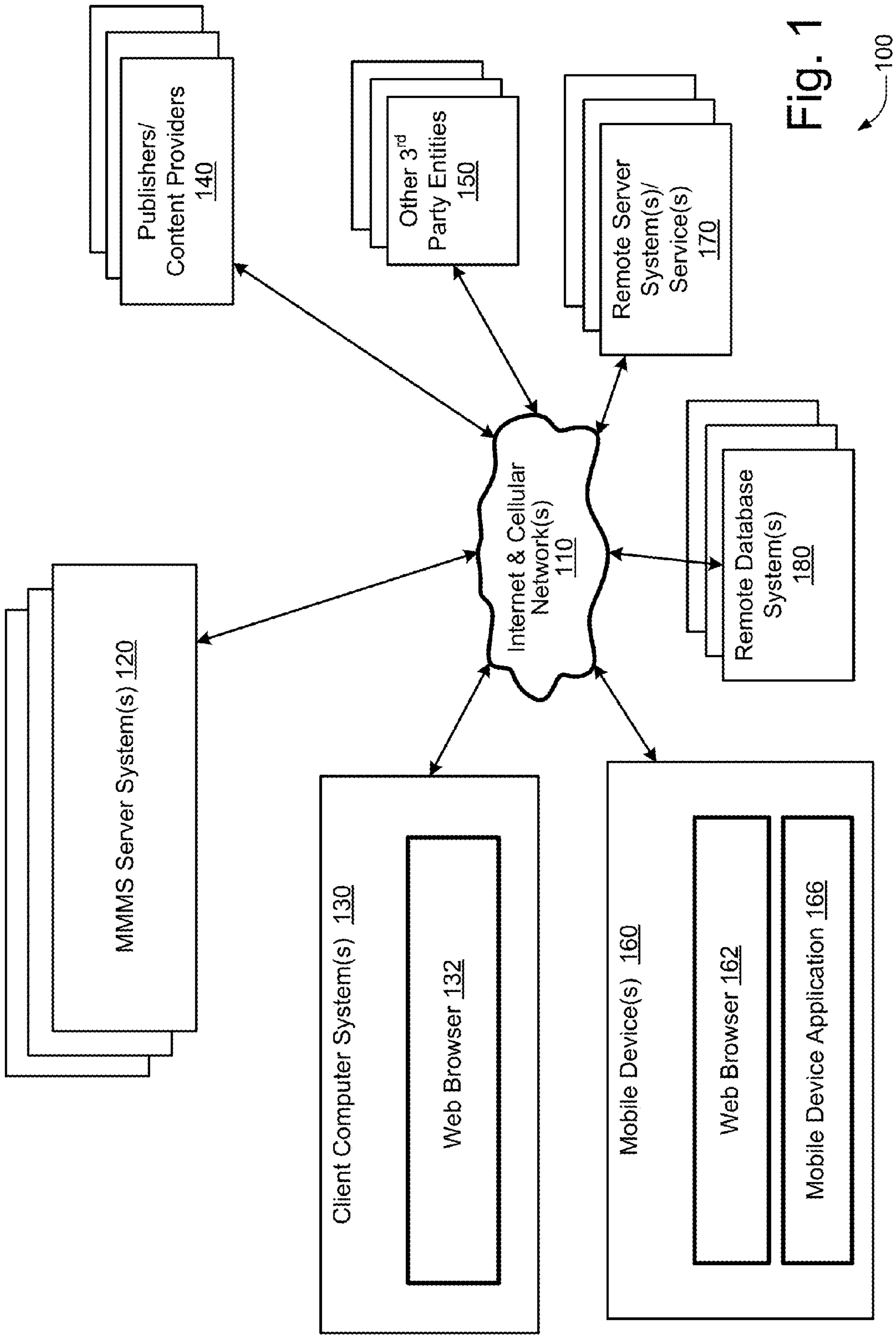
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to multi-media management and streaming techniques implemented over a computer network.

One aspect disclosed herein is directed to different methods, systems, and computer program products for facilitating electronic commerce via a computer network comprising causing at least one processor to execute a plurality of instructions for: determining a first set of filter criteria for use in performing a database search for music-related information matching the first set of filter criteria, the first set of filter criteria including geolocation filter criteria indicating a first geographic location, the first set of filter criteria further including geographic proximity criteria indicating a first geographic proximity parameter; identifying, using the geolocation filter criteria and geographic proximity criteria, a first set of artists or bands ("artists/bands") that are scheduled to perform at least one live performance within a first geographic region, wherein the first geographic region includes the first geographic location and adjacent geographic locations which are within a specified proximity to the first geographic location, as defined by the first geographic proximity parameter; identifying, using the identified first set of artists or bands, a filtered set of songs or tracks ("songs/tracks") which are performed by or recorded by at least one of the artists/bands of the first set of artists/bands; dynamically creating, using the filtered set of songs/tracks, a filtered streaming media playlist, wherein the filtered streaming media playlist includes a first portion of selected songs/tracks from the identified filtered set of songs/tracks; and; generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected songs/tracks associated with the streaming media playlist.

Additional method(s), system(s) and/or computer program product(s) may be further operable to cause at least one processor to execute additional instructions for streaming songs/tracks of the filtered set of songs/tracks to the end user's electronic device.

Additional method(s), system(s) and/or computer program product(s) may be further operable to cause at least one processor to execute additional instructions for automatically and dynamically determining the geolocation filter criteria based on the end user's current geographic location.

Additional method(s), system(s) and/or computer program product(s) may be further operable to cause at least one processor to execute additional instructions for receiving a first set of input from the end user, the first set of input including the geolocation filter criteria specifying the first geographic location.

Additional method(s), system(s) and/or computer program product(s) may be further operable to cause at least one processor to execute additional instructions for receiving a first set of input from the end user, the first set of input including the geolocation filter criteria specifying the first geographic location, the first set of input further including the geographic proximity criteria specifying the first geographic proximity parameter.

Additional method(s), system(s) and/or computer program product(s) may be further operable to cause at least one processor to execute additional instructions for: automatically identifying a current geographic location of the end user's electronic device; using the identified geographic location of the end user's electronic device as the geolocation filter criteria; and; wherein the identifying of the first set of artists/bands includes identifying, using the identified geographic location of the end user's electronic device, the first set of artists or bands ("artists/bands") that are scheduled to perform at least one live music performance within the first geographic region, wherein the first geographic region includes the identified geographic location of the end user's electronic device.

Additional method(s), system(s) and/or computer program product(s) may be further operable to cause at least one processor to execute additional instructions for: automatically identifying a first metropolitan region associated with a current geographic location of the end user's electronic device; and; using the identified first metropolitan region as the geolocation filter criteria; and; wherein the identifying of the first set of artists/bands includes identifying, using the identified first metropolitan region, the first set of artists or bands ("artists/bands") that are scheduled to perform at least one live music performance within the first geographic region, wherein the first geographic region includes the first metropolitan region.

Additional method(s), system(s) and/or computer program product(s) may be further operable to cause at least one processor to execute additional instructions for: receiving a first set of input from the end user, the first set of input identifying a first metropolitan region as the geolocation filter criteria; using the identified first metropolitan region as the geolocation filter criteria; and; wherein the identifying of the first set of artists/bands includes identifying, using the identified first metropolitan region, the first set of artists or bands ("artists/bands") that are scheduled to perform at least one live music performance within the first geographic region, wherein the first geographic region includes the first metropolitan region.

Additional method(s), system(s) and/or computer program product(s) may be further operable to cause at least one processor to execute additional instructions for: receiving a first set of input from the end user, the first set of input including first venue filter criteria identifying a first venue; and; wherein the identifying of the first set of artists/bands includes identifying, using the geolocation filter criteria and the venue filter criteria, the first set of artists/bands that are scheduled to perform at least one live performance at the identified first venue.

Additional method(s), system(s) and/or computer program product(s) may be further operable to cause at least one processor to execute additional instructions for: receiving a first set of input from the end user, the first set of input including first date range filter criteria identifying a first date range; and; wherein the identifying of the first set of artists/bands includes identifying, using the geolocation filter criteria and the date range criteria, the first set of artists/bands that are scheduled to perform at least one live performance within the first geographic region and within the identified first date range.

Additional method(s), system(s) and/or computer program product(s) may be further operable to cause at least one processor to execute additional instructions for: receiving a first set of input from the end user, the first set of input including first date range filter criteria identifying a first date range; automatically identifying a current geographic location of the end user's electronic device; using the identified geographic location of the end user's electronic device as the geolocation filter criteria; and; wherein the identifying of the first set of artists/bands includes identifying, using the geolocation filter criteria and the date range filter criteria, the first set of artists or bands ("artists/bands") that are scheduled to perform at least one live music performance within the first geographic region and within the identified first date range, wherein the first geographic region includes the identified geographic location of the end user's electronic device.

Another aspect disclosed herein is directed to different methods, systems, and computer program products for facilitating electronic commerce via a computer network comprising causing at least one processor to execute a plurality of instructions for: identifying a first streaming media playlist, the first streaming media playlist including a first set of songs or tracks ("songs/tracks"), the first set of songs/tracks including a first music track which is performed by or recorded by a first artist or band ("artist/band"); determining a first artist/band identifier for identifying the first artist/band; dynamically determining user geolocation criteria for identifying a first geographic location of a first end user; determining, using the user geolocation criteria and the first artist/band identifier, if the first artist/band is scheduled to perform at least one live performance within a first geographic region, wherein the first geographic region includes the first geographic location and adjacent geographic locations which are within a first proximity to the first geographic location; if it is determined that the first artist/band is scheduled to perform at least one live performance within the first geographic region, causing event information relating to the at least one live performance to be presented to the first end user via a first end user's device; and; generating, using information relating to the first streaming media playlist, a first set of instructions for causing a streaming media graphical user interface ("Streaming Media GUI") to be displayed at the first end user's device, wherein the first set of instructions include instructions for configuring the Streaming Media GUI to enable an end user to initiate, via interaction with the Streaming Media GUI, a streamed playback of one or more of the first set of songs/tracks associated with the first streaming media playlist.

In some embodiments, the event information may include venue information relating to a first venue associated with a first live performance of the at least one live performance. In some embodiments, the event information may include: first event information including venue information relating to a first venue associated with a first live performance of the at least one live performance; and second event information including venue information relating to a second venue associated with a second live performance of the at least one live performance.

Various aspects described or referenced herein are directed to different methods, systems, and computer program products relating to multi-media management and streaming techniques implemented over a computer network.

One aspect disclosed herein is directed to different methods, systems, and computer program products for facilitating user access to multimedia content via a computer network. A first set of filter criteria may be identified or determined for use in performing a database search for music-related information matching the first set of filter criteria, wherein the first set of filter criteria includes geolocation filter criteria indicating a first geographic location. Using the first set of filter criteria, a database search of at least one database may be performed for music-related information matching the first set of filter criteria. At least one artist or band from the at least one database may be identified which matches the first set of filter criteria, including the geolocation filter criteria. A first set of search results may be generated which includes a first set of music-related information matching the first set of filter criteria, wherein the first set of music-related information includes artist match information relating to a first set of artists or bands which have been identified as matching the first set of filter criteria. Using the first set of search results, a first streaming media station may be dynamically created or generated which comprises the first set of artists or bands. In at least one embodiment, the first streaming media station consists of the first set of artists or bands and songs performed by the first set of artists or bands.

In at least one embodiment, the first set of filter criteria includes search type criteria indicating that a search is to be performed for artists or bands having upcoming shows within a geographic region defined by the geographic filter criteria. In at least one embodiment, various method(s), system(s) and/or computer program product(s) may be operable to: perform, using the first set of filter criteria, a second database search for music-related information matching the first set of filter criteria; identify, using the first set of filter criteria, a second set of artists or bands having upcoming shows within a geographic region defined by the geographic filter criteria; and; dynamically create a streaming media station which is configured or designed to play only songs performed by the second set of artists or bands.

In at least one embodiment, various method(s), system(s) and/or computer program product(s) may be operable to: display, at a first system, a filter criteria graphical user interface (GUI) configured or designed to enable the user to define a first set of filter criteria; wherein the filter criteria GUI includes a geolocation GUI portion for facilitating the user in defining the first geographic location, and wherein the filter criteria GUI includes a geographic proximity GUI portion for facilitating the user in defining a first geographic proximity parameter relating to the first geographic location.

In at least one embodiment, the geolocation filter criteria includes geographic proximity criteria indicating a geographic proximity value, and the geolocation filter criteria defines a geographic region which includes the first geographic location and all nearby regions which are within a specified proximity to the first geographic location, as defined by the first geographic proximity parameter. In at least one embodiment, various method(s), system(s) and/or computer program product(s) may be operable to: perform, using the first set of filter criteria including the first geographic location and the geolocation, the database search for music-related information matching the first set of filter criteria; identify the first set of artists or bands which have been identified as matching the first set of filter criteria, including geolocation filter criteria; and dynamically create, using the first set of search results, the first streaming media station which includes only the first set of identified artists or bands which match the first set of filter criteria, including the geolocation filter criteria.

In at least one embodiment, the first set of filter criteria includes search type criteria indicating that a search is to be performed for artists or bands having an associated hometown within a geographic region defined by the geographic filter criteria. In at least one embodiment, various method(s), system(s) and/or computer program product(s) may be operable to: perform, using the first set of filter criteria, a second database search for music-related information matching the first set of filter criteria; identify, using the first set of filter criteria, a second set of artists or bands having an associated hometown within a geographic region defined by the geographic filter criteria; an dynamically create a streaming media station which is configured or designed to play songs performed by the second set of artists or bands.

In at least one embodiment, the first set of filter criteria includes venue filter criteria indicating at least one venue, and the first set of filter criteria includes search type criteria indicating that a search is to be performed for artists or bands matching the first set of filter criteria which have upcoming shows at one or more specified venue(s). In at least one embodiment, various method(s), system(s) and/or computer program product(s) may be operable to: perform, using the first set of filter criteria, a second database search for music-related information matching the first set of filter criteria; identify, using the first set of filter criteria, a second set of for artists or bands matching the first set of filter criteria which have upcoming shows at the at least one venue; and dynamically create a streaming media station which is configured or designed to play songs performed by the second set of artists or bands.

Additional objects, features and advantages of the various aspects described or referenced herein may become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more of the following (or combinations thereof):

- Upcoming shows;
- Bands/Artists;
- Venue related events;
- Online streaming radio stations;
- Online streaming video stations;
- Etc.

In at least one embodiment, the MMMS System may include functionality for enabling users to selectively filter search results and/or presented content according to a variety of different filtering criteria such as, for example, one or more of the following (or combinations thereof):

- geographic location;
- geographic proximity;
- time/date criteria;
- venue name(s);
- music genre(s);
- video genre(s);
- artist/band name(s)
- user ID;
- geographic location of artist/band origin (e.g., home town);
- geographic location of upcoming shows and/or events;
- geographic proximity of upcoming shows and/or events;
- etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, composers, performers, etc.

FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
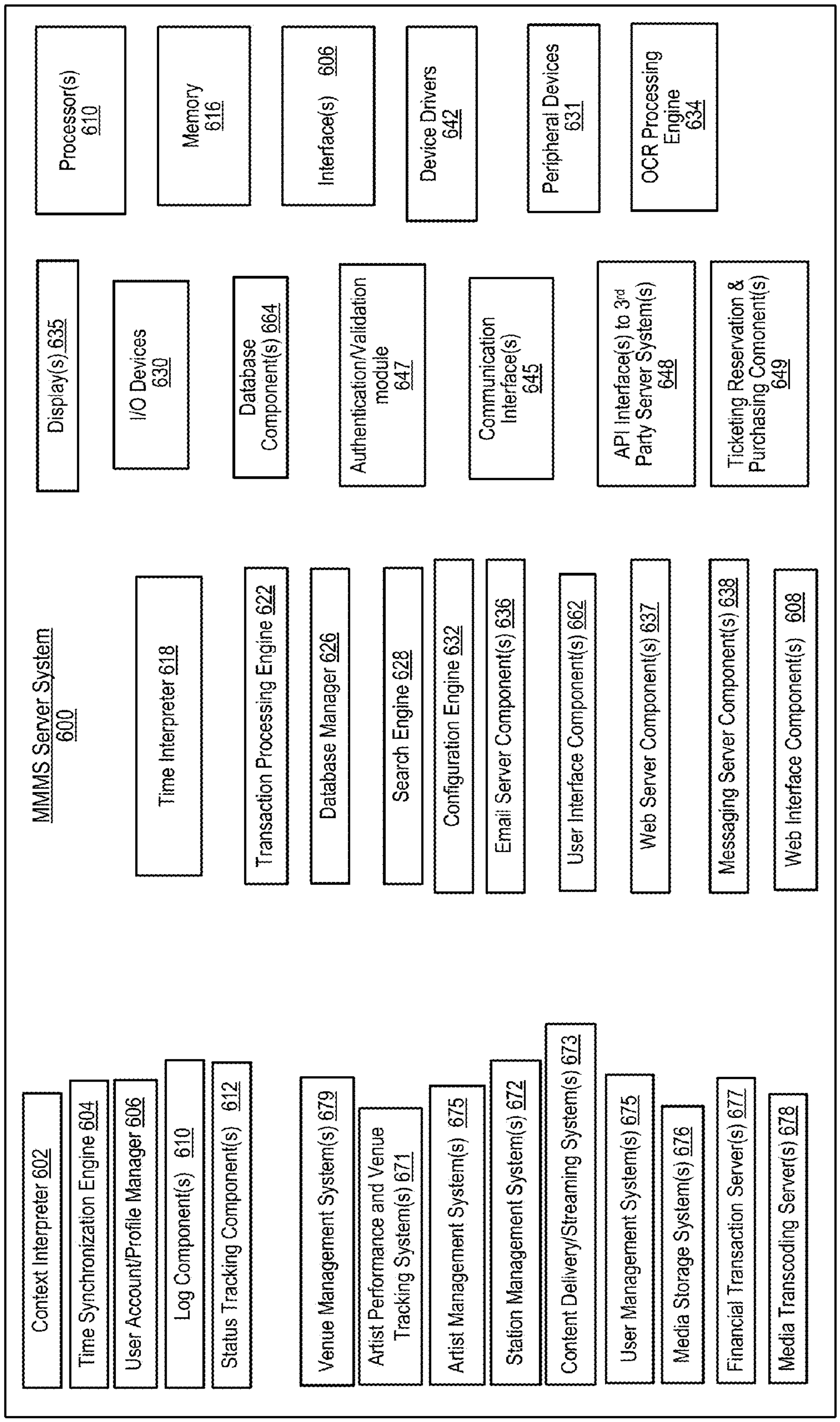
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

- MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).
- Publisher/Content Provider System component(s) 140. In at least one embodiment,
  - one or more devices, components, and/or systems of the MMMS System (100) may be operable to interface with external content sources via an import/export API to load information into the various storage devices and database within the MMMS System (120).
- Client Computer System (s) 130
- 3$^{rd}$ Party System(s)/Service(s) 150
- Internet & Cellular Network(s) 110
- Remote Database System(s) 180
- Remote Server System(s) 170, which, for example, may include, but are not limited to, one or more of the following (or combinations thereof):
  - Content provider servers/services
  - Media Streaming servers/services Database storage/access/query servers/services
Financial transaction servers/services
Payment gateway servers/services
Electronic commerce servers/services
Event management/scheduling servers/services
Etc.

Figure 4:
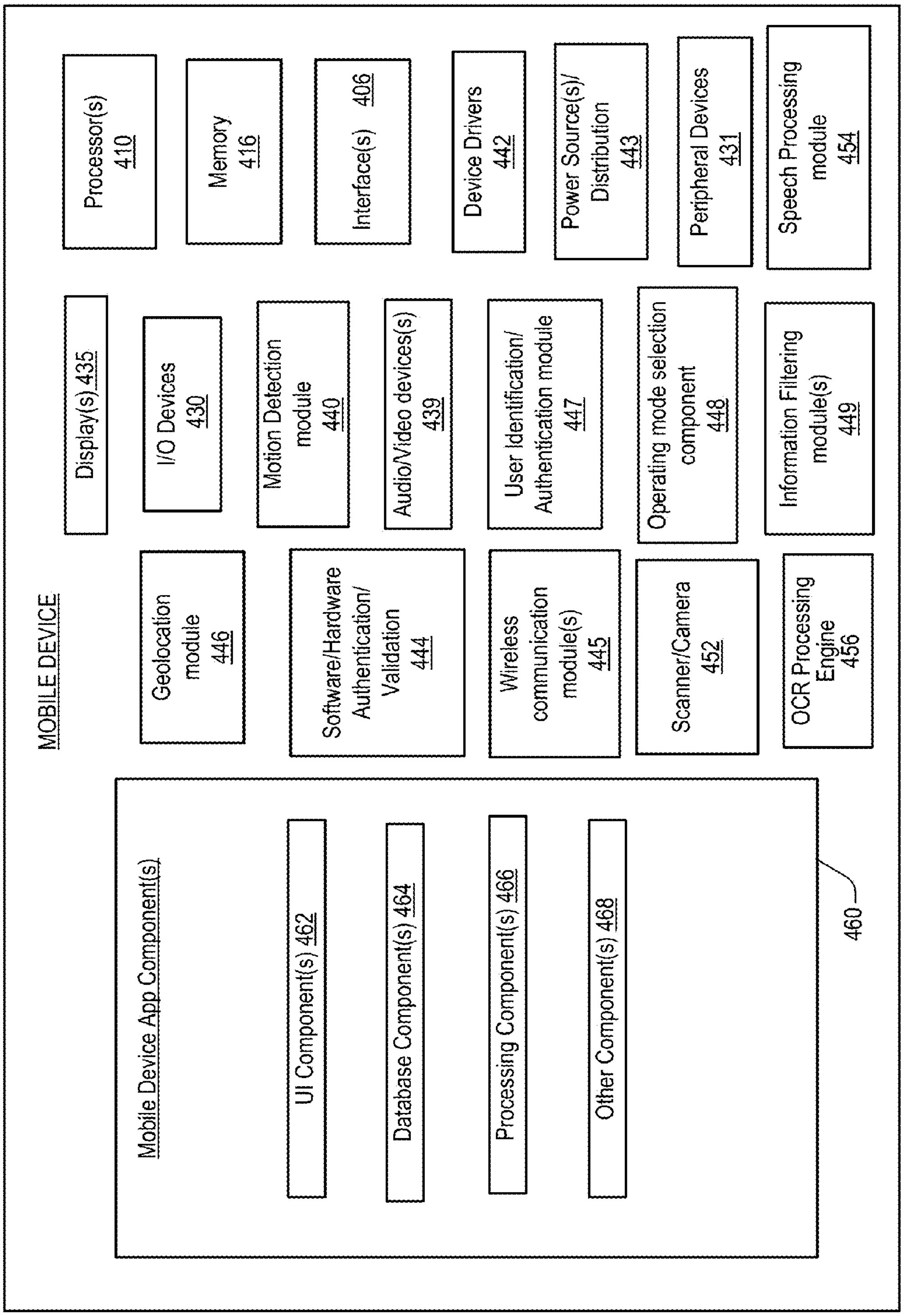
FIG. 4 is a simplified block diagram of an exemplary client system 400 in accordance with a specific embodiment.

Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission.

Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
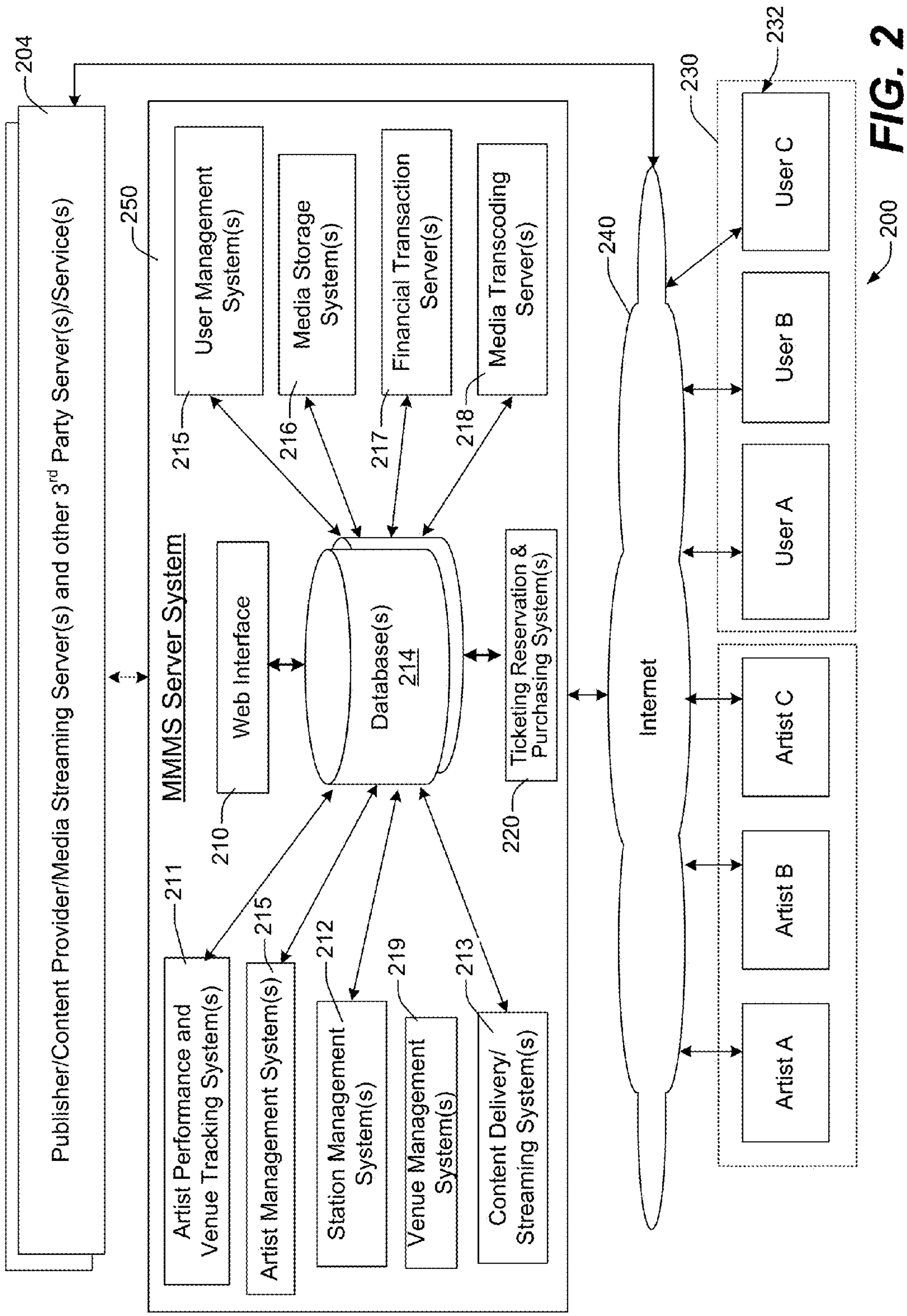
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).

Artist Performance and Venue Tracking System(s) 211, which, for example, may be configured or designed to facilitate, initiate and/or perform one or more of the following operation(s)/action(s) (or combinations thereof):

- Manage database(s) of Event information.
- Information about Events may be stored or cached, include artist(s), date(s) and venue(s), geographic location(s), photographs along with ticketing information, as well as additional fields.
- Venue and Event data may be incorporated from external sources, using external API as available and permitted.
- Accommodate discrepancies between internal and external databases and data.

Artist Management System(s) 215, which, for example, may be configured or designed to facilitate, initiate and/or perform one or more of the following operation(s)/action(s) (or combinations thereof):

- Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.
- Once authenticated, Artists may easily edit their own information, and access statistics and analytics associated with their account from a central dashboard.
- Artists may view the statistics and activities of their Stations, Tracks, Albums, email subscribers, and Radio Play.

Station Management System(s) 212, which, for example, may be configured or designed to facilitate, initiate and/or perform one or more of the following operation(s)/action(s) (or combinations thereof):

- Store and cache 'Stations' of two types: Static and Dynamic.
- Static Stations may include a ranked list of Artists, with no minimum or maximum number.
- Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.
- MMMS may store or cache usage statistics and listenership data for one or more Stations Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.

User Management System(s) 215, which, for example, may be configured or designed to facilitate, initiate and/or perform one or more of the following operation(s)/action(s) (or combinations thereof): Store information and usage statistics for several classes of User, including Visitors, Users, Artists, Venues, and Administrators Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.

Financial Transaction Server(s) 217, which, for example, may be configured or designed to facilitate, initiate and/or perform one or more of the following operation(s)/action(s) (or combinations thereof): Provide servers or services related to the processing of financial transactions, through a variety of methods.

Media Transcoding Server(s) 218, which, for example, may be configured or designed to facilitate, initiate and/or perform one or more of the following operation(s)/action(s) (or combinations thereof): Receive digital audio content from Artists, and performing any operations that are necessary for operation of the MMMS system, and related subsystems.

Venue Management System(s) 219, which, for example, may be configured or designed to facilitate, initiate and/or perform one or more of the following operation(s)/action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.

Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality

In at least one embodiment, MMMS System (also referred to herein as "DeliRadio") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

- Geographic proximity or "radius" filtering criteria (e.g. "within 15 miles of Paris" or "within 50 miles of Chicago");
- Time/Date filtering criteria (e.g. "tonight," "this week," "next 2 weeks," "all dates" or "custom dates" wherein a user specifies a specific date range such as between July $15^{th}$ and August $3^{rd}$);
- "Genre" and/or "Tag" filtering criteria (e.g. folk, folk+rock, folk+rock but not experimental)
- Venue specific filtering criteria (e.g., limit search results to events at The Fillmore (San Francisco) or The Great American Music Hall (San Francisco) or Yoshi's Jazz Club (Oakland)).
- Artist/band specific filtering criteria (e.g., "The Cribs"; "STS9 or Mojomama"; etc.)

In at least one embodiment, when a user enters their filter criteria for a "Shows Near" Geographic Location search, DeliRadio searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, DeliRadio users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July 15$^{th}$ and August 3$^{rd}$). Users may also set "genre" filter criteria (e.g. "folk," or "folk+rock," or "folk+rock but not experimental"). When a user enters their filter criteria for a Venue(s) Station, DeliRadio searches its database (and/or remote database(s)) and automatically and dynamically generates (e.g., in real-time) at least one streaming radio station playing only songs from artists who match the specified filter criteria. For example, using one or more DeliRadio GUIs, a user may initiate a filtered search for "Folk Rock but not Experimental Artists with upcoming live performances at The Fillmore, Great American Music Hall and Café Du Nord between July 15$^{th}$ and August 3$^{rd}$." In response, DeliRadio may search its database (and/or remote database(s)) and automatically and dynamically identify and display (e.g., in real-time) information relating to artists/bands and/or upcoming live performances which match the user specified filter criteria. Additionally, DeliRadio may identify songs of artists/bands which match the user specified filter criteria, and dynamically generate a streaming radio station which includes only songs from the identified artists who match the user specified filter criteria.

Hometown/Neighborhood Stations Functionality

In at least one embodiment, DeliRadio users may create "artist hometown/neighborhood" streaming radio stations which includes only those artists whose hometown or "home-hood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Home-hood Station. DeliRadio searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, DeliRadio users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past;

(2) other artists who are scheduled to perform with the Target Artist(s) in the future;

(3) other artists who have performed at the same venue(s) and/or festival(s) that the Target Artist(s) has performed at in the past; and/or (4) other artists who are scheduled to perform in the future at the same venue(s) and/or festival(s) that the Target Artist(s) has performed at.

Additional "recommendation criteria" may include other filter criteria such as, for example, one or more of the following (or combinations thereof): other artists who have been "starred" by DeliRadio users who have also starred the Target Artist(s); genre and tag cross-matching filter criteria (e.g., specified by the user); play count and popularity within the DeliRadio System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3$^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

- Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.
- Promotional Offers: drink tickets, venue swag, VIP privileges, priority seat reservations, discount coupons, etc.
- Future Show Discounts: Discounts on Ticket purchases for future shows at that venue, or at shows among various venues in a Venue Group.
- Vendor Affiliate Discounts: Discounts at vendors/merchants in the same neighborhood as the venue.
- Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

- Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.
- Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)
- According to different embodiments, a reservation window may close the sooner of (1) x days before the event or (2) X % of Tickets sold. Alternatively, X days after the Reservation is made, but no later than X days before the event.
- Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Functionality for Display of Relevant Gigs on a Per-User Geo-Location Basis

In at least one embodiment, when a DeliRadio station is created, information relating to the station may be displayed or presented to the user via a Pop-Out Player GUI which may include one or more of the following types of content and/or features (or combinations thereof):

- Venue Station: if the station created is venue-specific, then the first concert date displayed for at least one artist in that station matches the concert scheduled to occur at the venue(s) selected in the user's search criteria.
- Geographic proximity: if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.
- Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on DeliRadio may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a DeliRadio Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a DeliRadio Station of rock bands (without indicating a specific location) may include all rock bands on DeliRadio. The map view may initially only display rock bands within a certain radius of the user's IP Address or user's mobile device. The user may then zoom out to see one or more DeliRadio rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example could be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a DeliRadio Station of rock bands with upcoming shows within 100 miles of Amsterdam, Netherlands, when viewed in map view, may display one or more DeliRadio rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a DeliRadio Station playing only those bands at that venue.

Gig Sharing (User-to-User) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other DeliRadio users (e.g., via DeliRadio's DeliRadio Mobile Applications and web applications), and associate a personal message from the sharer with the information shared. This would present an opportunity for the "sharer" and the "sharee(s)" to express their interest in attending the show together, whether by making plans offline or purchasing tickets online, including via the DeliRadio Ticket Reservation Service.

Social Blogging Functionality

By embedding the DeliRadio BloggerTool javascript in the <head> of their HTML pages, website operators may use DeliRadio to provide playable links next to the textual mention of any Artist Name that currently has music available for public streaming on DeliRadio. Clicking on a play link may launch the DeliRadio Pop-Out Player that may either play the single artist that was clicked on, or a DeliRadio Station comprising one or more artists (including the selected artist) with DeliRadio music on that web page. A single web page may include multiple instances of the DeliRadio BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet @ Functionality

In at least one embodiment, if an artist has provided their Twitter handle in their DeliRadio artist profile, then, when a DeliRadio listener is streaming an artist's recording on the DeliRadio Mobile Application, with 1-click the user may send a Twitter message ("tweet") directly at the artist's Twitter handle, with an automatically generated (or personalized) comment and a link to the artist's DeliRadio station. Any Twitter user who "follows" the DeliRadio user sending the tweet, who follows the artist on Twitter or who follows DeliRadio on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any DeliRadio City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog, the DeliRadio user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

- A map showing the specified radius for the station;
- The station's venue and/or artist search results overlaid on that map, with associated playable links;
- The station's search results of artists and concerts presented in list form;
- Artist profiles of at least one artist in the search results;
- A DeliRadio embedded player which plays the search results for that station;
- A customized "outgoing" twitter feed of one or more tweets from the blog's owner;
- A customized "incoming" twitter feed representing a real time search of one or more tweets by twitter users who include in their tweet a hashtag for the blog (e.g. #drfm_oakland). In at least one embodiment, the Blog's owner could "re-tweet" (e.g., from the owner's official Blog handle) any tweets containing the hashtag, thus creating a method for Twitter users to tweet comments and a method for the Blog owner to officially recognize those comments by retweeting them;
- A "PLAY" button for the outgoing Twitter feed that uses technology to "scrape" any DeliRadio station links, allowing at least one tweet to be played as a DeliRadio Station, or one or more tweets in the feed to be played as a separate station;
- A "PLAY" button for the incoming Twitter feed that uses technology to scrape any DeliRadio station links, allowing at least one tweet to be played as a DeliRadio Station, or one or more tweets in the feed to be played as a separate station;

Editorial content related to the artists and venues currently displayed, either linked in from outside websites or created within the Blog itself by the Blog owner;

Etc.

Track-Level Control Slider Functionality

In at least one embodiment, when an artist uploads audio recordings to DeliRadio, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the DeliRadio System). Examples of such access and/or usage control attributes may include, but are not limited to, one or more of the following (or combinations thereof):

For Sale Only: Tracks marked as "for sale only" are not streamable anywhere on DeliRadio, but downloads may be purchased on the artist's DeliRadio profile page by listeners.

Profile Only: Tracks marked as "profile only" are streamable only on the artist's DeliRadio profile page via the Pop-Out Player (which may also be embedded elsewhere on the internet), but these tracks may not be included in the pool of tracks available for stations created by DeliRadio users and stations automatically generated by DeliRadio.

Radio Enabled: Tracks marked as "radio enabled" may be streamable on the artist's DeliRadio profile page via the Pop-Out Player, and may also be included in the pool of tracks available for stations created by DeliRadio users and automatically generated by DeliRadio.

Radio Preferred: Same as Radio Enabled, but "Radio Preferred" tracks may be played first when this artist appears in a DeliRadio station.

Free Download: This checkbox may be applied to any track, and may allow the free, promotional download of the marked track. Free downloads are only available on the artist's DeliRadio profile page.

Functionality for Targeted Promotion of Stations on the Dr Website, Based on User Location In at least one embodiment, the DeliRadio homepage may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be "tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP Address or user's mobile device, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, the DeliRadio System may determine a first user's geolocation as being Paris, France, and in response, the DeliRadio System may display to the user only promotional mosaic tiles associated with the geographic region(s) in and around Paris. In contrast, the DeliRadio System may determine a second user's geolocation as being San Francisco, Calif., and may display to the second user only promotional mosaic tiles associated with the geographic region(s) in and around San Francisco, Calif.

Share a Gig Functionality

Compatible with the conventional ways to share content between users and among existing social networks (e.g., Facebook, Twitter, etc.), a DeliRadio user may select a particular show or event from an artist's upcoming tour calendar, and share that show/event via the DeliRadio mobile and web apps. This would mark a user's interest in that particular show, which may be visible to other users of the DeliRadio System, and may present an opportunity to other DeliRadio users to express their interest in the identified show/event.

Venue Check-in Functionality

In at least one embodiment, mobile device users may use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list;

Vote for upcoming shows (e.g., at that venue);

Access current band's info, twitter, Facebook, merchandise and email list signups;

Incentives for discounted drinks and/or merchandise;

receive information or notification about friends or other DeliRadio users who will be attending one or more show(s) at the venue and/or who have already check-in at the venue for the current show;

Send photos to band and/or DeliRadio Band/Artist webpage or blog;

Integrate with additional "check-in" services;

Earn points for social activity which may be later redeemed by the user for promotional rewards, incentives, etc.

Embedded Players and Extended Functionality

In at least one embodiment, the DeliRadio System technology disclosed herein provides capability for any DeliRadio Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a DeliRadio Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of DeliRadio and/or which may include bands which are not currently in the DeliRadio database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script> tag) that creates a button on an external web page that immediately triggers a pop-up window containing just the DeliRadio player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

EXAMPLES

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) A DeliRadio Station comprised of songs by indie rock bands (or any other genre) that are playing shows within 10 miles San Francisco this Saturday night.

- While the collection of songs is being streamed to the user's computer or mobile device, a photo slide-show of the current Artist is simultaneously streamed and rotated on the listeners browser or mobile device.
- Date and location of upcoming show nearby is displayed next to current Artist and track information.
- In many urban areas, fans have the opportunity to see dozens of shows on any given night. By creating this station, they may be able to hear a selection of songs relating only to those Artists who have been identified as playing upcoming shows within 10 miles San Francisco within the specified time period.
- Stations may be shared with friends on Facebook, twitter or any other social media sites, instantly.

(2) A DeliRadio Station comprised of bands from a high school, college, hometown, or any other geographical grouping.

- In at least one embodiment, the MMMS System may include functionality for enabling the user to post a link to a selected DeliRadio Station on Facebook or social networks. From there, one or more the user's friends may view the post/link, and may instantly listen to the DeliRadio Station by clicking on the link (for example). In at least one embodiment, the user's social networking friends and/or other DeliRadio users may be able to chat with the user (or with others) via a chat GUI which may be incorporated into the associated DeliRadio Station web page. According to different embodiments, DeliRadio Station chat functionality may be selectively enabled and/or disabled by the creator/owner of that DeliRadio Station.

(3) A DeliRadio Station comprised of choir music from choirs based in and around Oakland, Calif.

- Very many choir groups exist nationwide, and most of them make recordings which are difficult to promote and share publically.
- A DeliRadio 'Oakland Choir Radio' Station may be dynamically created by the MMMS System and could be made to be publically accessible a variety of different groups such as, for example, one or more of the following (or combinations thereof): users/members of the MMMS System; social network friends and family; anyone who is able to obtain the URL to the DeliRadio Oakland Choir Radio Station (e.g., by doing a Google search, for example).

(4) A DeliRadio Station comprised of California high school bands that rank in the top 100 "most popular", "most listened to", etc.

- Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) A DeliRadio Station of US serviceman rock bands (stationed anywhere in the world.)

- Could be active members only, or active and retired.
- Could be genre agnostic; for instance, it could be rap-specific, reggae, etc
- Example DeliRadio Station: One or more 'Southern Rock' groups, currently stationed in Iraq.

(6) A DeliRadio Station comprised of bands made up of workers at Safeway supermarkets

- Once a DeliRadio Safeway Station was created, bands that want to be included in this station may send requests to the station owner asking to be added.
- Stations may be earmarked as "closed" or "open" to non-owner manipulation of content.
- Corporations could find this a healthy morale building enterprise, and could even promote it actively as such.

(7) A DeliRadio Station comprised of bands playing upcoming shows at a SPECIFIC VENUE.

- A lot of music fans have a favorite venue(s).
- The songs and artists associated with the Station may be automatically, dynamically and/or periodically updated so that it may be kept current with the upcoming events, shows, artists, song popularity, etc.
- Venues could post links to their DeliRadio Station on their web sites, and send links to their DeliRadio Station out to recipients on the venue mailing list.
- In at least one embodiment, the content streamed by the DeliRadio Venue Station may automatically and periodically be updated (e.g., "Always Be Current"). In one embodiment, the Station owner (e.g., which may be the venue's agent) may manually update DeliRadio's database of upcoming shows and events that particular venue. In other embodiments, the MMMS System may automatically and periodically access updated venue-specific event/date/artist information from one or more remote databases and APIs such as, for example, those provided by, Songkick, Last FM, etc.

One significant advantage/benefit of the customized DeliRadio Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific DeliRadio Station in the home page (or other web pages) of the venue's website.

Another significant advantage/benefit customized DeliRadio Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the DeliRadio System. In at least one embodiment, the DeliRadio System may include functionality for automatically monitoring newly uploaded content, and cross checking the identified content with other resources in order to automatically link selected portions of the newly uploaded content with selected DeliRadio Stations.

In at least one embodiment, the MMMS System may be configured or designed to automatically identify various types of criteria (e.g., song, artist, album, video, venue, user location, artist location, etc.) relating to content being displayed to a user as the user accesses the DeliRadio website and/or DeliRadio Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, MySQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):

- artist profile criteria, including, but not limited to artist rating, artist feedback, etc.;
- artist location information;
- music genre information;
- venue information;
- artist event performance information and related venue information;
- ticketing information;
- geographical information relating to artists, events, venues, users, etc.
- calendar information relating to artist performances, venue events, etc.
- negative filter criteria;
- music streaming services;
- Artist criteria;
- Similarity to other artists
- Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):

- Monitor user behaviors and activities;
- Identify brand-related information associated with user-accessible content that the user is accessing; has requested access to; and/or has interest in;
- Identify songs and/or artists based on specified criteria;
- Manage and track revenue sharing;
- Manage reporting;
- Transact online ordering and purchasing;
- Transact Database queries/responses
- Acquire and manage artist-related music content and other artist-related information;
- Manage artist subscription services;
- Create user customized music streaming stations, e.g., based on user-specified filter criteria;
- Acquire and manage artist performance event and related venue information;
- Provide query disambiguation;
- Provide input correction/suggestion functionality such as, for example, normalization of brand name, brand identity and/or other searchable criteria amongst misspelled and/or other spelling variations;
- Facilitate artist profile management and user subscriptions;
- Manage and track songs and/or other media content which has been streamed to user(s);
- Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):

- Detection of user interest in particular artist, brand, genre, geographic location and/or other criteria
- Identification of user;
- Identification of music content matching specified criteria;
- Detection of user input;
- Identification of artist performance event(s) matching specified criteria;
- Detection of artist input;
- Identification of artist performance event(s);
- Identification of user's geographic location;
- Determination of revenue sharing distributions;
- Receiving database query communication from external server;
- Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):

- Brand-related information;
- User behavior and analytic information;
- Performance information;
- Artist information;
- Venue Information;
- Artist performance event information;
- Geographic location information (e.g., relating to artist performances, events, user location, artist origination, venues, etc.)
- Brand related taxonomy information;
- Artist subscription information;
- Ecommerce related transaction information;
- Publisher/Content Provider information;
- User profile information;
- Artist profile information;
- Music inventory information;
- Artist-brand association information;
- etc.

It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
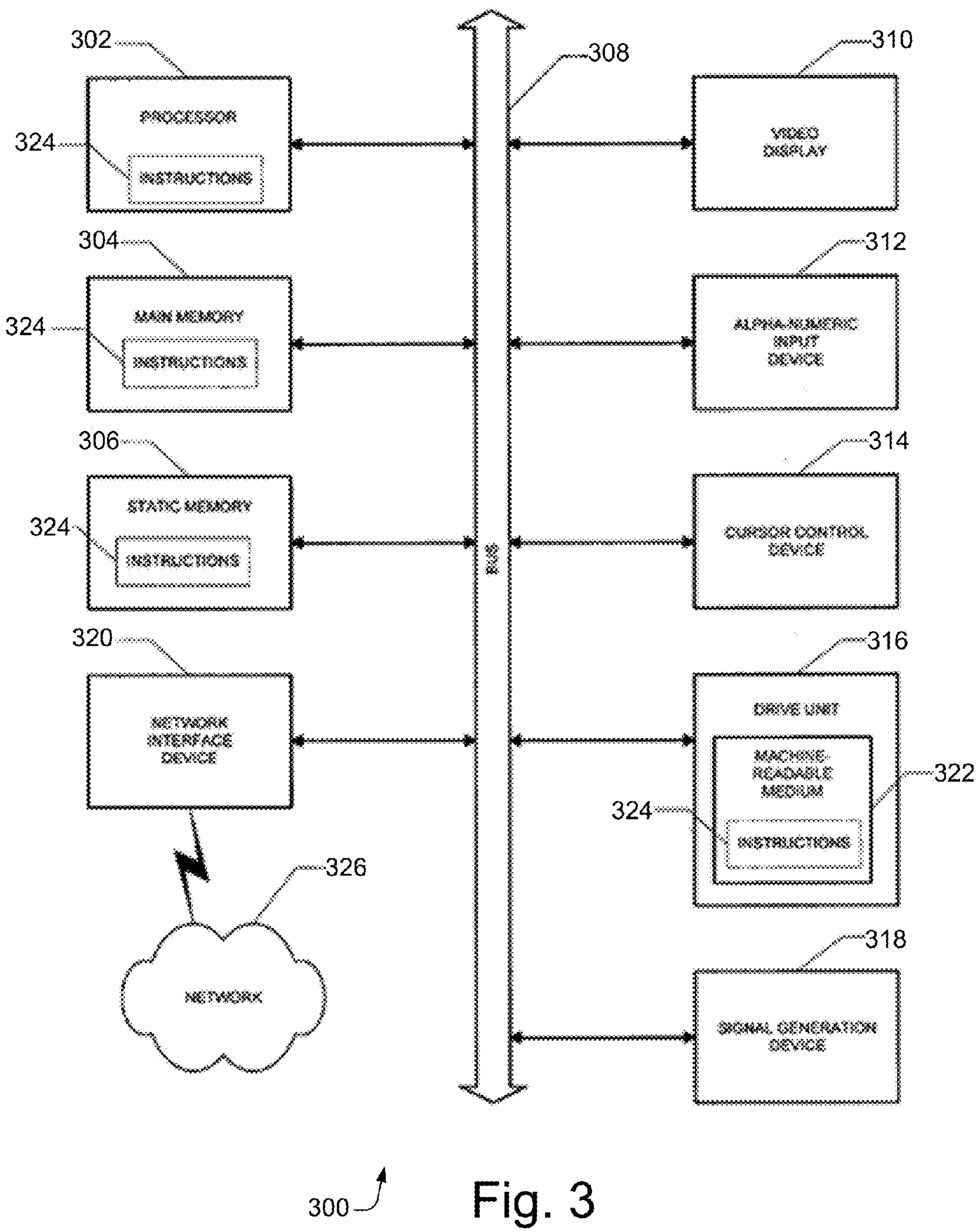
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

- Processor(s) 410
- Device Drivers 442
- Memory 416
- Interface(s) 406
- Power Source(s)/Distribution 443
- Geolocation module 446
- Display(s) 435
- I/O Devices 430
- Audio/Video devices(s) 439
- Peripheral Devices 431
- Motion Detection module 440
- User Identification/Authentication module 447
- Client App Component(s) 460
- Other Component(s) 468
- UI Component(s) 462
- Database Component(s) 464
- Processing Component(s) 466
- Software/Hardware Authentication/Validation 444
- Wireless communication module(s) 445
- Information Filtering module(s) 449
- Operating mode selection component 448
- Speech Processing module 454
- Scanner/Camera 452
- OCR Processing Engine 456
- etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

- UI Components 462 such as those illustrated, described, and/or referenced herein.
- Database Components 464 such as those illustrated, described, and/or referenced herein.
- Processing Components 466 such as those illustrated, described, and/or referenced herein.
- Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

- At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
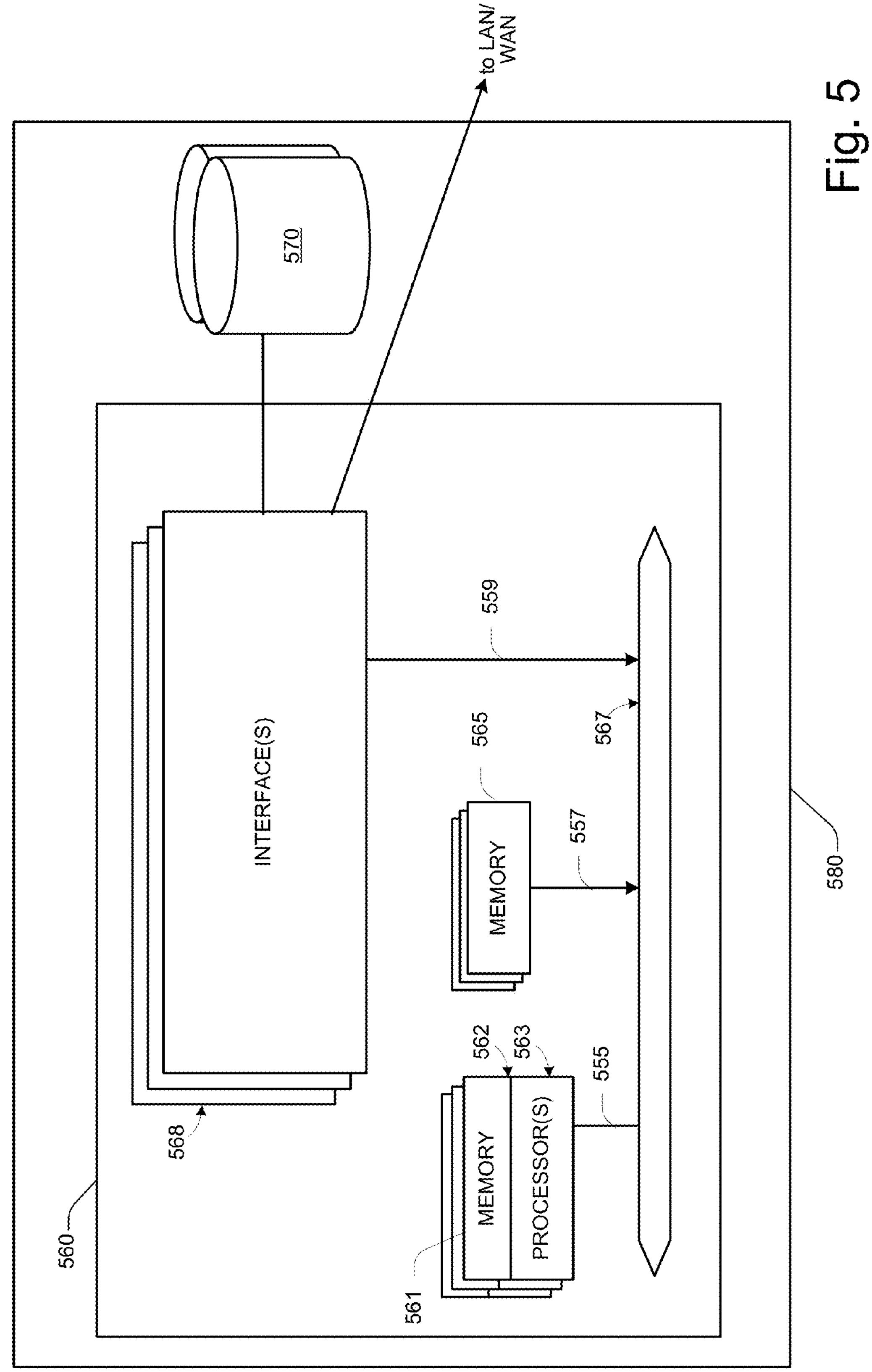
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):

- Artist Performance and Venue Tracking System(s) 671
- Artist Management System(s) 675
- Station Management System(s) 672
- Content Delivery/Streaming System(s) 673
- Venue Management System(s) 679
- User Management System(s) 675
- Media Storage System(s) 676
- Financial Transaction Server(s) 677
- Media Transcoding Server(s) 678
- Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
    - location-based criteria (e.g., geolocation of client device, geolocation of agent device, etc.)
    - time-based criteria
    - identity of user
    - identity of artist
    - user profile information
    - transaction history information
    - recent user activities
    - etc.
- Time Synchronization Engine (e.g., 604) which, for example, may be operable to manages universal time synchronization (e.g., via NTP and/or GPS)
- Search Engine (e.g., 628) which, for example, may be operable to search for transactions, logs, items, accounts, options in the TIS databases
- Configuration Engine (e.g., 632) which, for example, may be operable to determine and handle configuration of various customized configuration parameters for one or more devices, component(s), system(s), process(es), etc.
- Time Interpreter (e.g., 618) which, for example, may be operable to automatically and/or dynamically modify or change identifier activation and expiration time(s) based on various criteria such as, for example, time, location, transaction status, etc.
- Authentication/Validation Component(s) (e.g., 647) (password, software/hardware info, SSL certificates) which, for example, may be operable to perform various types of authentication/validation tasks such as, for example, one or more of the following (or combinations thereof):
    - verifying/authenticating devices,
    - verifying passwords, passcodes, SSL certificates, biometric identification information, and/or other types of security-related information
    - verify/validate activation and/or expiration times
    - etc.
- Transaction Processing Engine (e.g., 622) which, for example, may be operable to handle various types of transaction processing tasks such as, for example, one or more of the following (or combinations thereof):
    - identifying/determining transaction type
    - determining which payment gateway(s) to use
    - associating databases information to identifiers
    - etc.
- OCR Processing Engine (e.g., 634) which, for example, may be operable to perform image processing and optical character recognition of images such as those captured by a mobile device camera, for example.
- Database Manager (e.g., 626) which, for example, may be operable to handle various types of tasks relating to database updating, database management, database access, etc. In at least one embodiment, the Database Manager may be operable to manage databases, MMMS Device Application databases, etc.
- Log Component(s) (e.g., 610) which, for example, may be operable to generate and manage transactions history logs, system errors, connections from APIs, etc.
- Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 614) which, for example, may be operable to facilitate and manage communications and transactions with external Payment Gateways.

Web Interface Component(s) (e.g., 608) which, for example, may be operable to facilitate and manage communications and transactions with TIS web portal(s).

API Interface(s) to MMMS Server System(s) (e.g., 646) which, for example, may be operable to facilitate and manage communications and transactions with API Interface(s) to MMMS Server System(s)

API Interface(s) to 3rd Party Server System(s) (e.g., 648) which, for example, may be operable to facilitate and manage communications and transactions with API Interface(s) to 3rd Party Server System(s)

Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.

OCR Processing Engine (e.g., 634) which, for example, may be operable to perform image processing and optical character recognition of images such as those captured by a mobile device camera, for example.

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Etc.

Figure 7:
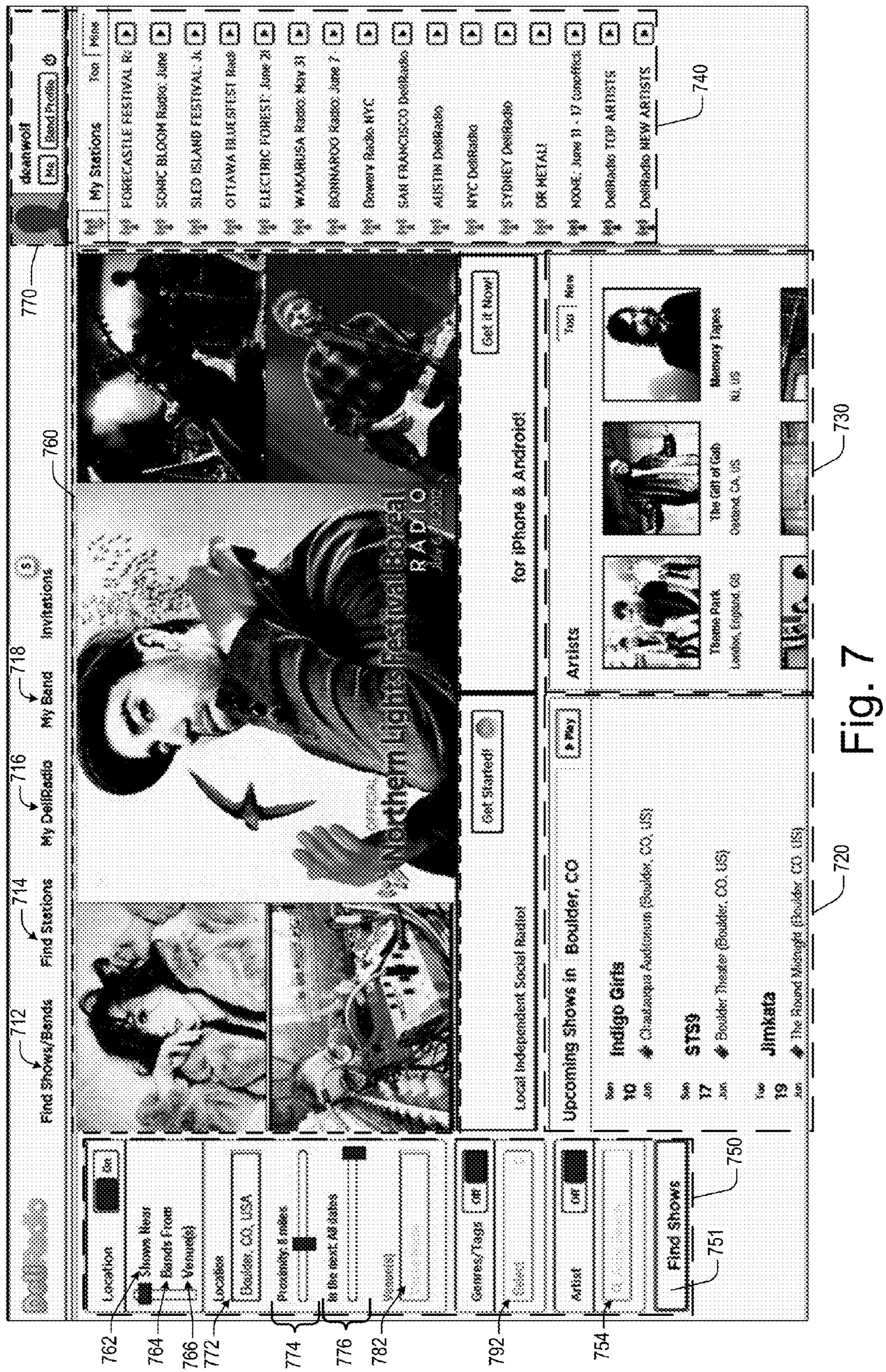
FIGS. 7-77 illustrate example screenshots of various graphical user interfaces (GUIs) which may be used to facilitate, initiate and/or perform various operation(s) and/or action(s) relating to one or more of the MMMS aspects disclosed or referenced herein.
Figure 77:

FIGS. 7-77 illustrate example screenshots of various graphical user interfaces (GUIs) which may be used to facilitate, initiate and/or perform various operation(s) and/or action(s) relating to one or more of the MMMS aspects disclosed or referenced herein. In at least one embodiment, at least a portion of the GUIs may be configured or designed for use at one or more client computer systems and/or mobile devices. In at least one embodiment described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). In at least one embodiment, at least a portion of the GUIs may be configured or designed for use at one or more mobile devices.

FIG. 7 shows an example screenshot of a DeliRadio Home Page GUI 700 in accordance with a specific embodiment. In the specific example embodiment of FIG. 7, it is assumed that a user from Boulder, Colo., has access the home page of the DeliRadio System.

As illustrated in the example embodiment of FIG. 7, the DeliRadio Home Page GUI may include a variety of content, GUI features, promotions, advertising, search and filtering capabilities, etc., and may also provide the user with access to a variety of other content, functionality, and/or services. As illustrated in the example embodiment of FIG. 7 this may include, but is not limited to, one or more of the following (or combinations thereof):

- Relevant Artist/Event Highlights GUI 760 comprising user-targeted promotional content which, for example, may be automatically and dynamically generated based on the user's geolocation (e.g., Boulder, Colo.) and/or other user-based criteria;
- Upcoming Shows GUI 720, comprising event/show/concert content which, for example, may be automatically and dynamically generated based on the user's geolocation (e.g., Boulder, Colo.) and/or other user-based criteria;
- Artists GUI 730, comprising artist-related content which, for example, may be automatically and dynamically generated based on user-based criteria and/or other criteria (e.g., new artists, popular artists, popular albums, recommended artists, etc.);
- User Profile GUI 770, comprising information and links for allowing the user to access and/or configure one or more of the following (or combinations thereof): user preferences, user account information, user profile information, user-related social network accounts, login, permission information, user band/artist profile information (e.g., if user is associated with, or as a member of a band/artist), etc.;
- Streaming Media Station GUI 740, comprising content and links for allowing the user to discover, search, access, and/or play one or more MMMS streaming media stations (e.g., one or more streaming DeliRadio Stations) such as one or more of those described and/or referenced herein.
- Tabs and Links for enabling the user to access additional GUIs, functions/features, content, and information relating to one or more of the following (or combinations thereof): Find Shows/Bands (712); Find Stations (714); My DeliRadio (716); My Band (718); etc.
- Search Filter GUI 750, which, for example, may include GUI features and/or functionality for enabling a user to initiate and display search results relating to shows, bands, stations, and/or venues which match the user's specified search/filter criteria. According to different embodiments, the user's specified search/filter criteria may include, but are not limited to, one or more of the following (or combinations thereof):
    - Show Near criteria (762);
    - Bands From criteria (764);
    - Geographic Location criteria (772);
    - Geographic proximity or "radius" filtering criteria (774) (e.g., which may be a value selected by the user from a range of ¼ mile to 3000+ miles);
    - Time/Date filtering criteria (776) (e.g. "tonight," "this week," "next 2 weeks," "all dates" or "custom dates");
    - "Genre" and/or "Tag" filtering criteria (792) (e.g. folk, folk+rock, folk+rock but not experimental)
    - Venue specific filtering criteria (782);
    - Artist/band specific filtering criteria (754);
    - Etc.

Users from different geographic locations may access a variety of MMMS System GUIs to search for, create, and/or share customized streaming radio stations which may be configured to identify and play/stream music associated with one or more of the following (or combinations thereof): upcoming shows; bands/artists; venue related events; online streaming media stations; etc.

In at least one embodiment, the MMMS System and related GUIs may include features and/or functionality for enabling users to selectively filter search results and/or presented content according to a variety of different filtering criteria such as, for example, one or more of the following (or combinations thereof): geographic location; geographic proximity; time/date criteria; venue name(s); music genre(s); video genre(s); artist/band name(s) user ID; geographic location of artist/band origin (e.g., home town); geographic location of upcoming shows and/or events; geographic proximity of upcoming shows and/or events; etc.

In at least one embodiment, the DeliRadio Home Page GUI may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be automatically (and/or manually)"tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP address, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, in the specific example embodiment of FIG. 7, the DeliRadio System may determine the user's geolocation as being Boulder, Colo. In response, the DeliRadio System may automatically and dynamically generate and display to the user (in real-time) only promotional mosaic tiles associated with the geographic region(s) in and around Boulder, Colo.

Figure 8B:
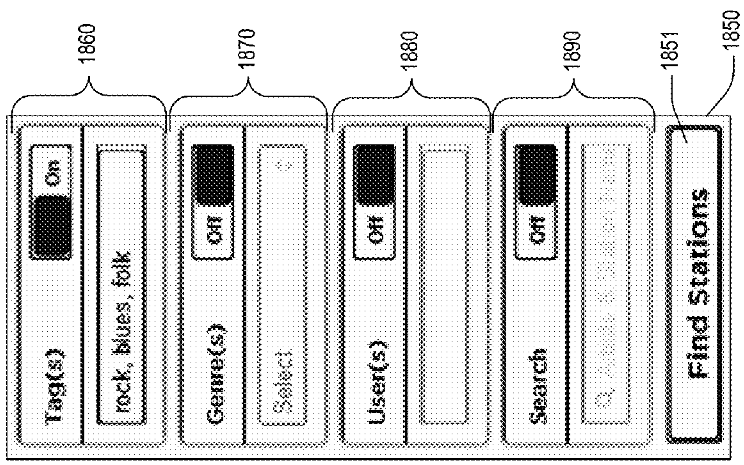
Figure 8A:
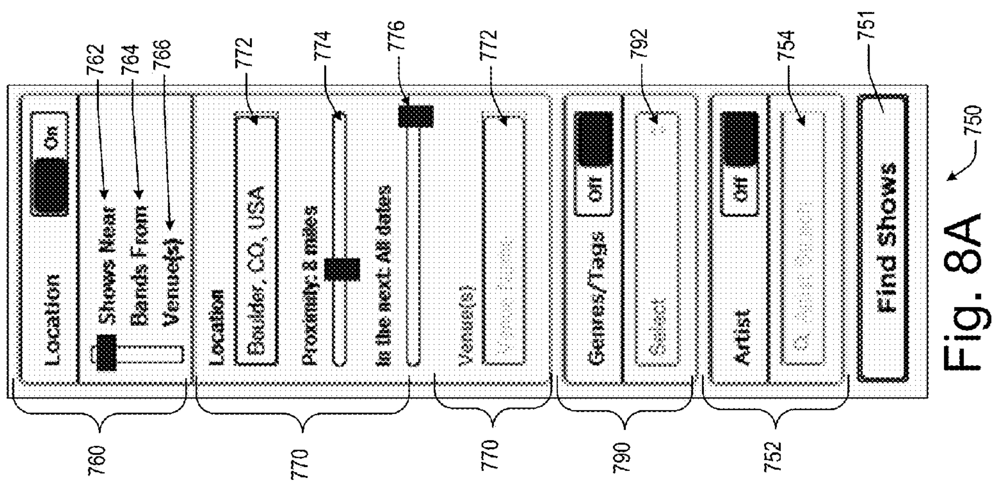

FIG. 8A shows an enlarged view of Search Filter GUI 750 of FIG. 7.

FIG. 8B shows an enlarged view of Find Stations Filter GUI 1850 of FIG. 18, which is described in greater detail below.

Figure 9:
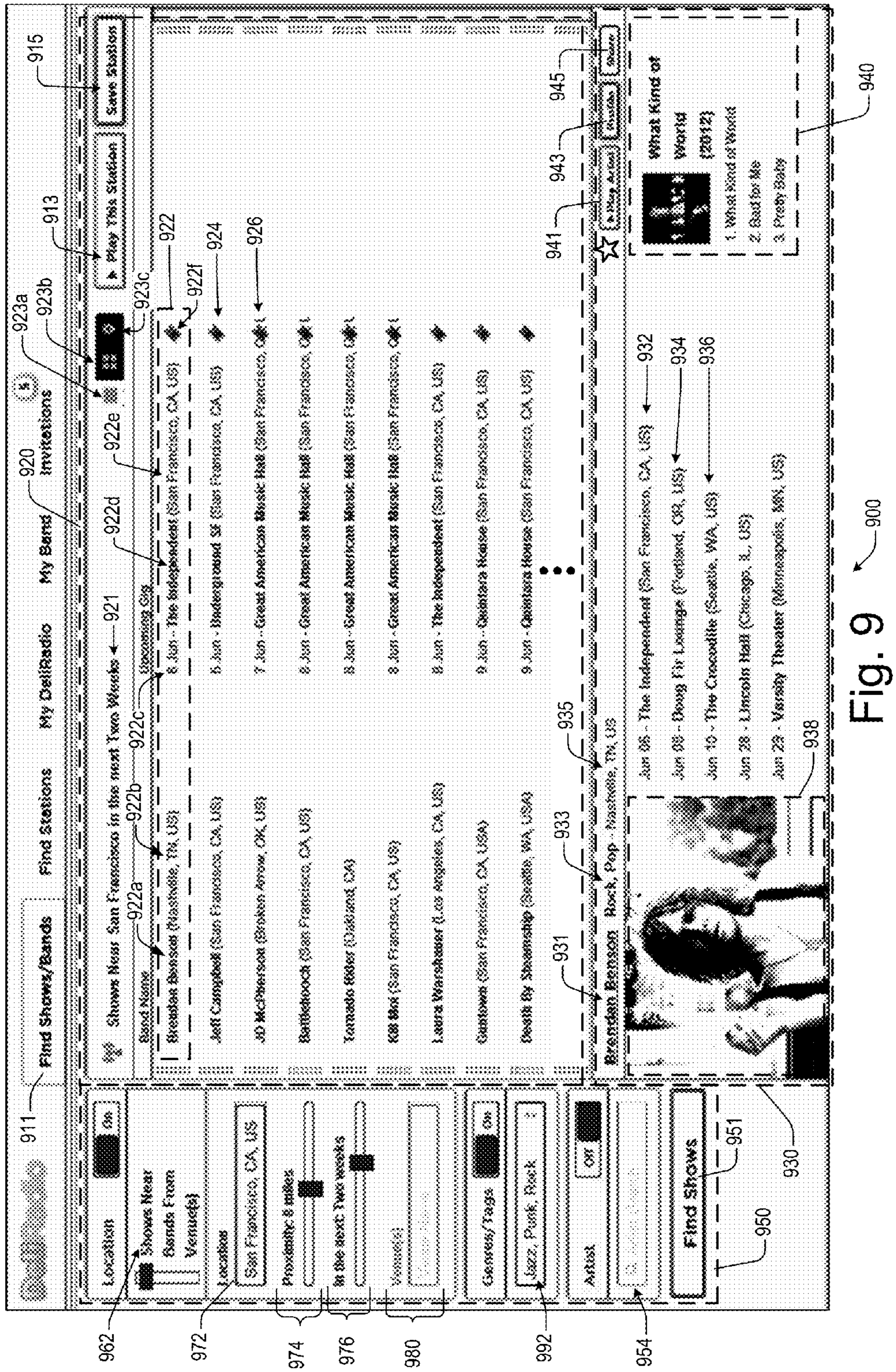

FIG. 9 shows an example screenshot of a Find Shows GUI 900 in accordance with a specific embodiment. In the specific example embodiment of FIG. 9, it is assumed:

- A user has utilized a web browser application at the client computer system to navigate to a MMMS System webpage, as illustrated in FIG. 9.
- User has configured the Search Filter GUI 950 to desired settings (e.g., search type filter 962 set to "Shows Near", location filter 972 set to "San Francisco", proximity filter 974 set to 8 miles; date range filter 976 set to "two weeks" (e.g., meaning w/in next two weeks); genres/tags filter 992 set to "Jazz, Punk, Rock" (e.g., meaning only Jazz or Punk or Rock).

User initiates query by clicking the 'Find Shows' button 951.

In at least one embodiment, the user's specified search criteria may be provided to the MMMS Server System, which may use the search criteria to automatically and/or dynamically initiate (e.g., in real-time) one or more search query(s) at one or more MMMS System databases and/or 3rd party databases. Thereafter, the MMMS Server System may use the information and results obtained from the search query(s) to automatically and/or dynamically generate (e.g., in real-time) updated, customized, filtered content to be included in the Find Shows GUI that is displayed to the user. Accordingly, after the search/query has been initiated by the user (e.g., by clicking the 'Find Shows' button 951), the content displayed in the Find Shows GUI 900 may be automatically and dynamically updated to include customized GUIs and content matching (or relating to) user's specified filter-search criteria.

For example, as illustrated in the example embodiment of FIG. 9, a Shows Search Results GUI 920 may be displayed which includes updated content and links relating to "Shows Near San Francisco in the next Two Weeks" (921). The displayed content in Shows Search Results GUI 920 may include, for example, a list of different bands/artists (e.g., 922, 924, 926) that will be performing near San Francisco in the next two weeks. In at least one embodiment, each different record (e.g., 922) in the list may include various types of artist-related, show-related, venue-related, and/or other types of related information such as, for example, one or more of the following (or combinations thereof):

- Artist/Band Name **922*a***
- Artist/Band Home Town/City **922*b***
- Show Date **922*c***
- Venue Name (where show will be performed) **922*d***
- Venue Location **922*e***
- Links (e.g., **922*f***) and/or information relating to show ticket reservation/purchasing.

In at least one embodiment, using the MMMS Server System may be operable to use the user's filter criteria and filtered search results to dynamically generate (e.g., in real-time) at least one streaming radio station which will play songs only from artists which match the user's specified filter criteria. For example, as illustrated in the example embodiment of FIG. 9, Find Shows GUI 900 includes a "Play This Station" button 913 which, when selected by the user (e.g., via mouse click or screen tap), may dynamically generate and begin streaming a DeliRadio Station which plays songs only from artists/bands that will be performing near (e.g., w/in 8 miles of) San Francisco in the next two weeks.

In at least one embodiment, when the user clicks on the Play This Station button 913, a popup dynamic Station Player GUI may automatically be displayed which plays songs by bands playing the listed upcoming shows. In the specific example embodiment of FIG. 9, the customized DeliRadio Station has been created as a dynamic station in which the playlist for this station is dynamic, and changes as time elapses and different bands and venues match (over time) the customized filter criteria used to generate this station.

It is further assumed that the user has selected the first show in this list, thereby opening the Artist Info GUI, which provides functionality for one or more of the following features (or combinations thereof):

- Displays a photo of the artist associated with the currently selected track
- Displays the name of the artist associated with the currently selected track, along with that artist's primary and secondary music genre and hometown
- Displays upcoming tour dates for the artist associated with the currently selected track
- Displays a list of albums by the artist associated with the currently selected track, with artwork and track listing for at least one album
- A Play This Artist Button that enables the user to play a DeliRadio Station populated with song by the artist associated with the currently selected track
- A View Profile Button that enables the user to view the profile page for the artist associated with the currently selected track
- A Share Button that generates a popup Album Share GUI In at least one embodiment, this customized DeliRadio Station may be saved by the user (e.g., by clicking on the "Save Station" button 915), and may assign the Station a name such as "Shows Near San Francisco in the next Two Weeks". In one embodiment, the user may click to save a dynamic station to the user's My Stations list (see, e.g., 740, FIG. 7). Once saved, the customized DeliRadio Station may be discovered by other users and/or shared to a variety of social networks such as Facebook, Twitter, etc. In at least one embodiment, the MMMS Server System tracks and saves (e.g., in at least one database) information relating to the customized DeliRadio Station, such as, for example, one or more of the following (or combinations thereof):

- station name;
- station type (e.g., dynamic or static);
- station owner;
- filter criteria used to generate the station;
- artist/band names (or other artist/band identifiers) of artist(s)/band(s) associated with the station;
- artist/band related information such as, for example: tour dates, twitter handles, DeliRadio artist/band page; genre information, tags, artist/band home town/city information, etc.;
- song playlist information;
- number of shares by users;
- number of plays by users (e.g., over one or more time intervals);
- number of stars collected;
- track play history;
- track popularity;
- album information;
- and/or other types of trackable DeliRadio information described herein.

In at least one embodiment, the MMMS Server System may periodically update the song list of the customized, dynamic DeliRadio Station so that the Station continues to stream only those songs which are from artists/bands that will be performing near San Francisco within the next two weeks (e.g., w/in two weeks from the current real-time date). In at least one embodiment, the displayed list of bands/shows may be sorted according to show date proximity, with the shows coming up the soonest being placed at or near the top of the list.

In at least one embodiment, the user may highlight or select artist/show record 922 from the Shows Search Results GUI 920 in order to access additional information and/or features relating to the highlighted/selected artist (and related shows). For example, in the specific example embodiment of FIG. 9, it is assumed that the user selects the record 922. In response, additional information and/or content about the selected artist may be displayed in Artist Info GUI 930. For example, as illustrated in the example embodiment of FIG. 9, Artist Info GUI 930 may display one or more of the following types of information about the artist/band (or combinations thereof):

Artist/Band Name 931;

Tags and/or Genre labels (933) associated with the Artist/Band;

Artist/Band Home Town/City 935;

Upcoming Artist/Band Show/Tour dates (e.g., 932, 934, 936, etc.)

Artist/Band related image content (938) and/or video content (not shown)

Artist/Band Album information 940

In at least one embodiment, using the MMMS Server System may be operable to use the user's filter criteria and filtered search results to dynamically generate (e.g., in real-time) at least one streaming radio station which will play only songs performed by (or associated with) the selected artists. For example, as illustrated in the example embodiment of FIG. 9, Artist Info GUI 930 includes a "Play This Artist" button 941 which, when clicked by the user, may dynamically generate and begin streaming a DeliRadio Station which plays only songs by the selected artist (e.g., Brendan Benson). In at least one embodiment, the user may access the artist's/band's profile information, for example, by clicking on the "Profile" button 943. The user may also share details about the selected artist/band to other users and/or to social networks.

Figure 11:
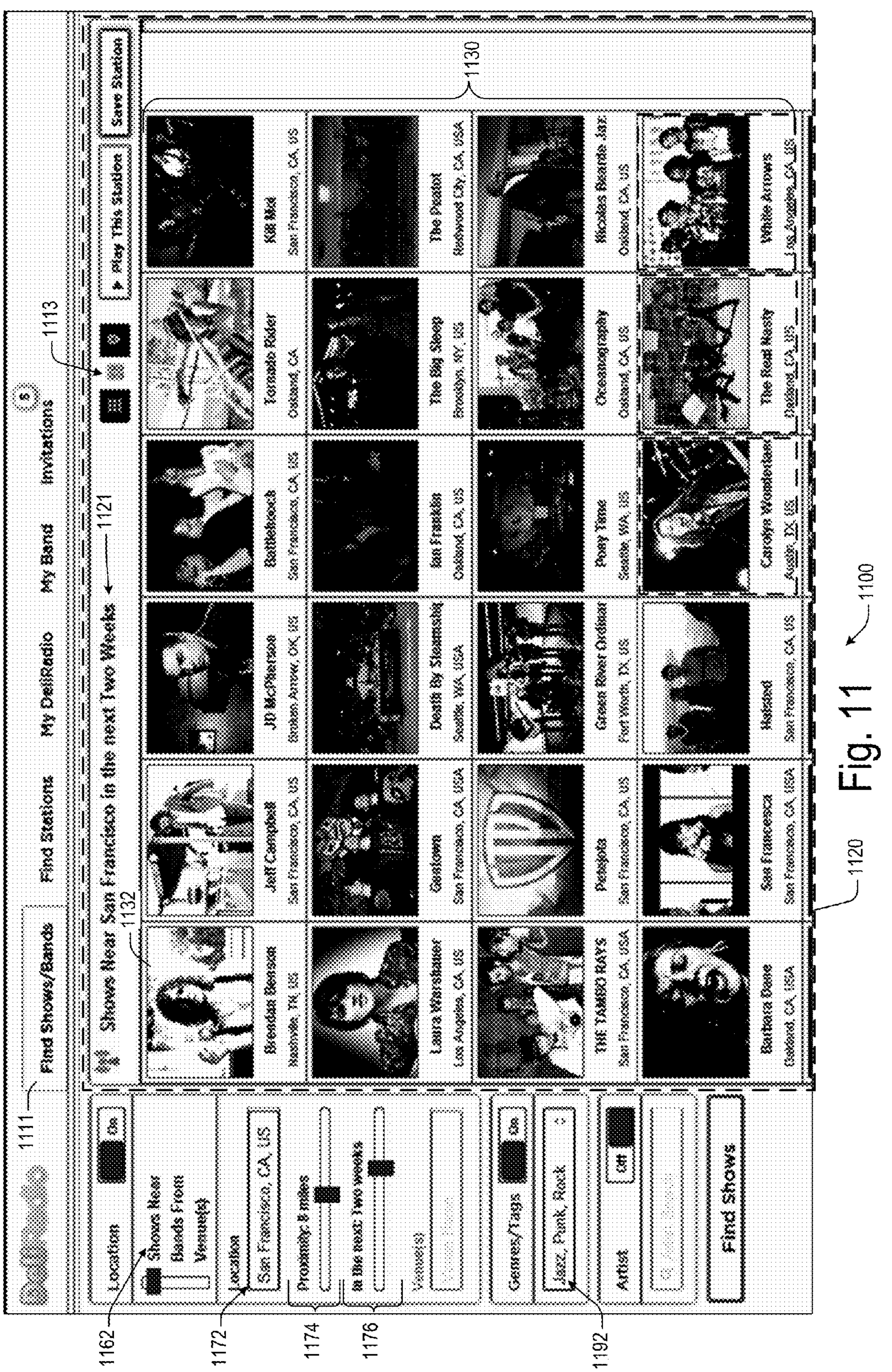
Figure 12:
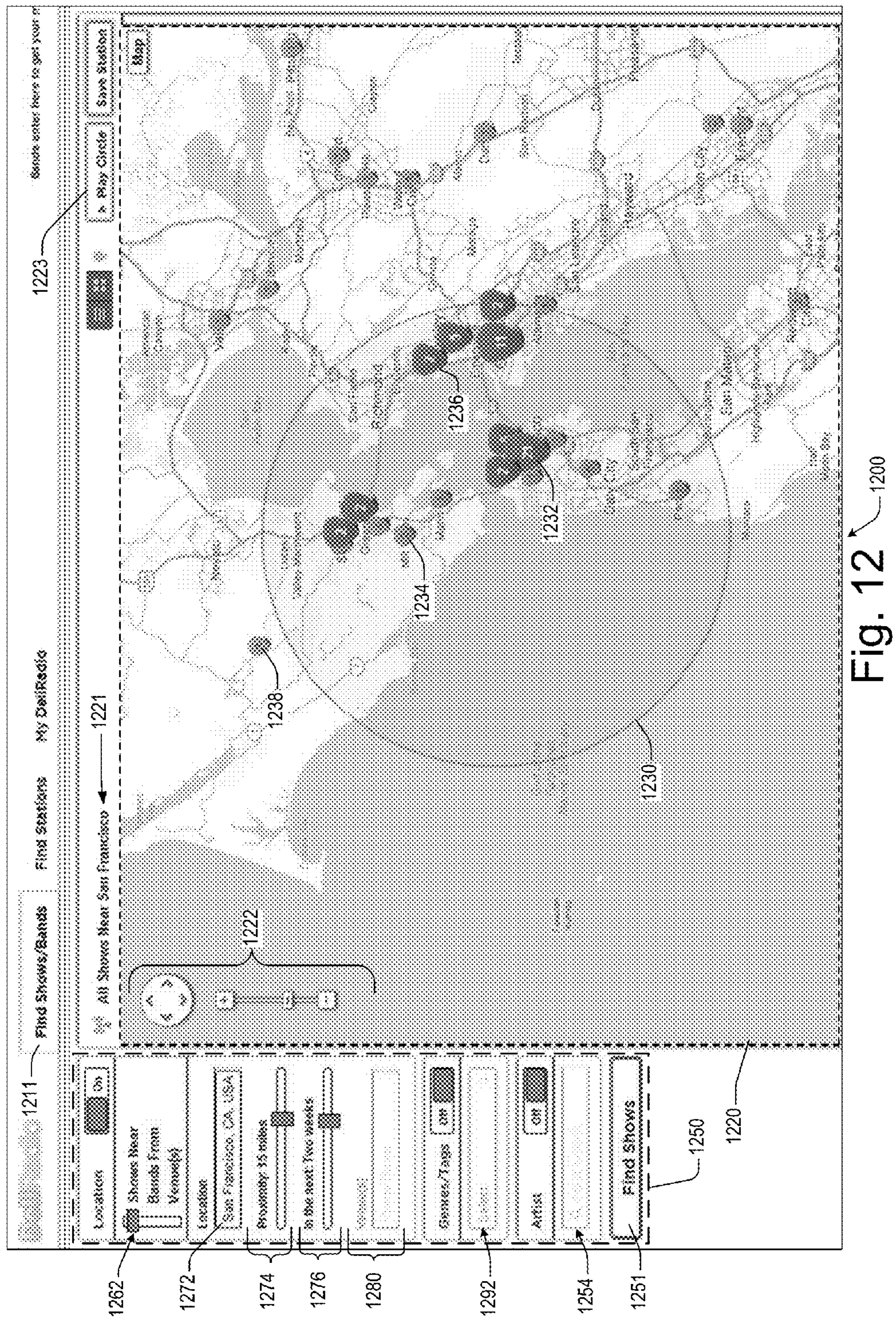
Figure 13:
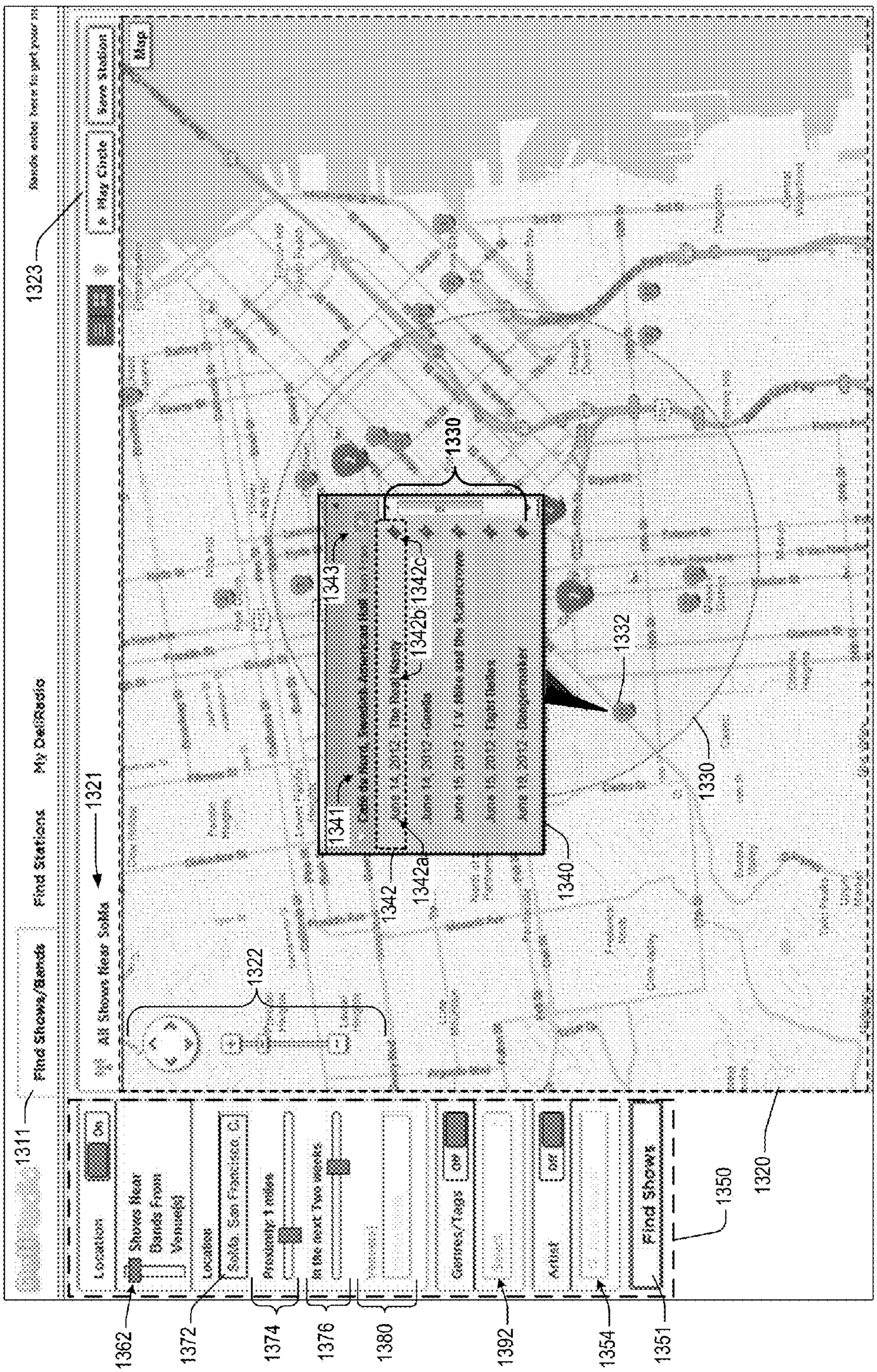

In at least one embodiment, the MMMS Server System may be operable to present the filtered search results via a variety of different GUI formats. For example, a list view representation (e.g., Shows Search Results GUI 920) of the filtered search results is illustrated in FIG. 9. In one embodiment, the user may selectively change the GUI presentation of the filtered search results to different formats by clicking on a desired View Format button such as List View icon 923*a* (as illustrated in FIG. 9), Tile View icon 923*b* (as illustrated in FIG. 11), or Map View icon 923*c* (as illustrated in FIG. 12).

Figure 10:
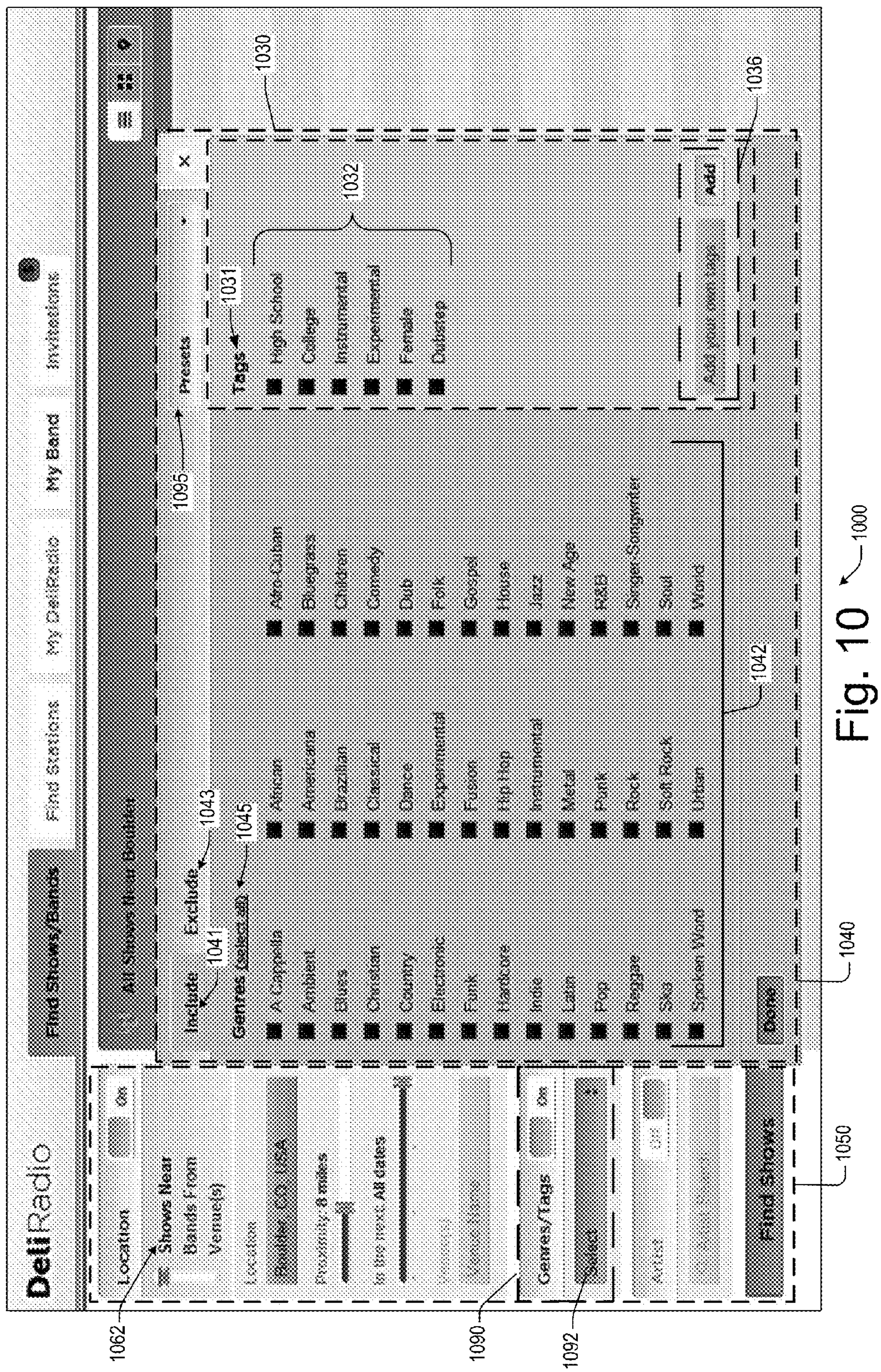

FIG. 10 shows an example screenshot of a Genres/Tags Filtering GUI 1040 in accordance with a specific embodiment. In at least one embodiment, the Genres/Tags Filtering GUI may be automatically displayed when the user clicks on the "Select" button 1092 of the Genres/Tags portion 1090 of the Search Filter GUI 1050. The Genres/Tags Filtering GUI may include functionality for facilitating the user in selectively choosing genre-related and/or tag-related filtering criteria to be used as part of the user-specified search criteria. For example, as illustrated in the example embodiment of FIG. 10, Genres/Tags Filtering GUI 1000 may include, for example:

a predefined list of "Include-Type" Genre categories (e.g., 1041, 1042) which (if selected by the user) are to be included as positive limitations of the filter criteria (e.g., punk+rock+jazz);

a predefined list of "Exclude-Type" Genre categories (e.g., 1043) which (if selected by the user) are to be included as negative limitations of the filter criteria (e.g., not punk; not punk and not jazz);

a predefined list of "Include-Type" Tags (e.g., 1031, 1032) which (if selected by the user) are to be included as positive limitations of the filter criteria;

a predefined list of "Exclude-Type" Tags (not shown) which (if selected by the user) are to be included as negative limitations of the filter criteria;

an manual tag input interface (e.g., 1036) which enables the user to manually enter one or more Tags to be included as part of the filter criteria;

a Presents interface 1095 which may include functionality for enabling the user to create and save different presents of user-customized Genres/Tags filtering criteria;

etc.

FIG. 11 shows an example screenshot of a Find Shows GUI 1100 which has been configured to display filtered search results content in Tile View format. In the specific example embodiment of FIG. 11, it is assumed that the user has configured the Search Filter GUI 1150 to desired settings (e.g., search type filter 1162 set to "Shows Near", location filter 1172 set to "San Francisco", proximity filter 1174 set to 8 miles; date range filter 1176 set to "two weeks" (e.g., meaning w/in next two weeks); genres/tags filter 1192 set to "Jazz, Punk, Rock" (e.g., meaning only Jazz or Punk or Rock).

After the search/query has been initiated by the user (e.g., by clicking the 'Find Shows' button 1151), the content displayed in the Find Shows GUI 1100 may be automatically and dynamically updated to include customized GUIs and content matching (or relating to) user's specified filter-search criteria. In at least one embodiment, the filtered search results displayed in the Find Shows GUI 1100 may include a grid-type visual layout of "tiles" where each tile may be representative of a different artist/band matching the filtered search criteria. For example, as illustrated in the example embodiment of FIG. 11, a Shows Search Results GUI 1120 may be displayed which includes updated content and links relating to "Shows Near San Francisco in the next Two Weeks" (1121). In the specific example embodiment of FIG. 11, the displayed content in Shows Search Results GUI 1120 includes a tiled, grid-view display of different bands/artists (e.g., 1130) that will be performing near San Francisco in the next two weeks. In at least one embodiment, each different record (e.g., 1122) in the list may include various types of artist-related, show-related, venue-related, and/or other types of related information such as, for example, one or more types described herein (e.g., such as that described previously with respect to FIG. 9).

In at least one embodiment, the user may highlight or select one of the displayed search result tiles (e.g., artist tile 1132) from the Shows Search Results GUI 1120 in order to access additional information and/or features relating to the highlighted/selected artist (and related shows). In response to the user's input, additional information and/or content about the selected artist may be displayed. In at least one embodiment, the additional displayed artist information/content may include one or more types of information and/or content described herein (e.g., such as that described previously with respect to FIG. 9).

FIG. 12 shows an example screenshot of a Find Shows GUI 1200 which has been configured to display filtered search results content in Map View format. In the specific example embodiment of FIG. 12, it is assumed that the user has configured the Search Filter GUI 1250 to desired settings (e.g., search type filter set to "Shows Near", location filter set to "San Francisco, Calif., USA", proximity filter set to 15 miles; date range filter set to "two weeks"; genres/tags filter set to "All Genres/Tags"). After the search/query has been initiated by the user, the content displayed in the Find Shows GUI 1200 may be automatically and dynamically updated to include customized GUIs and content matching (or relating to) user's specified filter-search criteria.

For example, as illustrated in the example embodiment of FIG. 12, content relating to the filtered search results is plotted on a map and displayed in Map View format. In the specific example embodiment of FIG. 12, "guitar pick" icons (e.g., 1232, 1234, 1236, 1238, etc.) are used to indicate the show venue location(s) on the displayed map portion 1220, and a number displayed on each (or selected) guitar pick indicates the number of upcoming shows (matching the filtered search criteria) at one or more venue(s) in the geographic region associated with that guitar pick icon.

In alternate embodiments, when a genre and/or hometown station is viewed in Map View format, the hometown of each artist (matching the filtered search criteria) may be plotted on a map and displayed using an icon (e.g., guitar pick icon), and the number displayed on a given icon may indicate the number of artists matching the filtered search criteria which originate from or near that geographic location. An example of this feature is illustrated and described respect to FIG. 16. In another embodiment, if a "Venue(s) search" for shows is initiated, the displayed map icons in the search results may indicate venue locations having upcoming shows which match the filtered search criteria, and the number associated with (or displayed on) a given map icon may indicate the number of upcoming shows (matching the filtered search criteria) at one or more venue(s) in the geographic region associated with that guitar pick icon. An example of this feature is illustrated and described with respect to FIG. 17.

In one embodiment, the user may interact with the zoom adjustment interface (e.g., 1222) to cause the displayed map to "zoom in" or "zoom out", as desired by the user. In at least one embodiment, the displayed MAP GUI content may be automatically and/or dynamically updated in response to each "zoom" operation.

In at least one embodiment, the size, color, and/or shape of a displayed map icon may be used to differentiate between "single venue" map icons (e.g., where the map icon represents a single venue) and "multiple venue" map icons (e.g., where the map icon represents a plurality of venues). For example, as illustrated in the example embodiment of FIG. 12, single venue icons may be represented using relatively smaller guitar pick icons (e.g., 1234) of lighter shading, and multiple venue icons may be represented using relatively larger guitar pick icons (e.g., 1232, 1236) of darker shading. In at least one embodiment, when the user's clicks on a multiple venue map icon (e.g., 1232), the Map GUI 1220 may respond by reloading or updating the displayed map view to zoom in on the geographic location of map region corresponding to the selected map icon, thereby displaying more granular details relating to shows and/or venues in geographic region associated with the selected icon. For example, if the user were to click on guitar pick icon 1232 of FIG. 12 (displaying the value "21"), the MAP GUI 1220 (working together with other component(s) of the MMMS System) may respond by zooming in on the map region geographically represented by guitar pick icon 1232, as illustrated, for example, in FIG. 13.

In at least one embodiment, when the user's clicks on a single venue map icon (e.g., 1332, FIG. 13), the Map GUI 1220 may respond by displaying Venue Info GUI (e.g., 1340) which may be configured to display various types of information and/or content relating to the specific venue associated with the selected icon. Examples of such venue-related information may include, but are not limited to, one or more of the following (or combinations thereof): venue name (1341) and associated geographic location; upcoming show information (1330), which, for example, may include show date information (1342*a*), artist information (1342*b*), and ticket availability information 1342*c*. In at least one embodiment, the user may initiate the reservation or purchase of tickets for a particular show by clicking on the ticket icon (e.g., 1342*c*) associated with that show. In at least one embodiment, Venue Info GUI 1340 may include a "PLAY" button 1343 which, when clicked, may cause the MMMS System to dynamically generate and begin streaming a customized "Venue" DeliRadio Station which plays only songs by artists who have upcoming gigs at the selected venue (e.g., Café Du Norde, 1341).

As illustrated in the example embodiment of FIG. 12, Find Shows GUI 1200 may include a "Play Circle" button 1223 which, when clicked, may cause the MMMS System to dynamically generate and begin streaming a customized DeliRadio Station which plays only songs by artists which have upcoming shows in the next two weeks within the circled geographic region 1230 (e.g., which corresponds to the specified filter criteria of shows within 15 miles of San Francisco). In one embodiment, the user may also save the dynamic DeliRadio Station to the user's My Stations list. Once saved, the customized DeliRadio Station may be discovered by other DeliRadio users and/or may be shared with users of other social networks.

In one embodiment, for example, creating a DeliRadio Station of rock bands with upcoming shows within 100 miles of Amsterdam, Netherlands, when viewed in Map View format, may display one or more icons indicating rock bands with upcoming shows in this radius around Amsterdam. In one embodiment, some or all of the displayed icons on the map may represent or indicate a different music venue where one or more of the show(s) may take place. Clicking on a selected displayed icon may open a Venue Info GUI which includes content listing one or more artists/bands matching the filtered search criteria at that particular venue. In one embodiment, the user may click on a "Play Station" button (e.g., displayed in the Venue Info GUI) to listen to a streaming, customized, dynamically generated DeliRadio Station which, for example, plays only songs from artists/bands (matching the filtered search criteria) which have upcoming shows at that particular venue.

In at least one embodiment, the results of a search initiated using the Search Filter GUI may shown plotted on a map and represented by an icon (such as the guitar pick icon). In one embodiment, the size of the icon and/or the number shown on the icon indicate the number of identified artists, shows, and/or venues (or combinations thereof) matching the filtered search criteria at the representative geographic location corresponding to that particular icon. In at least one embodiment, MMMS System may include functionality for enabling the user to dynamically adjust the radius of the search results displayed, for example, by dynamically changing the radius of the search region (e.g., circle 1233, FIG. 12) (e.g., by using a mouse or touchscreen to adjust the search region 1233 bigger/smaller) to thereby dynamically expand or narrow the displayed search results, as desired. This, in turn, may cause map new icons to be dynamically displayed (e.g., in real time) w/in the boundaries of newly defined search region. In one embodiment, the scale of the displayed map may be automatically and dynamically adjusted (e.g., by the MMMS Server System) to optimize viewing of the displayed search results.

Figure 14:
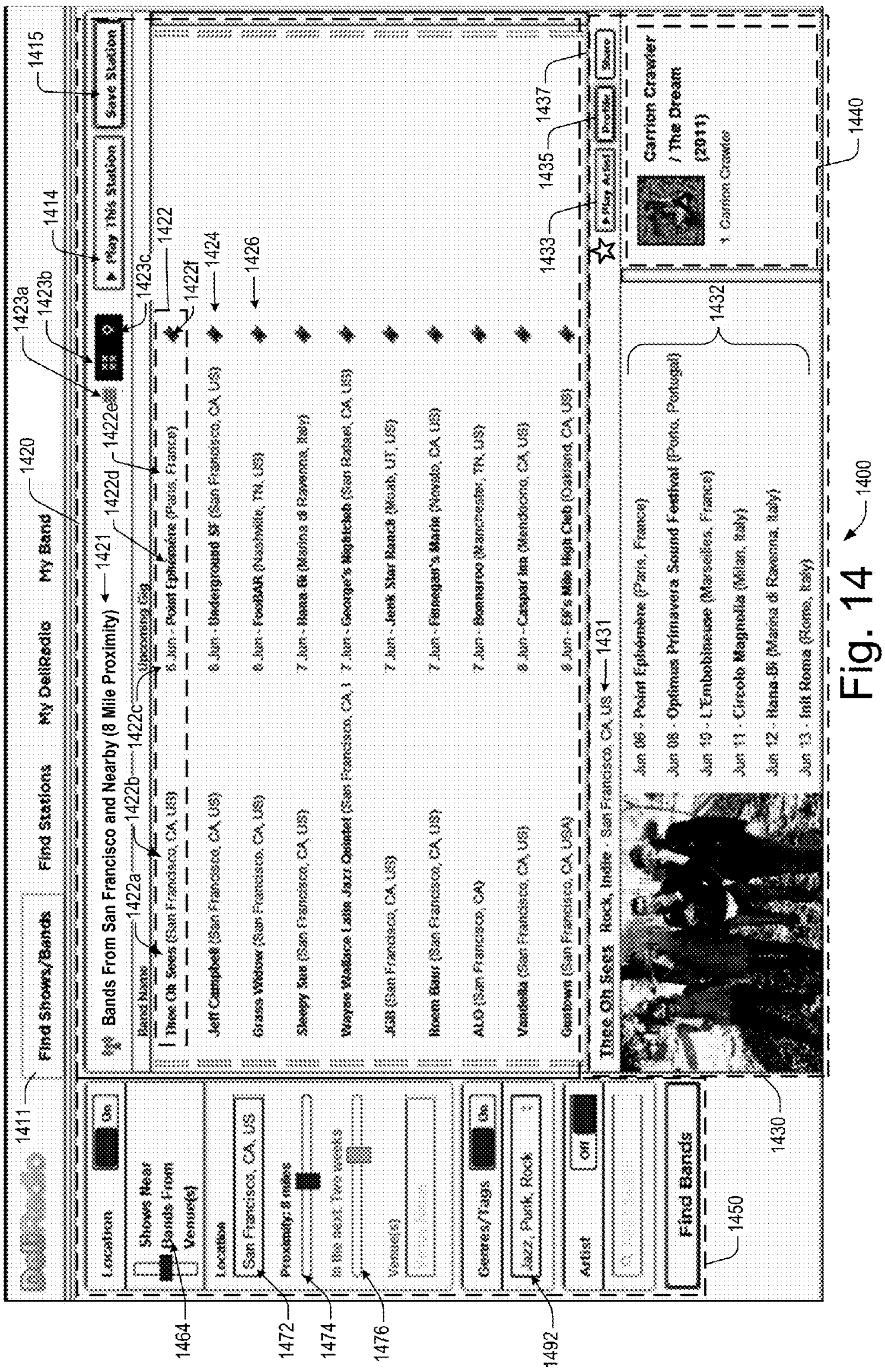

FIG. 14 shows an example screenshot of a Find Bands GUI 1400 in accordance with a specific embodiment. In the specific example embodiment of FIG. 14, it is assumed that the user wishes to perform a search for jazz, punk, or rock bands/artists whose hometown is San Francisco or nearby areas (e.g., areas w/in about 8 miles from San Francisco). Accordingly, the user may configure the Search Filter GUI 1450 to desired settings (e.g., search type filter 1462 set to "Bands From", location filter 1472 set to "San Francisco", proximity filter 1474 set to 8 miles; genres/tags filter 1492 set to "Jazz, Punk, Rock", etc. In one embodiment, the Date Criteria Filter (1476) may be disabled when performing this type of search). After the user's filtered search has been initiated, the content displayed in the Find Bands GUI 1400 may be automatically and dynamically updated to include customized GUIs and content matching (or relating to) user's specified filter-search criteria.

For example, as illustrated in the example embodiment of FIG. 14, a Bands Search Results GUI 1420 may be displayed which includes updated content and links relating to "Bands From San Francisco and Nearby (8 Mile Proximity)" (1421). The displayed content in Bands Search Results GUI 1420 may include, for example, a list (e.g., 1422, 1424, 1426) of different bands/artists from San Francisco (or nearby) which have upcoming gigs. In one embodiment, the scope of the filter search results may include bands/artists from San Francisco (or nearby) which have upcoming gigs anywhere in the world. In other embodiments, the scope of the filter search results may include bands/artists from San Francisco (or nearby) which have upcoming gigs anywhere within a predetermined proximity (e.g., w/in 200 miles) from the users geographic location (e.g., as determined, for example, from the user's IP address and/or the geolocation of the user's mobile device). In at least one embodiment, each different record (e.g., 1422) in the list may include various types of artist-related, show-related, venue-related, and/or other types of related information (e.g., Artist/Band Name 1422*a*; Artist/Band Home Town/City 1422*b*; Show Date 1422*c*; Venue Name (where show will be performed) 1422*d*; Venue Location 1422*e*; Links (e.g., 14220 and/or information relating to show ticket reservation/purchasing; etc.). In at least one embodiment, the displayed list of bands/shows may be sorted according to show date proximity, with the shows coming up the soonest being placed at or near the top of the list.

In at least one embodiment, the MMMS Server System may be operable to use the user's filter criteria and/or filtered search results to dynamically generate (e.g., in real-time) at least one streaming radio station which will play songs only from artists which match the user's specified filter criteria. For example, as illustrated in the example embodiment of FIG. 14, Find Bands GUI 1400 includes a "Play This Station" button 1413 which, when selected by the user (e.g., via mouse click or screen tap), may dynamically generate and begin streaming a DeliRadio Station which plays songs only by bands/artists from San Francisco (or nearby) which have upcoming gigs. In at least one embodiment, the customized DeliRadio Station may also be saved by the user and/or shared with other users of the MMMS System and/or users of other social networks.

Similar to the example embodiment of FIG. 9, if the user selects one of the artists (e.g., 1422) displayed in the Bands Search Results GUI 1420, additional information about the selected artist (and related songs, albums, shows, etc.) may be dynamically displayed. For example, in the specific example embodiment of FIG. 14, if the user selects the record 1422, additional information and/or content about the selected artist (Thee Oh Sees) may be displayed in Artist Info GUI 1430.

In at least one embodiment, using the MMMS Server System may be operable to use the user's filter criteria and filtered search results to dynamically generate (e.g., in real-time) at least one streaming radio station which will play only songs performed by (or associated with) the selected artists. For example, as illustrated in the example embodiment of FIG. 14, Artist Info GUI 1430 includes a "Play This Artist" button 1441 which, when clicked by the user, may dynamically generate and begin streaming a DeliRadio Station which plays only songs by the selected artist (e.g., Brendan Benson). In at least one embodiment, the user may access the artist's/band's profile information, for example, by clicking on the "Profile" button 1443. The user may also share details about the selected artist/band to other users and/or to social networks.

In at least one embodiment, the MMMS Server System may be operable to present the filtered search results via a variety of different GUI formats. For example, a list view representation (e.g., Bands Search Results GUI 1420) of the filtered search results is illustrated in FIG. 14. In one embodiment, the user may selectively change the GUI presentation of the filtered search results to different display/viewing formats by clicking on a desired View Format button such as List View icon 1423*a* (as illustrated in FIG. 14), Tile View icon 1423*b*, or Map View icon 1423*c*.

Figure 15:
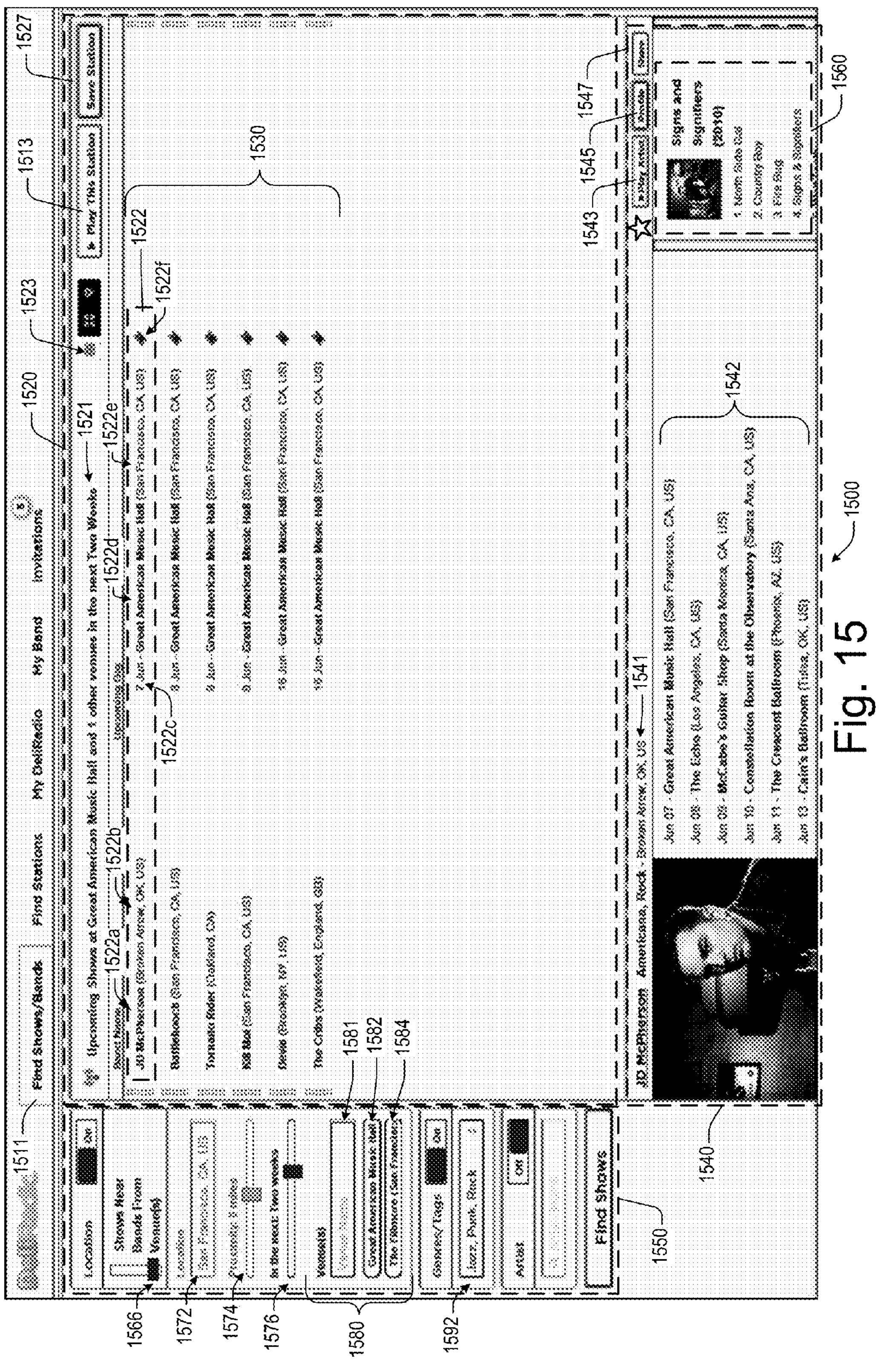
Figure 15A:
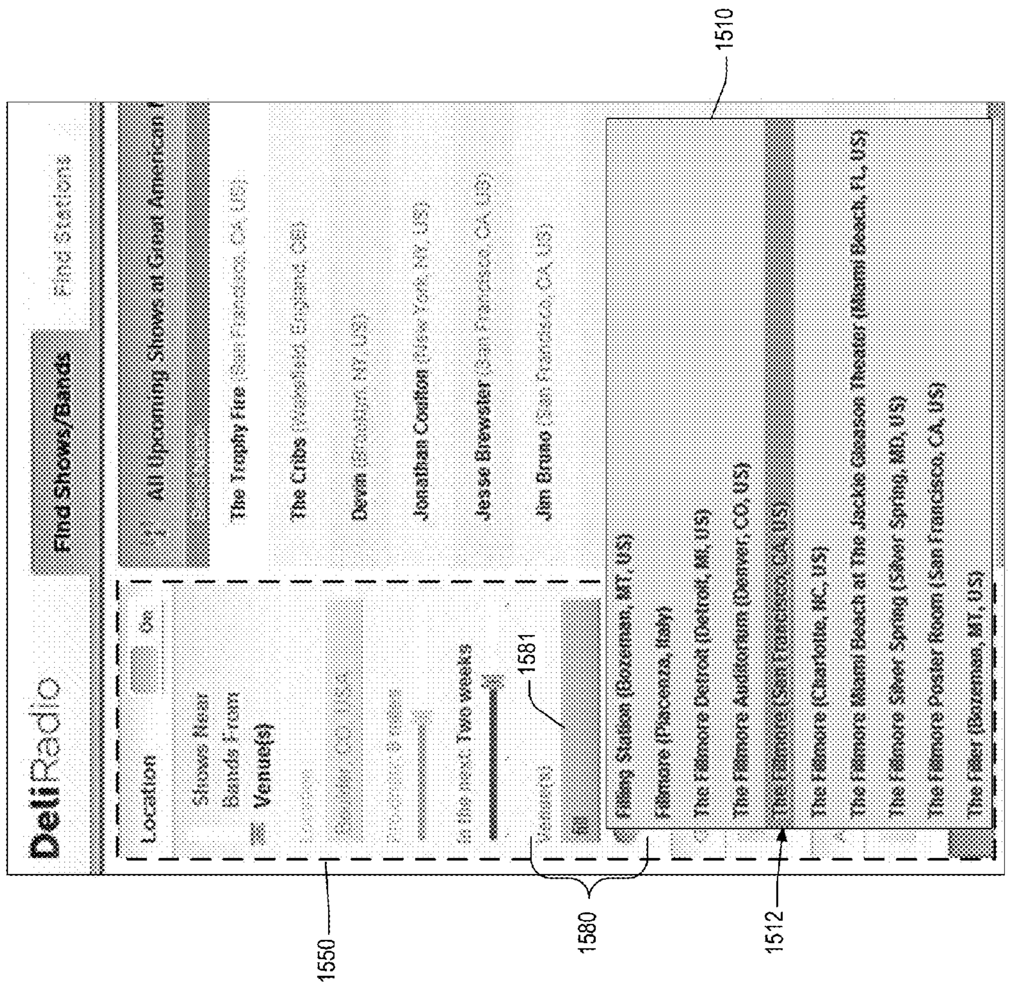

FIG. 15 shows an example screenshot of a Find Shows-Venue GUI 1500 in accordance with a specific embodiment. In the specific example embodiment of FIG. 15, it is assumed that the user wishes to perform a search for jazz, punk, or rock shows/concerts which will take place in the next two weeks at one or more specific venue(s) designated by the user. In this particular example, it is assumed that the user specifies to venues: (1) The Fillmore (San Francisco, Calif.), and (2) Great American Music Hall (San Francisco, Calif.). Accordingly, the user may configure the Search Filter GUI 1550 to desired settings (e.g., search type filter 1562 set to "Venue(s)", date criteria filter 1576 set to "two weeks", genres/tags filter 1592 set to "Jazz, Punk, Rock", etc). Additionally, as illustrated in the example embodiment of FIG. 15, the user may input the names of each of the specific venues in the Venue(s) Input interface box 1581. In at least one embodiment (as illustrated, for example, in FIG. 15A), as the user types the name of the venue in the Venue(s) Input interface box (e.g., 1581, FIG. 15A), the Search Filter GUI may be configured or designed to respond by automatically and dynamically displaying (e.g., in real-time) a Venue Name Match GUI (e.g., 1510, FIG. 15A), which displays a list of all known venue names (along with corresponding venue location information) which match the string of characters in the Venue(s) Input interface box (e.g., 1581). The user may then select the desired venue name (e.g., 1512, FIG. 15A) from the displayed list of venue names.

In one embodiment, if the MMMS System recognizes the input venue name(s), it may provide confirmation by displaying the identified venue name(s) in the Venue(s) Filter Criteria GUI 1580, as illustrated, for example, at 1582, 1584 of FIG. 15. In at least one embodiment, the displayed Venue(s) filter criteria (e.g., Great American Music Hall 1582, The Fillmore 1584) will be included as part of the user-defined filter-search criteria for the Find Shows-Venue search to be initiated. In one embodiment, the location filter interface (1572) and the proximity filter interface (1574) may be disabled when performing this type of search. After the user's filtered search has been initiated, the content displayed in the Find Shows-Venue GUI 1500 may be automatically and dynamically updated to include customized GUIs and content matching (or relating to) user's specified filter-search criteria.

For example, as illustrated in the example embodiment of FIG. 15, a Venues Search Results GUI 1520 may be displayed which includes updated content and links relating to upcoming shows (and the artists/bands who will be performing the shows) at either of the two specified venues in the next two weeks. The displayed content in Venues Search Results GUI 1520 may include various types of artist-related, show-related, venue-related, and/or other types of related information (e.g., Artist/Band Name 1522*a*; Artist/Band Home Town/City 1522*b*; Show Date 1522*c*; Venue Name (where show will be performed) 1522*d*; Venue Location 1522*e*; Links (e.g., 15220 and/or information relating to show ticket reservation/purchasing; etc.). In at least one embodiment, the displayed list of bands/shows may be sorted according to show date proximity, with the shows coming up the soonest being placed at or near the top of the list.

In at least one embodiment, the MMMS Server System may be operable to use the user's filter criteria and filtered search results to dynamically generate (e.g., in real-time) at least one streaming radio station which will play songs only from artists which match the user's specified filter criteria. For example, as illustrated in the example embodiment of FIG. 15, Find Shows-Venue GUI 1500 includes a "Play This Station" button 1513 which, when selected by the user (e.g., via mouse click or screen tap), may dynamically generate and begin streaming a DeliRadio Station which plays only songs by bands/artists having upcoming shows at either of the two specified venues in the next two weeks. In at least one embodiment, the customized DeliRadio Station may also be saved by the user and/or shared with other users of the MMMS System and/or users of other social networks.

Similar to the example embodiment of FIG. 9, if the user selects one of the artists (e.g., 1522) displayed in the Venues Search Results GUI 1520, additional information about the selected artist (and related songs, albums, shows, etc.) may be dynamically displayed. For example, in the specific example embodiment of FIG. 15, if the user selects the record 1522, additional information and/or content about the selected artist (JD McPherson) may be displayed in Artist Info GUI 1540. In at least one embodiment, the MMMS Server System may be operable to use the user's filter criteria and/or filtered search results to dynamically generate (e.g., in real-time) at least one streaming radio station which will play only songs performed by (or associated with) the selected artists. For example, as illustrated in the example embodiment of FIG. 15, Artist Info GUI 1540 includes a "Play This Artist" button 1543 which, when clicked by the user, may dynamically generate and begin streaming a DeliRadio Station which plays only songs by the selected artist (e.g., JD McPherson). In at least one embodiment, the user may access the artist's/band's profile information, for example, by clicking on the "Profile" button 1545. The user may also share (e.g., via "Share" button 1547) details about the selected artist/band to other users and/or to social networks.

In at least one embodiment, the MMMS Server System may be operable to present the filtered search results via a variety of different GUI formats. For example, a list view representation (e.g., Venues Search Results GUI 1520) of the filtered search results is illustrated in FIG. 15. In one embodiment, the user may selectively change the GUI presentation of the filtered search results to different display/viewing formats by clicking on a desired View Format button to selectively switch between List View format, Tile View format, or Map View format.

Figure 16:
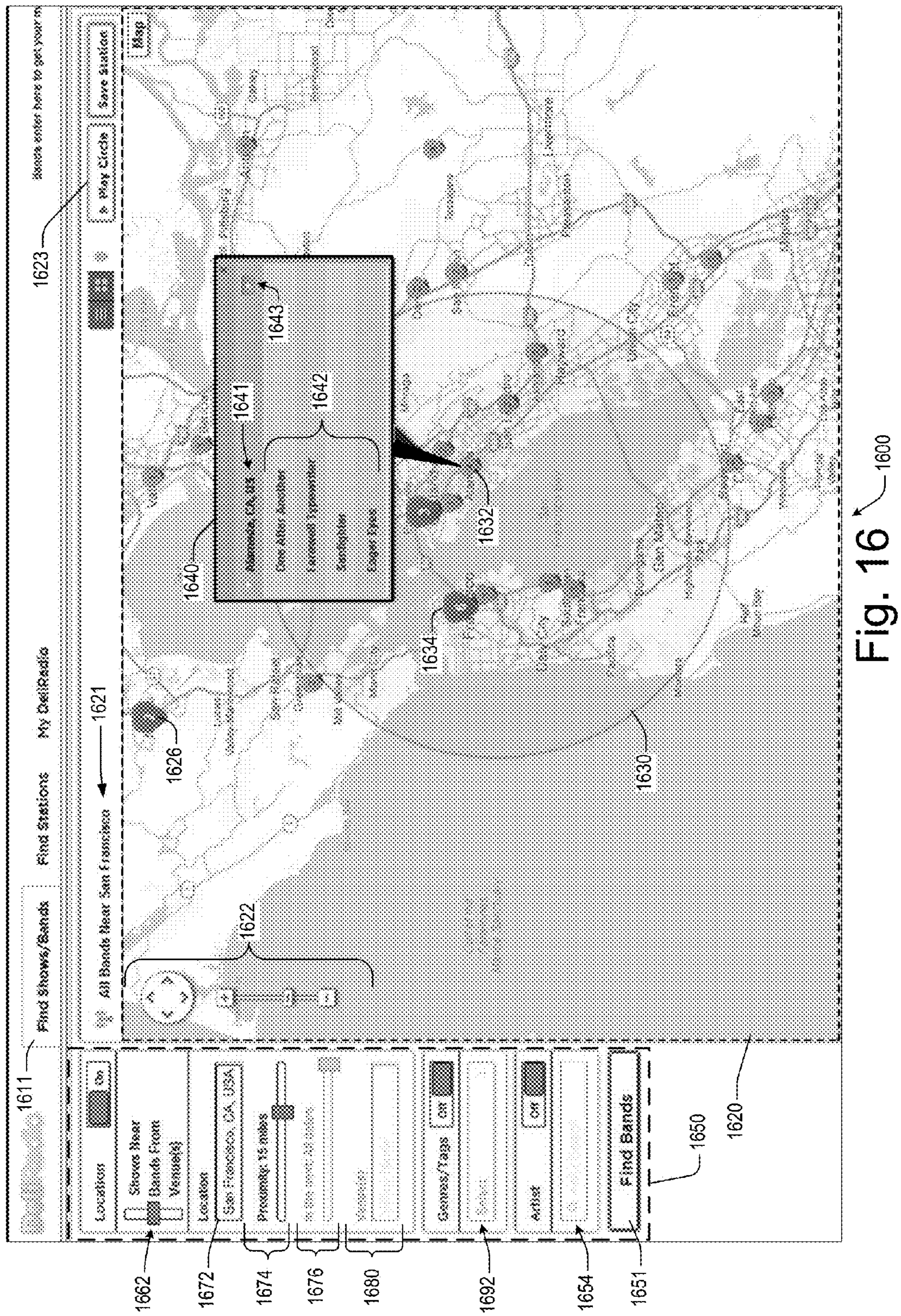

FIG. 16 shows an example screenshot of a Find Bands GUI 1600 which has been configured to display filtered search results content in Map View format. In the specific example embodiment of FIG. 16, it is assumed that the user wishes to search for bands from San Francisco or nearby regions (e.g., within a 15 mile radius of San Francisco), and has configured the Search Filter GUI 1650 to specify the following search criteria: search type (1662) set to "Bands From", location criteria (1672) set to "San Francisco, Calif., USA", proximity criteria (1674) set to "15 miles"; dates criteria (1676) set to all dates (default); venue criteria (1680) set to all venues (default); genre/tags criteria (1692) set to all genres/tags (default); artist criteria (1654) set to all artists (default).

In at least one embodiment, content relating to the filtered search results may be plotted on a map and displayed in Map View format via MAP GUI 1620. In at least one embodiment, when the Find Bands GUI is viewed in Map View format, identified artists matching the filtered search criteria may be plotted on the map and displayed (e.g., using one or more icons) at corresponding locations on the map representing the artists' hometowns. In one embodiment, the number displayed on a given icon may indicate the number of artists matching the filtered search criteria which originate from or near that geographic location.

As illustrated in the example embodiment of FIG. 16, Find Bands GUI 1600 may include a "Play Circle" button 1623 which, when clicked, may cause the MMMS System to dynamically generate and begin streaming a customized "Bands From San Francisco and Nearby" DeliRadio Station which plays only songs by artists whose hometowns are within the circled geographic region 1630 (e.g., which, based on the filter criteria, represents a radius of approximately 15 miles from San Francisco). In one embodiment, the user may also save the dynamic DeliRadio Station to the user's My Stations list. Once saved, the customized DeliRadio Station may be discovered by other DeliRadio users and/or may be shared with users of other social networks. Other examples may be used to create hybrid hometown/genre DeliRadio Stations, for example, by specifying the desired band hometown criteria (e.g., in filter GUIs 1672 and 1674), and also specifying one or more specific genre(s) in Genre(s)/Tag(s) filter GUI 1692.

In one embodiment, the user may interact with the zoom adjustment interface (e.g., 1622) to cause the displayed map to "zoom in" or "zoom out", as desired by the user. In at least one embodiment, the displayed MAP GUI content may be automatically and/or dynamically updated in response to each "zoom" operation.

In at least one embodiment, the size, color, and/or shape of a displayed map icon may be used to differentiate between "single artist" map icons (e.g., where the map icon represents a single artist) and "multiple artist" map icons (e.g., where the map icon represents a plurality of artists). For example, as illustrated in the example embodiment of FIG. 16, single artist icons may be represented using relatively smaller guitar pick icons (e.g., 1632) of lighter shading, and multiple artist icons may be represented using relatively larger guitar pick icons (e.g., 1634, 1626) of darker shading. In at least one embodiment, when the user's clicks on a multiple artist map icon (e.g., 1634), the Map GUI 1620 may respond by reloading or updating the displayed map view to zoom in on the geographic location of map region corresponding to the selected map icon, thereby displaying more granular details relating to artists (and related shows, venues, etc.) in the geographic region associated with the selected icon. In at least one embodiment, when the user's clicks on a single artist map icon (e.g., 1632), the Map GUI 1620 may respond by displaying Artist Hometown Info GUI (e.g., 1640) which may be configured to display various types of information and/or content relating to the specific artist(s) associated with the selected icon. Examples of such artist-related information may include, but are not limited to, one or more of the following (or combinations thereof): geographic location (1641); artist name(s) (1642); upcoming show information (which, for example, may include show date information, venue information, ticket availability information, etc.); and/or other types of information described and/or referenced herein. As illustrated in the example embodiment of FIG. 16, Artist Hometown Info GUI 1640 may include a "PLAY" button 1643 which, when clicked, may cause the MMMS System to dynamically generate and begin streaming a customized "Artist Hometown" DeliRadio Station which plays only songs by artists whose hometown is associated with the selected geographic location (e.g., Alameda, Calif., USA, 1641).

Figure 17:
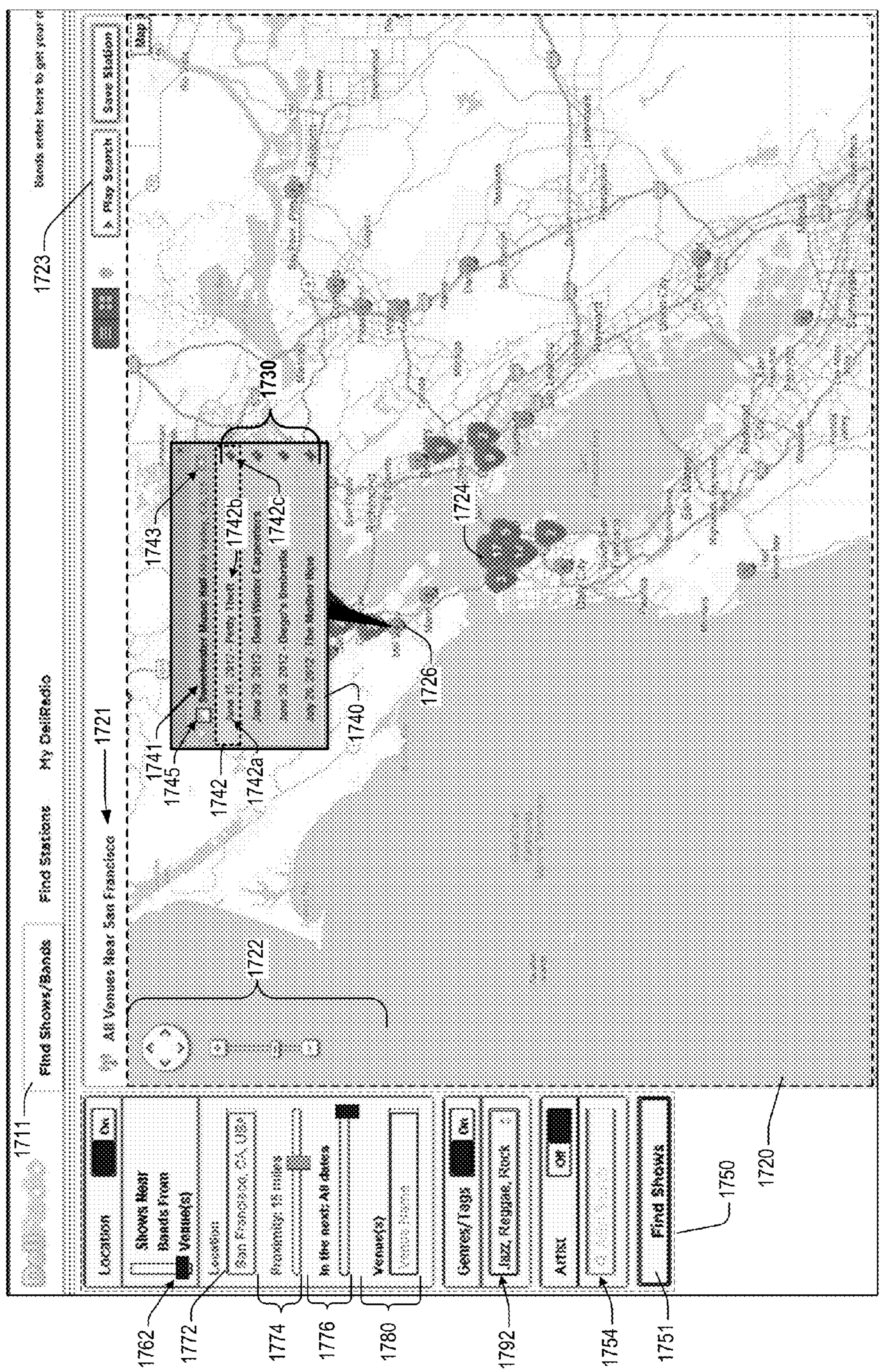

FIG. 17 shows an example screenshot of a Find Shows-Venue GUI 1700 in Map View format in accordance with a specific embodiment. In the specific example embodiment of FIG. 17, it is assumed that the user wishes to perform a search for all upcoming jazz, reggae, or rock shows at all venues within 15 miles from San Francisco, Calif., and has configured the Search Filter GUI 1750 to specify the following search criteria: search type (1762) set to "Venue(s)", location criteria (1772) set to "San Francisco, Calif., USA", proximity criteria (1774) set to "15 miles"; dates criteria (1776) set to all dates; venue criteria (1780) set to all venues (default); genre/tags criteria (1792) set to "jazz or reggae or rock"; artist criteria (1754) set to all artists (default).

In at least one embodiment, content relating to the filtered search results may be plotted on a map and displayed in Map View format via MAP GUI 1720. In at least one embodiment, when the Find Shows-Venues GUI is viewed in Map View format, identified shows matching the filtered search criteria may be plotted on the map and displayed (e.g., using one or more icons) at corresponding locations on the map. In one embodiment, the number displayed on a given icon may indicate the number of shows matching the filtered search criteria at one or more venue(s).

As illustrated in the example embodiment of FIG. 17, Find Shows-Venues GUI 1700 may include a "Play Search" button 1723 which, when clicked, may cause the MMMS System to dynamically generate and begin streaming a customized "Upcoming Jazz, Reggae, or Rock Shows Near San Francisco" DeliRadio Station which plays only songs identified (e.g., by the MMMS System) as matching the filtered search criteria (1750). In one embodiment, the user may also save the dynamic DeliRadio Station to the user's My Stations list. In one embodiment, the user may interact with the zoom adjustment interface (e.g., 1722) to cause the displayed map to "zoom in" or "zoom out", as desired by the user. In at least one embodiment, the displayed MAP GUI content may be automatically and/or dynamically updated in response to each "zoom" operation.

In at least one embodiment, the size, color, and/or shape of a displayed map icon may be used to differentiate between "single venue" map icons (e.g., where the map icon represents a single venue) and "multiple venue" map icons (e.g., where the map icon represents a plurality of venues). For example, as illustrated in the example embodiment of FIG. 17, single venue icons may be represented using relatively smaller guitar pick icons (e.g., 1726) of lighter shading, and multiple venue icons may be represented using relatively larger guitar pick icons (e.g., 1724) of darker shading. In at least one embodiment, when the user's clicks on a multiple venue map icon (e.g., 1734), the Map GUI 1720 may respond by reloading or updating the displayed map view to zoom in on the geographic location of map region corresponding to the selected map icon, thereby displaying more granular details relating to venues (and related shows, artists, etc.) in the geographic region associated with the selected icon. In at least one embodiment, when the user's clicks on (or hovers the mouse cursor over) a single venue map icon (e.g., 1726), the Map GUI 1720 may respond by displaying Venue Info GUI (e.g., 1740) which may be configured to display various types of information and/or content relating to the specific venue(s) associated with the selected icon. Examples of such venue-related information may include, but are not limited to, one or more of the following (or combinations thereof): venue name and geographic location (1741); upcoming show information 1730 (which, for example, may include show date information 1742*a*, artist information 1742*b*, ticket availability information 1742*c*, etc.); and/or other types of information described and/or referenced herein. As illustrated in the example embodiment of FIG. 17, Venue Info GUI 1740 may include a "PLAY" button 1743 which, when clicked, may cause the MMMS System to dynamically generate and begin streaming a customized "Venue" DeliRadio Station which plays only songs by artists who have upcoming gigs at the selected venue (e.g., Sweetwater Music Hall, 1741) which match the filter criteria.

In at least one embodiment, at least a portion of the content and information displayed in the various GUIs described herein (and illustrated in the Figures) may be automatically and/or dynamically generated in real-time (e.g., by the MMMS Server System) in response to user interaction(s) with the GUIs. For example, when a user interacts with the Search Filter GUI (e.g., 1750, FIG. 17) on a client system or mobile device, information relating to the user's input and/or interactions with the Search Filter GUI may be automatically provided (e.g., in real-time) by the user's device/system to the MMMS Server System. In at least one embodiment, the MMMS Server System may respond to the received information by facilitating, initiating, and/or performing one or more of the following operation(s)/action(s) (or combinations thereof):

- analyzing received user input information relating to a user's input, filter-search criteria, GUI interaction, etc.
- automatically acquiring (e.g., from local and/or remote sources) updated information based on analysis of the received user input information (such as, for example, performing an updated search using updated filter-search criteria provided by the user; retrieving additional information relating to an artist, venue, or map icon selected by the user; creating a dynamic radio station based on the user's filter-search criteria; etc.)
- generating updated information and/or content using the acquired updated information;
- providing the updated information and/or content to the user's device for display to the user;
- caching at least a portion of the updated information and/or content at the user's device;
- and/or other operations and/or actions described and/or referenced herein.

Figure 18:
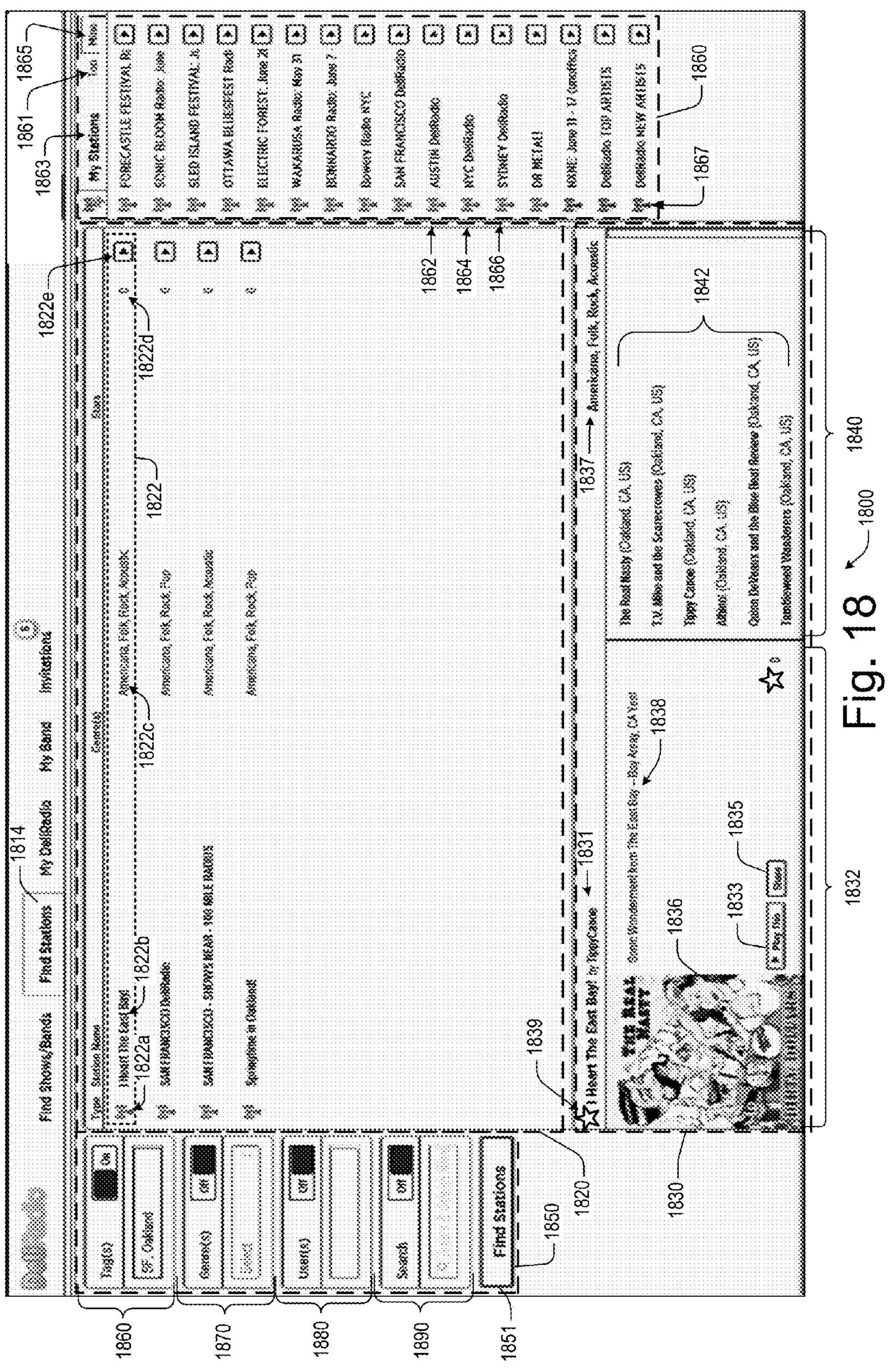

FIG. 18 shows an example screenshot of a Find Stations GUI 1800 in accordance with a specific embodiment. As illustrated in the example GUI embodiment of FIG. 18, the user is assumed to have clicked the Find Stations button 1851, directing the MMMS System to search its internal database and generate a dynamic, user-customized list of stations matching the search criteria. As illustrated in the example embodiment of FIG. 18, Find Stations GUI 1800 includes a Station Filter GUI 1850 which may include GUI features and/or functionality for enabling a user to initiate and display search results relating to artists and stations which match the user's specified search/filter criteria. In at least one embodiment, the Station Filter GUI may provide functionality for enabling the user to specify various types of filter criteria which, for example, may include, but is not limited to, one or more of the following (or combinations thereof):

- tag related filter criteria (1860);
- genre related filter criteria (1870);
- user related filter criteria (1880);
- keyword related filter criteria (1890);
- and/or other types of filter criteria described and/or referenced herein.

In the specific example embodiment of FIG. 17, it is assumed that the user has entered the tag phrases "SF" and "Oakland" in the Tag Filter input interface (1860), and initiated a search by clicking on the "Find Stations" button 1851. After the user's filtered search has been initiated, the content displayed in the Search Results GUI 1800 may be automatically and dynamically updated to include customized GUIs and content matching (or relating to) user's specified filter-search criteria. For example, as illustrated in the example embodiment of FIG. 18, the displayed search results includes a list of DeliRadio Stations that are associated with the tags "SF" and "Oakland". In at least one embodiment, each different station record (e.g., 1822) in the search results list may include various types of station-related information and/or features such as, for example, one or more of the following (or combinations thereof):

- Station type (e.g., 1822*a*), such as, for example, dynamic station type, static station type, etc.;
- Station name (e.g., 1822*b*);
- Station Genre information (e.g., 1822*c*)
- Station Tag information;
- Number of stars awarded (e.g., 1822*d*), for example, by one or more users;
- Play Station button (e.g., 1822*e*) which, when clicked by a given user, initiates playing of the selected station's streamed content to the user's system;
- Station creator information;
- and/or other types of MMMS System related information described herein.

In at least one embodiment, the user may highlight or select a desired station record from the Search Results GUI 1820 in order to access additional information and/or features relating to the highlighted/selected station (and related artists, songs, etc.). For example, in the specific example embodiment of FIG. 18, it is assumed that the user selects the station record 1822. In response, additional information and/or content about the selected station may be displayed in Station Info GUI 1830. For example, as illustrated in the example embodiment of FIG. 18, Station Info GUI 1830 may display one or more of the following types of information about the artist/band (or combinations thereof):

- Station Name 1831;
- Station description 1838;
- Image and/or Video content 1836;
- Station Genre Information 1837;
- Station Tag associations;
- Names of Artists/Bands (and their associated hometowns) associated with the station (1842);
- Song information (e.g., names of songs played, user ratings of songs, play counts, etc.);
- Related and/or recommended stations, artists;

As illustrated in the example embodiment of FIG. 18, Station Info GUI 1830 includes a "Play Station" button 1833 which, when clicked by the user, may dynamically generate and begin streaming songs from the selected DeliRadio Station to the user's system. In at least one embodiment, the user may share details about the selected station with other users and/or social networks. If desired, the user may add the selected DeliRadio Station to the user's "My Stations" list (e.g., 1863) by clicking on the "star" icon (1839).

Figure 19:
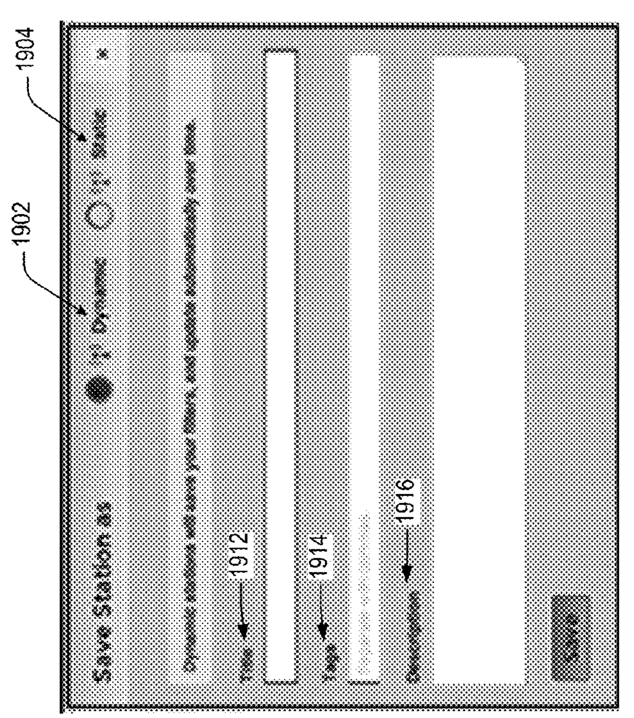

In the specific example embodiment of FIG. 19, it is assumed that the user has clicked a Save Station Button (e.g., 915, FIG. 9), thereby causing display of a Save Station As Panel GUI (e.g., 1900). In at least one embodiment, GUI 1900 provides functionality for one or more of the following features (or combinations thereof):

- Enables users to save the current station as either a Dynamic or Static station. Dynamic stations save the user's filters, and update automatically over time.
- Enables users to enter a title for the current station.
- Enables users to enter tags for the current station.
- Enables users to enter a description for the current station.

Figure 20:
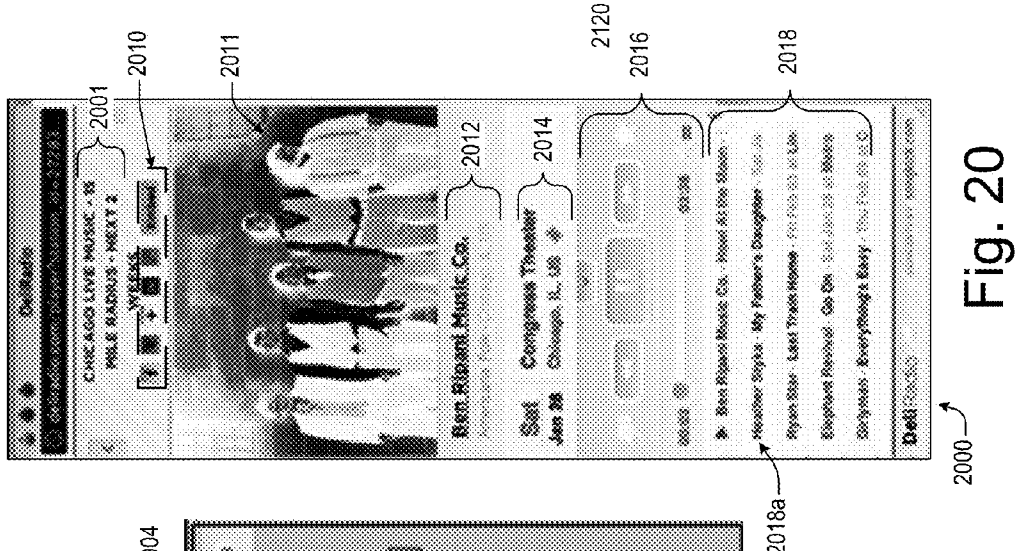

In the example embodiment of FIG. 20, it is assumed that the user has clicked a Play This Station Button (e.g., 913, FIG. 9), thereby causing display of a Station Player GUI (2000) which provides functionality for facilitating, initiating, and/or performing one or more of the following operation(s)/action(s) (or combinations thereof): one or more of the following features (or combinations thereof):

- Displays Station name and filter criteria used to generate the Station (2001).
- Plays a list of songs based on characteristics selected by the user in the Dynamic Station Filtering GUI. User may listen to the songs in the order played by the system, or randomly access any song of his/her choosing.
- Displays information (e.g., 2018) relating to songs of the Station (e.g., matching the filtered search criteria), along with related information such as, for example, artist name, upcoming show date(s) and venue information, etc.
- Enables users to view photos and/or other content (2011) posted by the currently-playing band on their profile.
- Enables users to pause/restart playback, adjust playback volume, and skip from point to point within the song.
- Enables users to share (e.g., 2010) the station to their social network profiles, email station URL to a friend, copy the station URL to the computer clipboard, or obtain the necessary code to embed the Station Player GUI on a website.
- Provides users with an interface (2016) for controlling music playback, including, for example, functionality for: enabling the user to select the previous or next station from the system-generated list of stations matching their search criteria; enabling the user to nix the Artist or Track, thereby instructing the system not to play the Artist or Track for the user again; enabling the user to Star the Band, Album, or Track currently playing, thereby adding the Band, Album, or Track to their MyDeliRadio collection.
- Enables users to click on the hyperlinked band name (e.g., 2012) to visit the band's full DeliRadio profile.
- Shows information about the currently-playing band's next performance (e.g., 2014), such as, for example, one or more of the following (or combinations thereof): date, venue name and location, and a link to buy tickets to that show.

Figure 21:
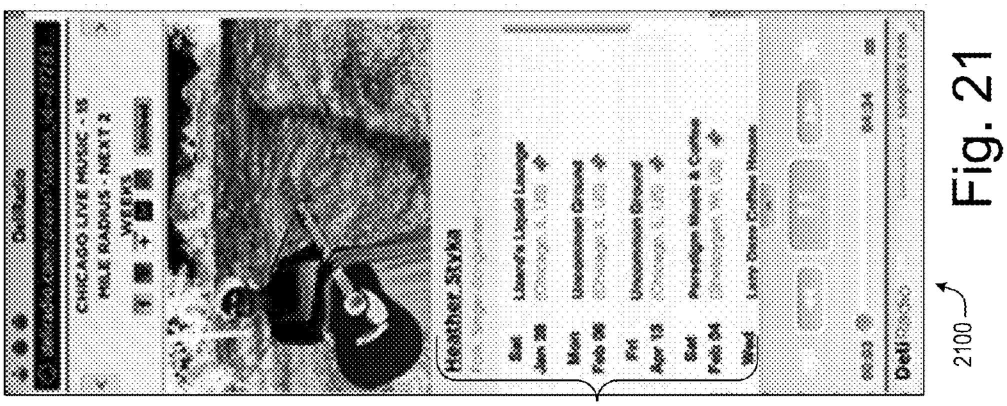

In the specific example embodiment of FIG. 21, it is assumed that the user has clicked the on a selected artist name (e.g., 2018*a*) displayed in the Station Player GUI of FIG. 20 to thereby cause GUI portion 2120 to dynamically display additional and/or updated information relating to the selected artists such as, for example, upcoming shows, tour dates, venue information, ticket availability, etc.

Figure 22:
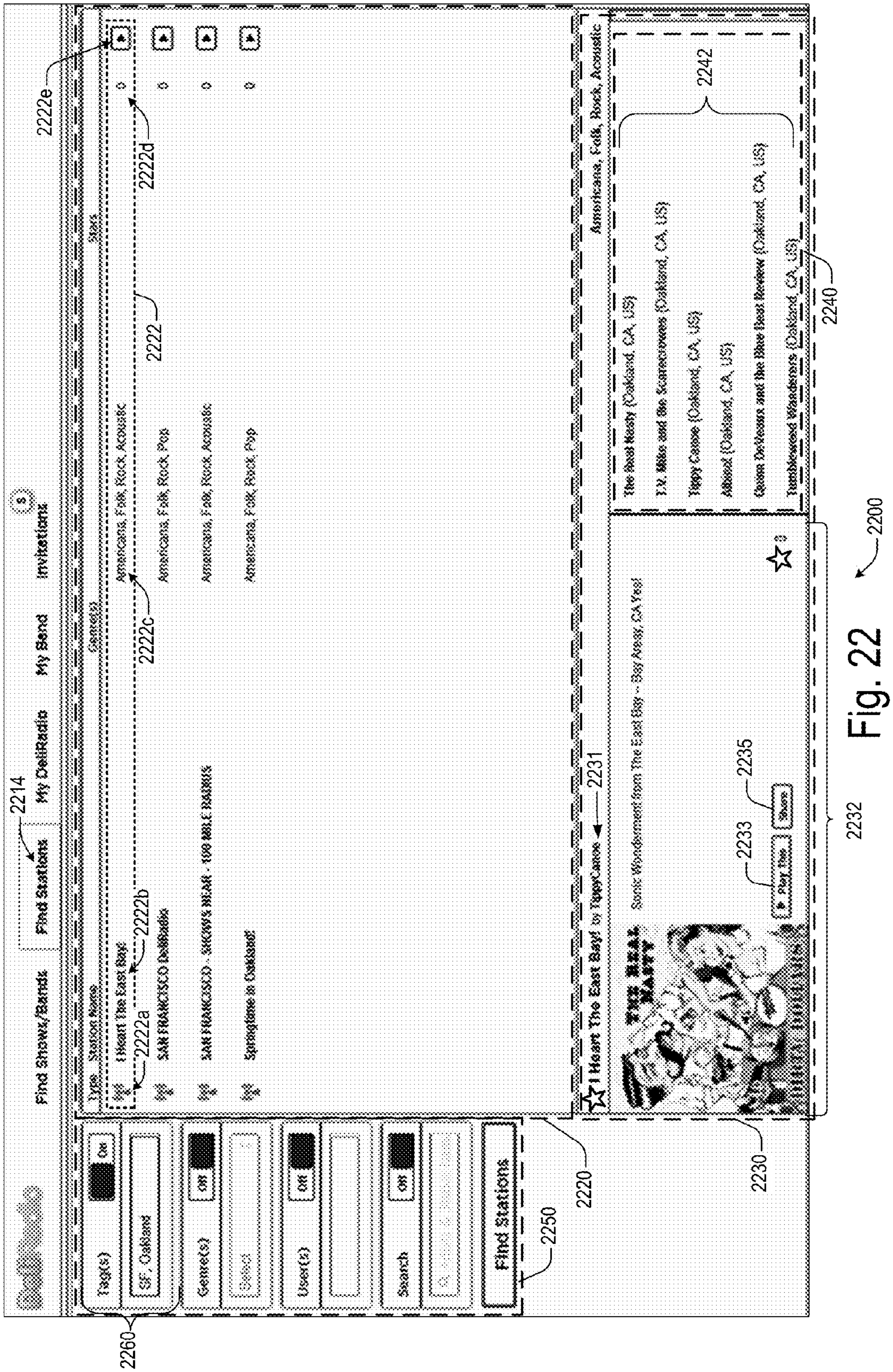

FIG. 22 shows an enlarged portion of the example screenshot of Find Stations GUI 1800 of FIG. 18.

Figure 23:
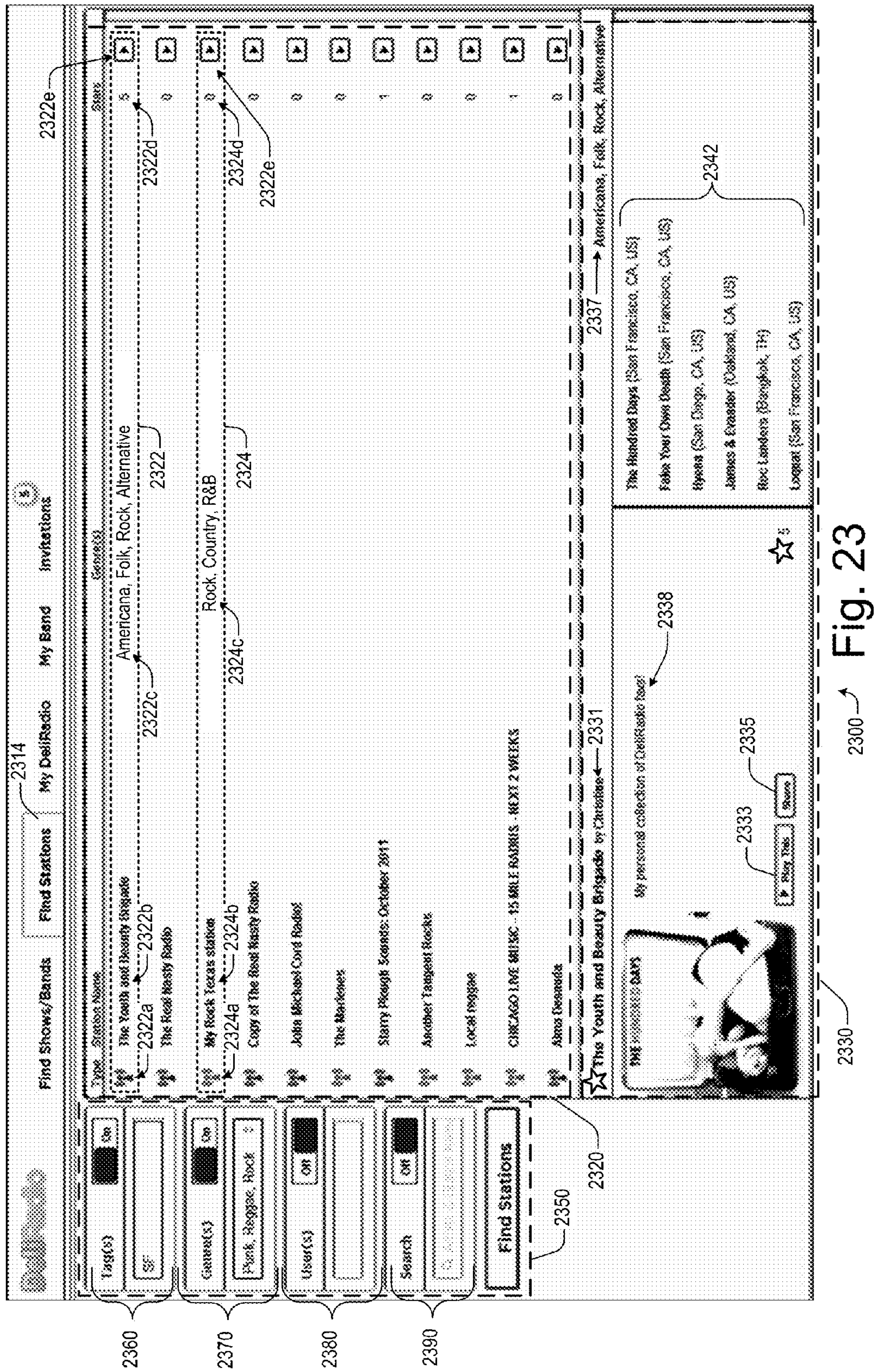

FIG. 23 shows an example screenshot of a Find Stations GUI 2300 in accordance with a specific embodiment. As illustrated in the example embodiment of FIG. 23, the user is assumed that the user has initiated a search for DeliRadio Stations matching the following filter criteria: tag filter criteria (2360): "SF"; genre filter criteria (2370): punk, reggae, or rock; user filter criteria (2380): all users (default); keyword filter criteria: none (default).

After the user's filtered search has been initiated, the content displayed in the Search Results GUI 2320 may be automatically and dynamically updated to include customized GUIs and content matching (or relating to) user's specified filter-search criteria. For example, as illustrated in the example embodiment of FIG. 23, Search Results GUI 2320 may include a list of DeliRadio Stations (e.g., 2322, 2324, etc.) which have been determined to match the user's specified filter-search criteria.

In at least one embodiment, the user may highlight or select a desired station record from the Search Results GUI 2320 in order to access additional information and/or features relating to the highlighted/selected station (and related artists, songs, etc.). For example, in the specific example embodiment of FIG. 23, it is assumed that the user selects the station record 2322. In response, additional information and/or content about the selected station may be displayed in Station Info GUI 2330. In at least one embodiment, Station Info GUI may be configured or designed to provide functionality for facilitating, initiating, and/or performing one or more of the following operation(s)/action(s) similar to those described previously, for example, with respect to FIG. 18. In some embodiments, the Find Stations by Genre functionality may also be configured or designed to provide other types of information, content or functionality, such as, for example, one or more of the following (or combinations thereof):

- Search the databases of external websites (such as, for example: allmusic.com, gracenote.com, facebook.com, myspace.com, etc) for bands which have been tagged with the selected genre and generate a dynamic, user-customized station populated with songs by these bands.
- Find Stations which have been tagged with the selected genre playing music created by members of the user's social graph.

Figure 24:
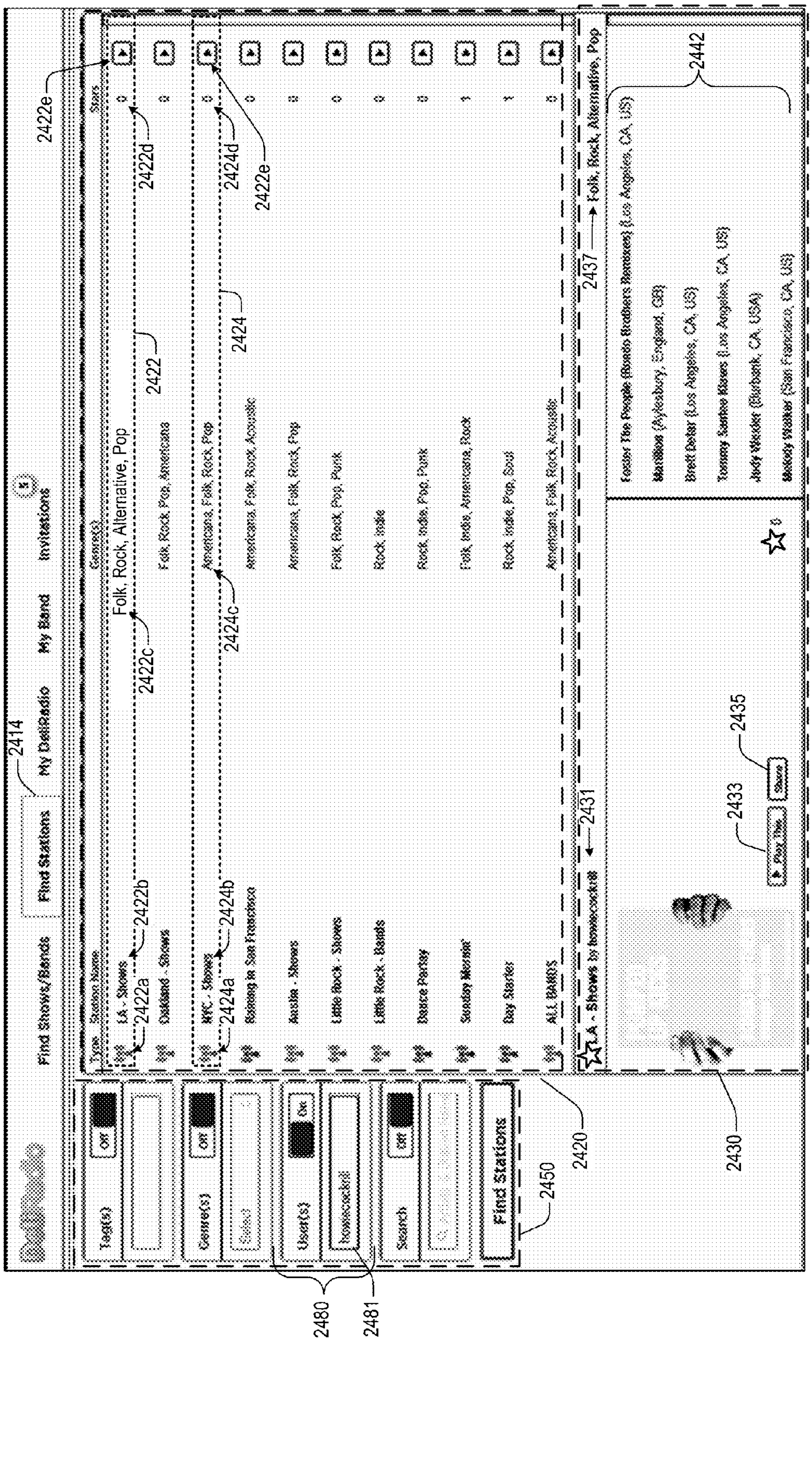

FIG. 24 shows an example screenshot of a Find Stations GUI 2400 in accordance with a specific embodiment. As illustrated in the example embodiment of FIG. 24, the user is assumed that the user has initiated a search for DeliRadio Stations matching the following filter criteria: tag filter criteria (2460): all tags (default); genre filter criteria (2470): all genres (default); user filter criteria (2480): howiecockrill; keyword filter criteria: none (default).

After the user's filtered search has been initiated, the content displayed in the Search Results GUI 2420 may be automatically and dynamically updated to include customized GUIs and content matching (or relating to) user's specified filter-search criteria. For example, as illustrated in the example embodiment of FIG. 24, Search Results GUI 2420 may include a list of DeliRadio Stations (e.g., 2422, 2424, etc.) which are associated with the user name "howiecockrill".

In some embodiments, the Find Stations by Username functionality may also be configured or designed to provide other types of information, content and/or functionality, such as, for example, one or more of the following (or combinations thereof):

- Search the databases of external websites (such as one or more of the following [or combinations thereof]: spotify.com, facebook.com, myspace.com) for songs which have been favorited by the user associated with the currently-selected username and generate a dynamic, user-customized station populated with the identified songs.
- Find Stations playing music created by members of the user associated with the currently-selected username's social graph.
- Find Stations playing music created by user associated with the currently-selected username.
- Allow the user to purchase music featured in stations created by user associated with the currently-selected username, thereby generating an affiliate fee for user associated with the currently-selected username.

Figure 25:
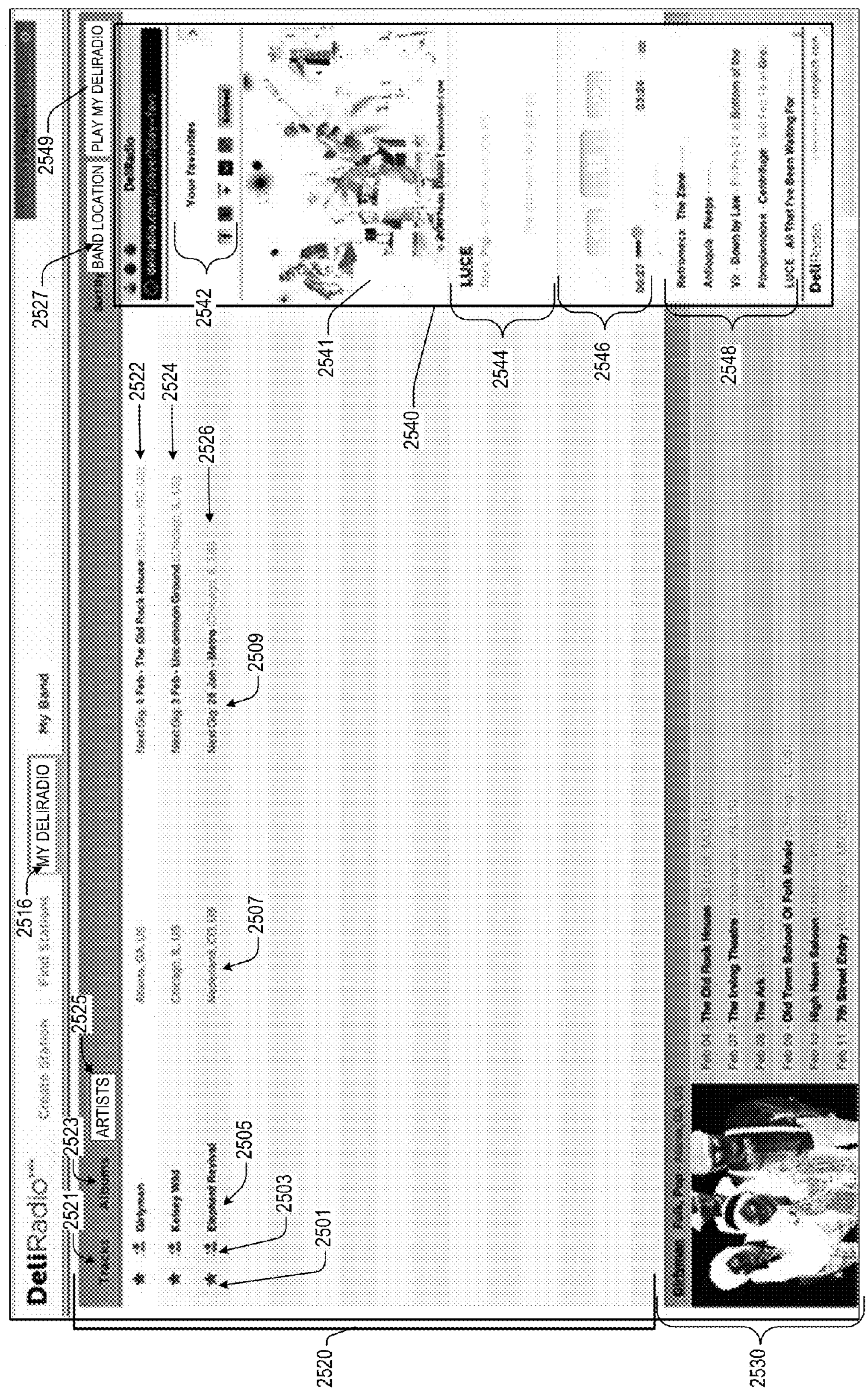
Figure 26:
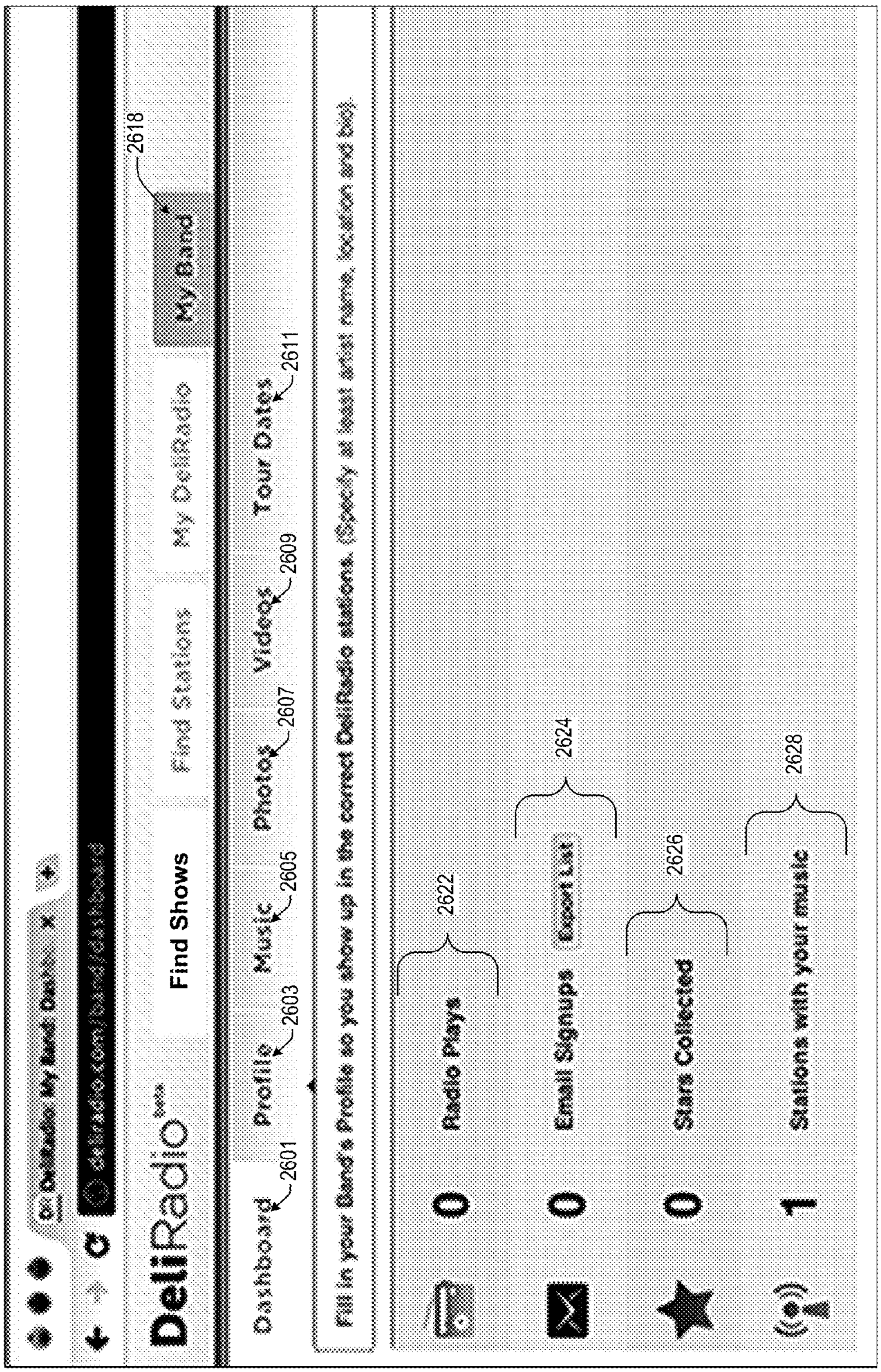

FIG. 25 shows an example screenshot of a My DeliRadio 2500 in accordance with a specific embodiment. In at least one embodiment, the My DeliRadio GUI may display customized information and content relating to the user's preferred tracks, albums, artists, venues, stations, etc. In at least one embodiment, the My DeliRadio GUI may display a list of one or more artists that the user has Starred to add to his/her personal collection. At least one artist listing includes the artist name, hometown, and upcoming tour date(s) and related venue information. In one embodiment, the user may select an artist (e.g., 2522) displayed in the My DeliRadio GUI to cause additional information about the selected artist (e.g., Girlyman) to automatically be displayed in the Artist Info GUI 2530. In at least one embodiment, the Artist Info GUI may be configured or designed to provide functionality for one or more of the following features (or combinations thereof):

- Display a photo of the artist associated with the currently selected track
- Display the name of the artist associated with the currently selected track, along with that artist's primary and secondary music genre and hometown
- Display upcoming tour dates for the artist associated with the currently selected track. Clicking on a tour date opens the Songkick.com profile page associated with that tour date.
- Display a list of albums by the artist associated with the currently selected track, with artwork and track listing for at least one album
- A "Play This Artist" Button that enables the user to play a DeliRadio Station populated with song by the artist associated with the currently selected track
- A "View Profile" Button that enables the user to view the profile page for the artist associated with the currently selected track In the example embodiment of FIG. 25, it is assumed that the user has clicked the "Play My DeliRadio" Button 2549, which may cause a Player GUI 2540 two automatically be displayed at the client system/device. In at least one embodiment, the Player GUI may be configured or designed to provide functionality for one or more of the following features (or combinations thereof):

- Play an automatically generated list of songs, the constituents of which meet one or more of the following criteria (or combinations thereof):
  - User has Starred the specific song currently playing
  - User has Starred the artist associated with the song currently playing
  - User has Starred the album associated with the song currently playing
- Enable users to listen to the songs in the order played by the system, or randomly access any song of his/her choosing
- Enable users to click through and view any of the photos posted by the artist associated with the song currently playing to his/her artist profile
- Enable users to share the player GUI on his/her social network profiles, email a link to the player, copy the URL for the player GUI, or obtain the necessary code to embed the player GUI on another website.
- Enable users to select the previous or next station from the generated list of stations
- Enable users to Nix the Artist or Track, thereby instructing the system not to play the Artist or Track for the user in the future. User may also Star the Band, Album, or Track currently playing, thereby adding it to the user's list of favorite bands, albums, or tracks Display a hyperlinked band name just beneath the photo display area which users may click to visit the band's full DeliRadio profile Informs the user that the artist associated with the song currently playing has no current tour dates Enable users to pause/restart playback, adjust playback volume, and skip from point to point within the song FIG. 26 shows an example screenshot of a My Band GUI 2600 in accordance with a specific embodiment. In at least one embodiment, the My Band GUI 2600 may be visible to users who have indicated during the initial DeliRadio signup process that they are members of a band. In at least one embodiment, the My Band GUI may be configured or designed to include functionality for initiating, performing and/or managing operations/activities relating to one or more of the following (or combinations thereof):

My Band Dashboard GUI 2601 which lists various DeliRadio System statistics concerning the current user's band and music.

My Band Profile GUI 2603 which enables users to enter, edit and examine information related to their band profile.

My Band Music GUI 2605 which enables users to upload tracks, associate various metadata with at least one track, and examine information related to at least one track.

My Band Photos GUI 2607 which enables users to upload photos, associate various metadata with at least one photo, and examine information related to at least one photo.

My Band Videos GUI 2609 which enables users to add videos, associate various metadata with at least one track, and examine information related to at least one video.

My Band Tour Dates GUI 2611 which enables users to add and manage tour dates, as well as sync their DeliRadio tour calendars with their SongKick.com profiles.

In the specific example embodiment of FIG. 26 it is assumed that the user has selected the Dashboard Tab 2601, thereby causing the My Band GUI to effectively configured as a My Band Dashboard GUI. In at least one embodiment, the My Band Dashboard GUI, may be configured or designed to display customized statistics relating to the user/artist, such as, for example, one or more of the following (or combinations thereof):

Number of Radio Plays—For example, number of times one or more of the artist's songs have been played on DeliRadio System radio stations over a specified time period;

Number of Email Signups to the user's mailing list (Artist may also click a button to Export a List of Email Signups);

Number of Stars Collected, indicating how many times DeliRadio users have favorited the user's band, or songs or albums by that band;

Number of Stations playing music by the user's band;

and/or other information, content, statistics described and/or referenced herein.

In some embodiments, the My Band GUI may also be configured or designed to provide other types of information, content or functionality, such as, for example, one or more of the following (or combinations thereof):

A list of tracks and albums by the user's band which have been Starred, listed from Most Starred to Least Starred, with the total number of Stars accrued listed next to at least one track or album name.

A display listing at least one track and album along with information related to at least one track and album, such as, for example, one or more of the following (or combinations thereof):

Number of times users have listened to the entire track or album;

Number of times users have listened to a partial track or album before skipping to the next track or album, pressing the pause button, or switching to another station;

Average amount of at least one track or album one or more users have listened to, expressed in minutes: seconds of runtime.

A list of photos uploaded by the user which have been Starred, listed from Most Starred to Least Starred, with the total number of Stars accrued listed next to at least one photo.

A list of videos added by the user which have been Starred, listed from Most Starred to Least Starred, with the total number of Stars accrued listed next to at least one video.

A display listing at least one video along with information related to at least one video, such as, for example, one or more of the following (or combinations thereof):

Number of times users have watched the entire video;

Number of times users have watched a portion of the video before skipping to the next video, pressing the pause button, or switching to another DeliRadio page;

Average amount of at least one video users have watched, expressed in minutes:seconds of runtime.

A list of items (songs, albums, band merchandise, show tickets) downloaded or purchased from the user's band along with information related to at least one download or purchase, such as, for example, one or more of the following (or combinations thereof): Trail Icon which, when clicked, generates a popup modal Purchase Trail GUI graphically depicting the actions taken by the downloader/purchaser inside the DeliRadio System leading up to the download/purchase (e.g.: Logged on to system, Crunched station playing bands from hometown San Francisco, listened to these seven bands, listened to 1:30 of song by user's band before clicking link to user's band profile page, clicked Download Button in one of user's band's album listings, clicked Buy Album Now Button).

A list of merchandise (shirts, stickers, physical recordings, etc.) offered by the user's band which have been purchased, listed from most frequently purchased to least frequently purchased, with the total amount of revenue generated by an individual item listed next to that item's name. In some embodiments, one or more merchandise orders within the DeliRadio System may sent directly to a third party fulfillment house, which handles the entire subsequent purchase flow and remits to the currently selected band's DeliRadio account.

A list of users whom the DeliRadio System has algorithmically determined to be potential fans of the user's band. At least one of these user listings features a Message Button which may be clicked to invite the user to check out the currently selected band, and sends a link which automatically opens the currently selected band's Band Profile Page and generates a Band Player GUI loaded with the band's music.

Spotlight Contact Alerts: An indicator alerting user to the existence of messages from site users logged in to the DeliRadio System through the Spotlight Interface. This interface is an example embodiment of the site optimized for and marketed to entertainment industry professionals, including venue owners, label A&R staff, music publishers, filmmakers, and others. An important feature of this example embodiment is the placement on the home page of charts generated by automated filtered system searches of the DeliRadio database for tracks, albums, stations, photos, videos, downloads, purchases and artists receiving the most attention from DeliRadio users. Qualifying forms of attention might include one or more of the following (or combinations thereof):

Greatest number of Stars from DeliRadio users

Greatest total revenue accrued, categorized by song, album, artist, or item of merchandise (at least one artist may choose whether to make these figures public for any or one or more of these categories)

Greatest total number of units sold or given away, categorized by song, album, artist, or item of merchandise (at least one artist may choose whether to make these figures public for any or one or more of these categories)

Greatest total number of downloads for any song, album or artist

At least one listing displayed in a chart on the Spotlight Interface homepage features a Contact Button, which the user may click to contact the band associated with that listing. These messages trigger Spotlight Contact Alerts in that band's My Band GUI, which the user associated with that band may open and read.

Provide functionality for enabling an band/artist to authorize other artists to cover one or more songs. For example, in at least one embodiment, the DeliRadio website may include functionality for allowing a given band/artist to identify/select one or more original songs by that band/artist, and to authorize other bands/artists to upload cover versions of one or more of the identified original song(s). In at least one embodiment, such permissions may only be effective within the DeliRadio System. In one embodiment, if a band (e.g., Band B) covered an original song from a different band (e.g., Band A)—that info may be displayed in the music player along with links to the original song and/or cover song.

Figure 27:
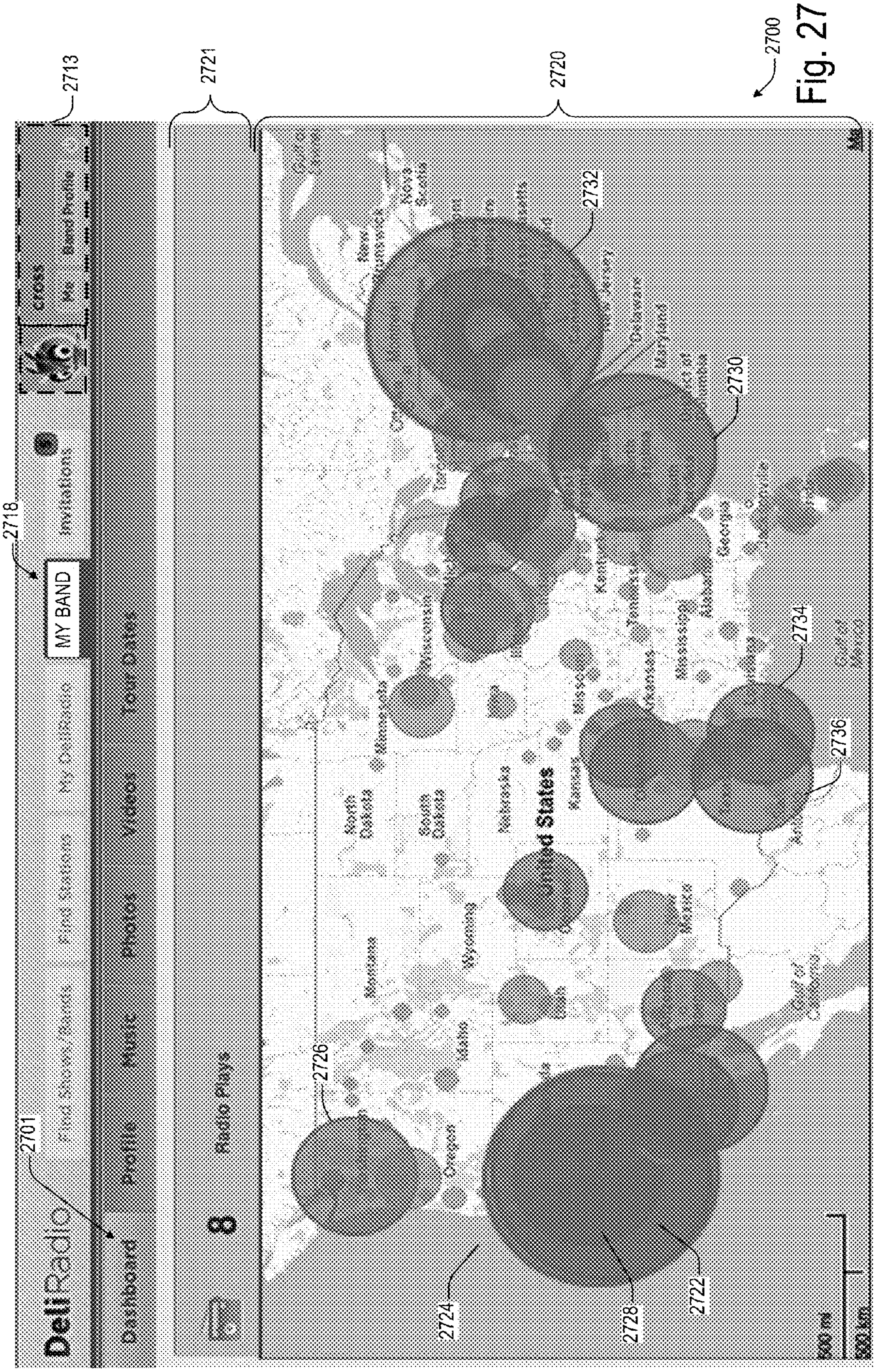

FIG. 27 shows an example screenshot of a Play Traction Heat Map GUI 2700 in accordance with a specific embodiment. In at least one embodiment, as illustrated in the example embodiment of FIG. 27, for example, artists may view an interactive world map overlaid with "heat zones" indicating where and to what degree listeners have been streaming that artist's music. According to different embodiments, artists may switch modes to view mobile plays, website plays, or both combined. The potential exists for the artist to further hone this map to a specific album or track.

Figure 28:
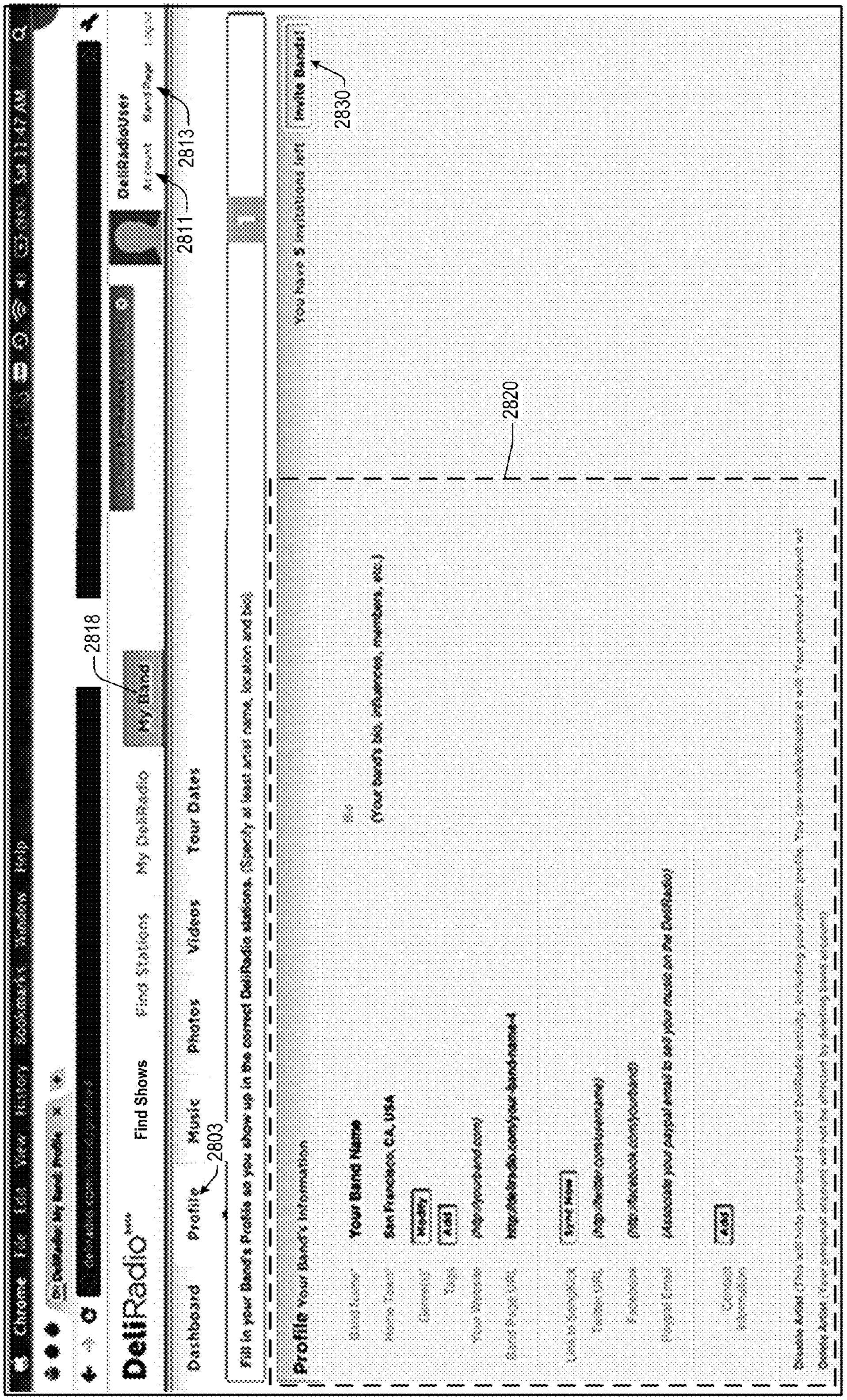
Figure 30:
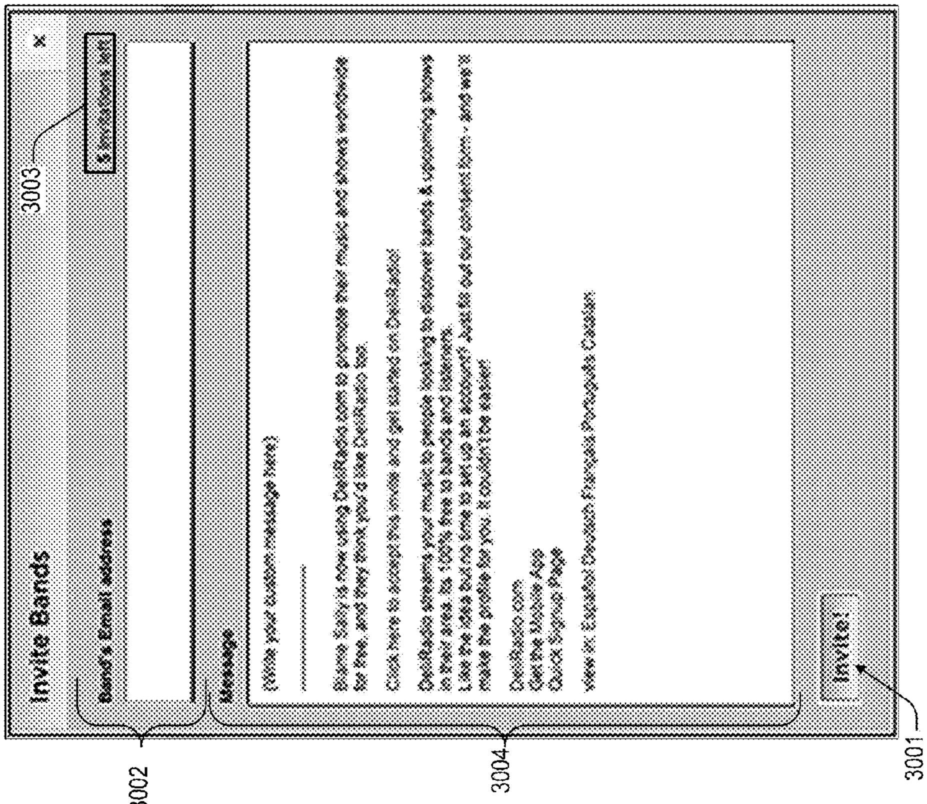
Figure 29:
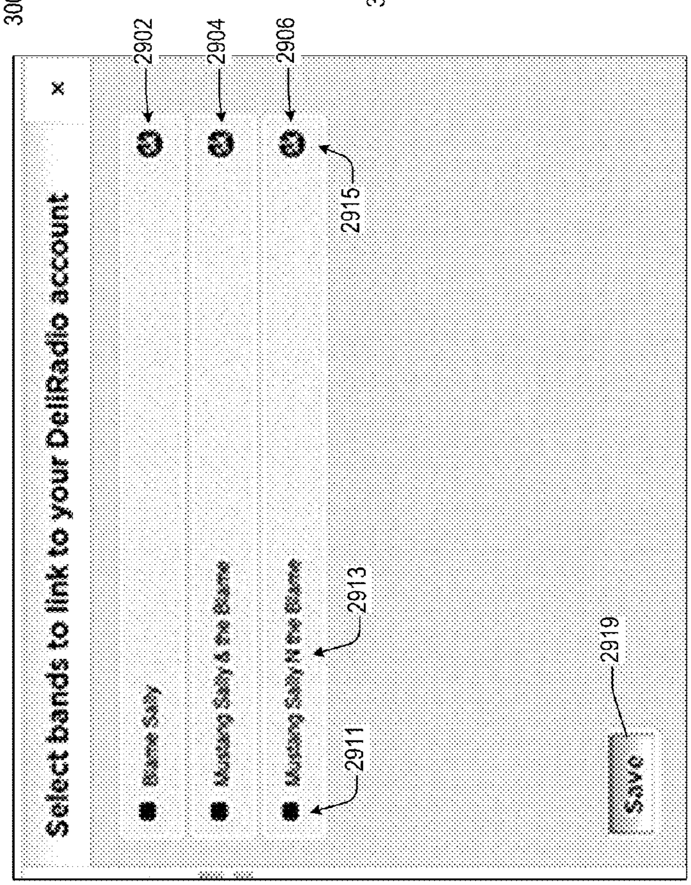

The example embodiments of FIGS. 28-30 illustrate various features and/or functions relating to the Profile Tab (e.g., 2803) of the My Band Profile GUI 2800. In at least one embodiment, the My Band Profile GUI may be configured or designed to enables the user to enter, link, and/or upload information and/or content relating to the user's band, such as, for example, one or more of the following (or combinations thereof): Band name; Home Town; Genre(s); Tags; URL for the band's website; URL for the band's DeliRadio page; A link to the band's Songkick profile, which integrates tour information and the ability to sell tickets directly into the band's DeliRadio profile; Links to the band's Twitter and Facebook profiles; A Paypal email address, which enables a band to sell music directly to fans from their DeliRadio profile; Contact information; Biographical information; etc.

According to different embodiments, the user may click on the Find Shows Tab, Find Stations Tab, or My DeliRadio Tabs to access GUIs providing other functionalities. In one embodiment, the user may also click on a My Account (e.g., 2811, FIG. 28) button to view details regarding his/her DeliRadio account. In one embodiment, the user may click on a Band Page button (e.g., 2813, FIG. 28) to open a profile page for the user's band. In one embodiment, the user may also click a Disable Artist link to cause the MMMS System to hide user's band from one or more DeliRadio activity, or may click on a Delete Artist link to completely removing the band from the DeliRadio System. The user may also click the Invite Bands! Button 2830 to invite potential users/artists to join the DeliRadio System.

FIG. 29 shows an example screenshot of a GUI 2900 which may be configured or designed to enable a user (e.g., who is an artist or member of a band) to link the user's band (e.g., which, for example, may be identified from external or third party sources such as Songkick.com) to the user's DeliRadio account.

FIG. 30 shows an example screenshot of a GUI 3000 which may be configured or designed to enable a user (e.g., who is an artist or member of a band) to send invitations to other artists/bands to join (or sign up their band(s) at) the DeliRadio System.

Figure 31:

FIG. 31 shows an example screenshot of a My Band Music GUI 3100 in accordance with a specific embodiment. In the example embodiment of FIG. 31, it is assumed that the user has located multiple audio files on his/her computer (and/or at one or more locations in cloud-based storage) and had designated the identified audio files for upload to the DeliRadio System. In at least one embodiment, the My Band Music GUI may be configured or designed to enable the user to perform one or more of the following functions (or combinations thereof):

Click the Add More Tracks button 3127 to upload additional audio files;

Click the Add Album icon 3142 to add a new album and associated metadata to the system;

Configure the Select Album drop-down menu 3125 to select the album that one or more the audio files are to be added to;

Configure the drop-down menu(s) 3133 to select the album that at least one individual audio file is to be added to;

Select one or more audio files to be deleted 3123 from the Upload queue, or linked 3133 to a particular album;

Click the Upload Now button 3129 to initiate uploading of one or more selected audio files to the DeliRadio System;

In some embodiments, the My Band GUI may also be configured or designed to provide other types of information, content or functionality, such as, for example, an Add Lyrics button, which enables users to enter lyric information for the song represented by at least one audio file. In one embodiment, the lyrics are an element of the metadata associated with the file, and assist in surfacing the file in various DeliRadio System searches. In some embodiments, the DeliRadio System may be configured or designed to provide a Music Licensing GUI, which offers a mechanism by which music supervisors and other potential music licensees may find music to license for their projects. The ability to search the DeliRadio System database for words featured in song lyrics, provided in some embodiments, is particularly practical for such users.

Figure 32:
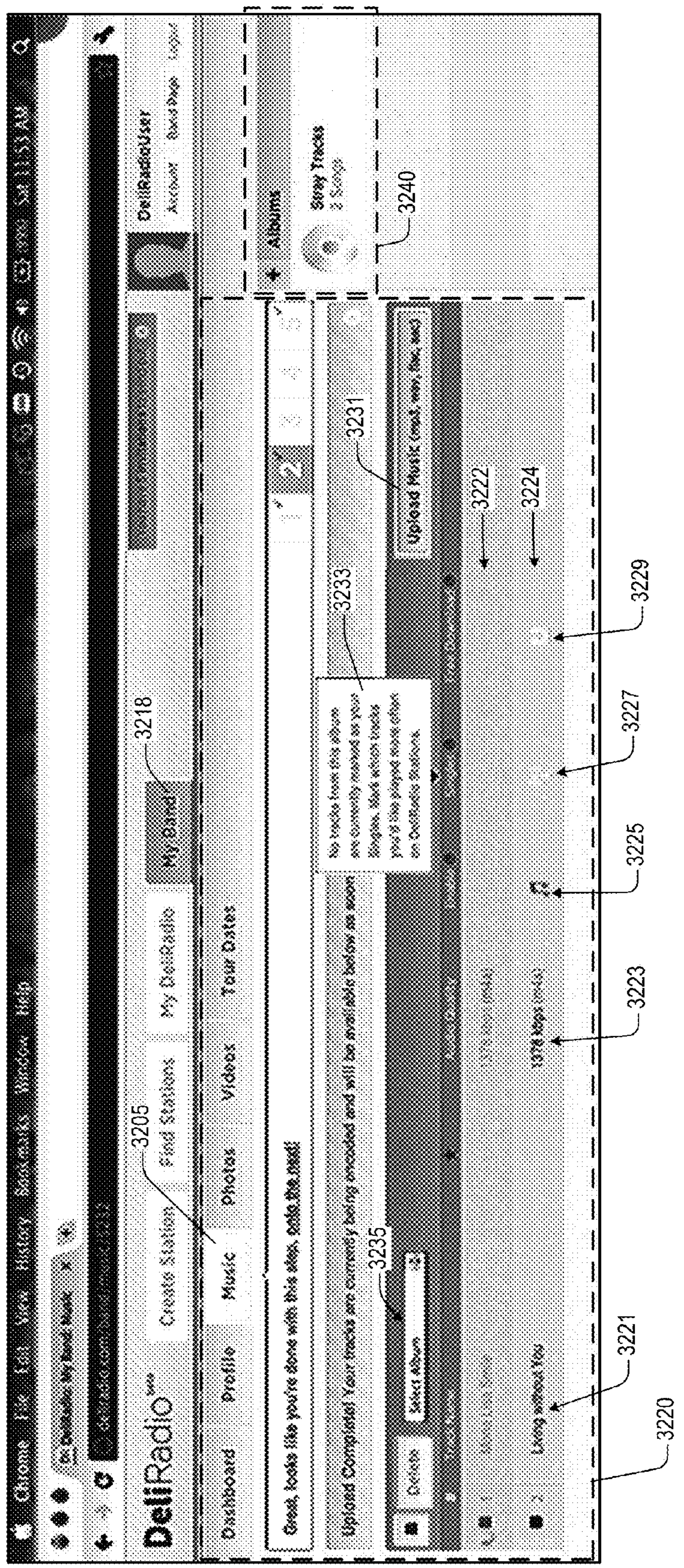

In the specific example embodiment of FIG. 32, it is assumed that the user initiated the transfer of one or more selected audio files (e.g., from the user's computer or other source) To the DeliRadio System, and that one or more audio files have been successfully uploaded. As illustrated in the example embodiment of FIG. 32, the My Band Music GUI 3200 may display a message or notification to the user (e.g., Mark Tracks as Singles Prompt 3233), which informs the user that no tracks from this album are currently marked as singles, and encourages the user to mark one or more tracks as singles. In one embodiment, tracks marked as "singles" may be played more often in the DeliRadio System.

Figure 33:
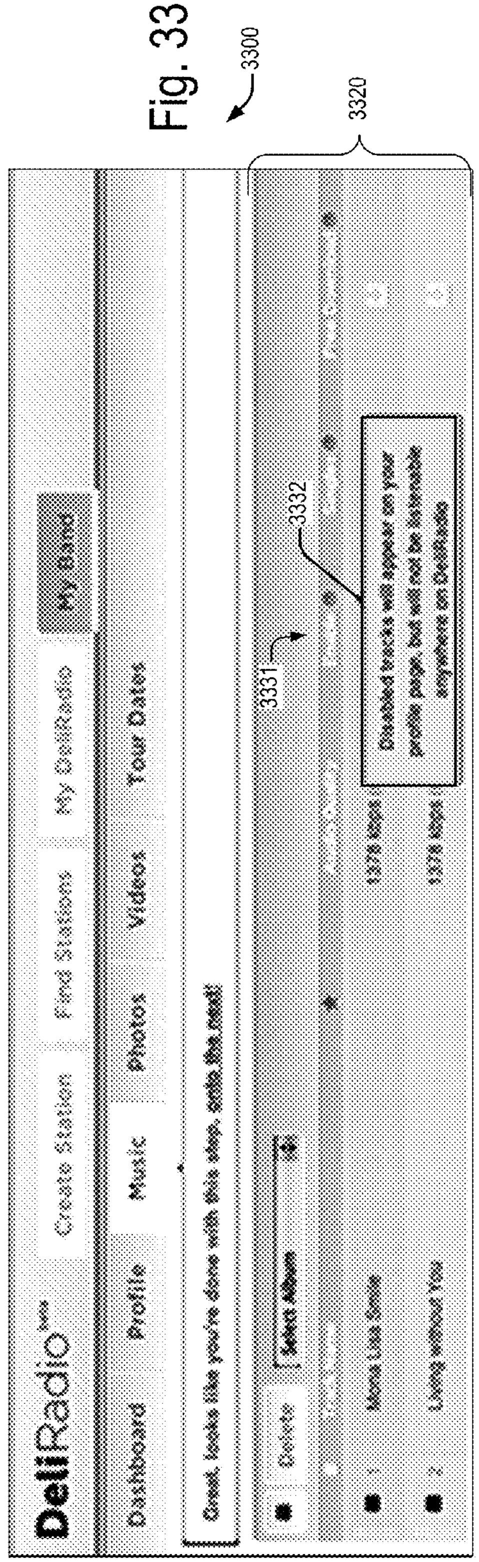

In the specific example embodiment of FIG. 33, it is assumed that the user has selected or hovered the mouse cursor over the Enable column (3331), thereby causing display of an Enable Tracks Description pop-up message 3332 which includes information relating to the enabling/disabling a track. In one embodiment, enabled tracks are available to be played throughout the DeliRadio System, whereas disabled tracks may appear on the user's profile page but may not be played anywhere on DeliRadio.

Figure 34:
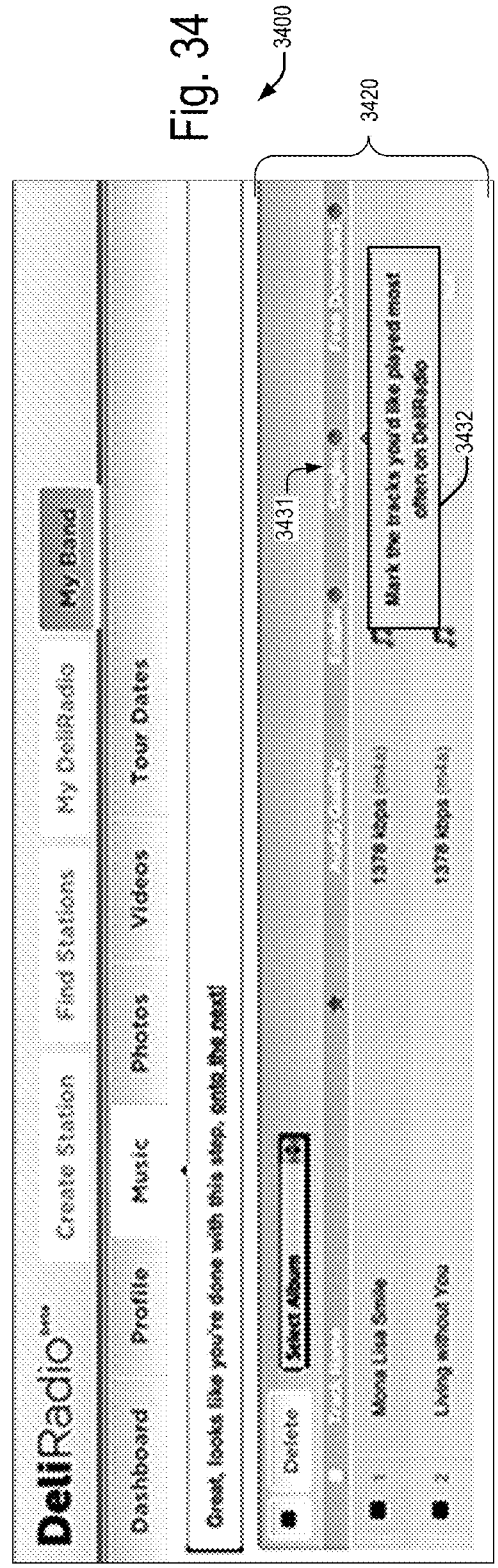

In the specific example embodiment of FIG. 34, it is assumed that the user is hovering the mouse cursor over the Single column 3431, thereby causing display of a Tracks Description pop-up message 3432 which includes information relating to the marking/un-marking of a track as a Single.

Figure 35:
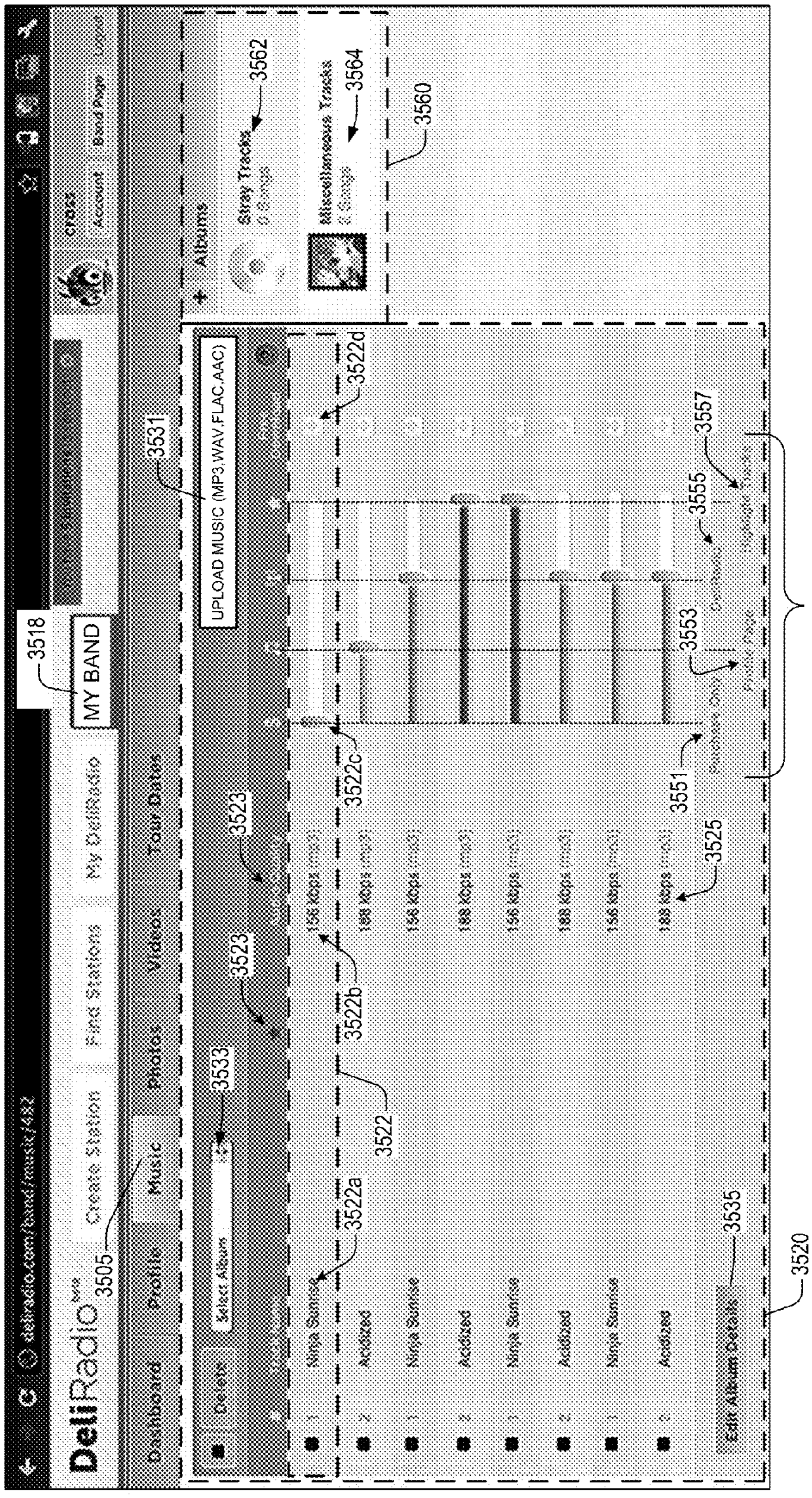

FIG. 35 shows an example screenshot of a Track-Level Control GUI 3500 in accordance with a specific embodiment. In at least one embodiment, when an artist uploads audio recordings to the DeliRadio System, the Track-Level Control GUI provides the artist with fine-grain control over whether and how the artist's recordings are made available and promoted across the internet (e.g., based on a "promotional sliding scale" that increases by degree of public availability). In at least one embodiment, the Track-Level Control GUI may be configured or designed to include content and/or functionality for enabling a user to Assign and manage usage permissions and promotional permissions on a per-track basis. For example, as illustrated in the example embodiment of FIG. 35, using the Track Permissions Slider GUI 3550, a user is able to individually adjust and assign the usage/promotional permissions for a selected track (e.g., 3522) by dynamically adjusting the corresponding Track Permissions Slider GUI (e.g., 3522*c*) to a desired setting. In at least one embodiment, the Track-Level Control GUI may provide the user with a number of different preconfigured settings to chose from, which may include, but are not limited to, one or more of the following types of preconfigured permission settings (or combinations thereof):

- For Sale Only 3551: Tracks marked as "for sale only" are not streamable anywhere on DeliRadio, but downloads may be purchased on the artist's DeliRadio profile page by listeners.
- Profile Only 3553: Tracks marked as "profile only" are streamable only on the artist's DeliRadio profile page via the Pop-Out Player (which may also be embedded elsewhere on the internet), but these tracks will not be included in the pool of tracks available for stations created by DeliRadio users and stations automatically generated by DeliRadio.
- Radio Enabled 3555: Tracks marked as "radio enabled" will be streamable on the artist's DeliRadio profile page via the Pop-Out Player, and will also be included in the pool of tracks available for stations created by DeliRadio users and automatically generated by DeliRadio.
- Radio Preferred 3557: Same as Radio Enabled, but "Radio Preferred" tracks will be played first when this artist appears in a DeliRadio station.
- Free Download (e.g., 3522*d*): This checkbox may be applied to any track, and will allow the free, promotional download of the marked track. Free downloads are available on the artist's DeliRadio profile.

Figure 36:
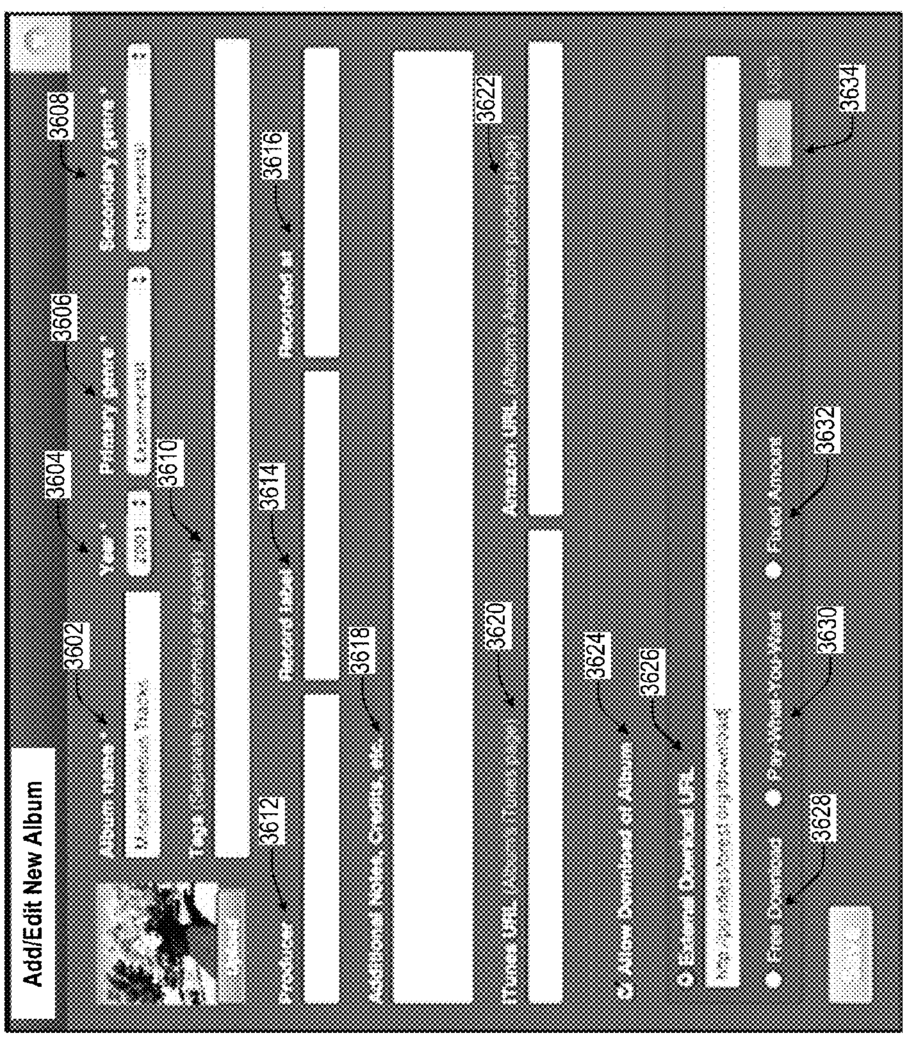

FIG. 36 shows an example screenshot of an Add/Edit Album GUI 3600 in accordance with a specific embodiment. In the specific example embodiment of FIG. 36, it is assumed that the user-artist has clicked the Select Album Drop Down Menu (e.g., 3235, FIG. 32). In response, the DeliRadio System may display a Select Album GUI which may include a list of the user-artist's albums which are already in the DeliRadio System database, and which may also include a "New Album" option. In the specific example embodiment of FIG. 36, it is assumed that the user-artist wishes to add a new album to the DeliRadio System database, and therefore selects the New Album option. In response, the DeliRadio System may display the Add/Edit Album GUI 3600, which enables the user to upload album artwork and to enter descriptive metadata including one or more of the following (or combinations thereof): Album name 3602; Year of album release 3604; Primary genre 3606; Secondary genre through 608; Tags describing aspects of the music 3610; Name of album Producer 3612; Record label name 3614; Location where album was recorded 3616; Additional notes, credits, etc. 3618; iTunes URL 3620; Amazon URL 3622; Availability of the album for download 3624; External download URL 3626; Download license type (e.g., free download 3628, pay what you want 3630, pay fixed amount 3632, fixed amount price 3634).

In at least one embodiment, the user-artist may select one of the listed albums from the Select Album GUI to edit or make modifications to the existing content and/or metadata associated with the selected album. In response, the DeliRadio System may display the Add/Edit Album GUI, and dynamically populate the fields of the displayed GUI with the currently saved content and metadata associated with the selected album. The user-artist may then edit or modify the contents of the GUI fields as desired, and then click Save to commit the changes to the DeliRadio System database.

In some embodiments, the Add/Edit New Album Window GUI may also be configured or designed to provide other types of information, content or functionality, such as, for example, one or more of the following (or combinations thereof):

- If the user checks a box to Allow Download of the album, a dialog opens where the user may click radio buttons to offer the album for Free Download, Pay-What-You-Want Download, or Download for a Fixed Amount.
- In this embodiment, if the user clicks either of the latter two radio buttons, a PayPal icon appears, along with the PayPal email address the user has entered into the DeliRadio System, and an edit link allowing the user to edit this email address.
- If the user has not entered a PayPal address into the DeliRadio System, the user may be prompted to do so.
- If the user clicks the Pay-What-You-Want radio button, a text field appears where the user is given the option of entering the lowest amount the user may accept in payment for the album download.
- If the user clicks the Download for a Fixed Amount radio button, a text field appears where the user may enter a fixed amount that the user may accept in payment for the album download.
- Search Web For Album functionality, which automatically and dynamically searches the Web at large for information concerning the album being added as soon as the user enters text in the Album name field, and then auto-populates one or more the remaining fields in the GUI when it finds that information.

In at least one embodiment, the user-artist may enter additional URLs for physical purchase and/or digital download of their albums. Digital sale URLs may link directly to the external site(s) when the 'Download' button is selected for a particular album, while external physical sale buttons may appear beneath the digital option, with the icon of the site's choosing.

Figure 37:
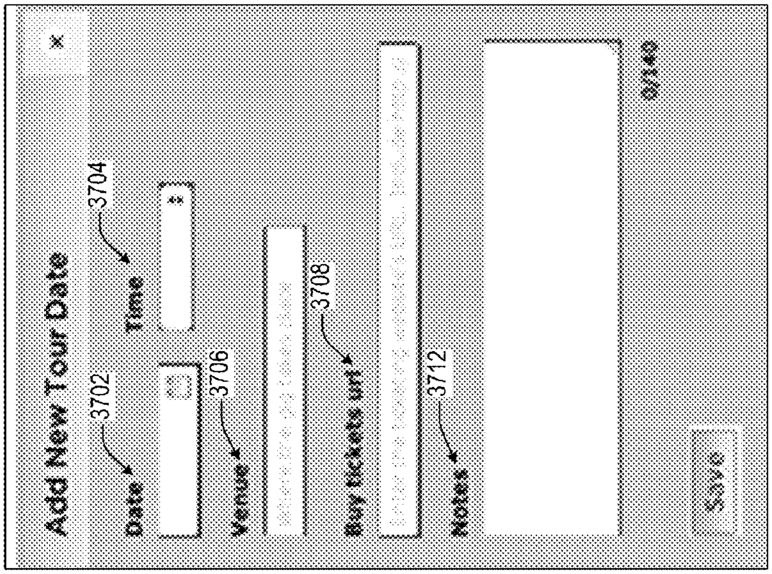

FIG. 37 shows an example screenshot of an Add New Tour Date GUI 3700 in accordance with a specific embodiment. In the specific example embodiment of FIG. 37, it is assumed that the user has clicked the Add Another Tour Date button (e.g., 3803, FIG. 38), thereby causing display of an Add New Tour Date GUI. In at least one embodiment, the Add New Tour Date GUI provides functionality for enabling the user to enter tour date information (e.g., relating to the users's band), such as, for example, one or more of the following (or combinations thereof): date of show; time of show; show venue; URL where tickets for the show are available; any notes pertaining to the new tour date; etc.

Figure 38:
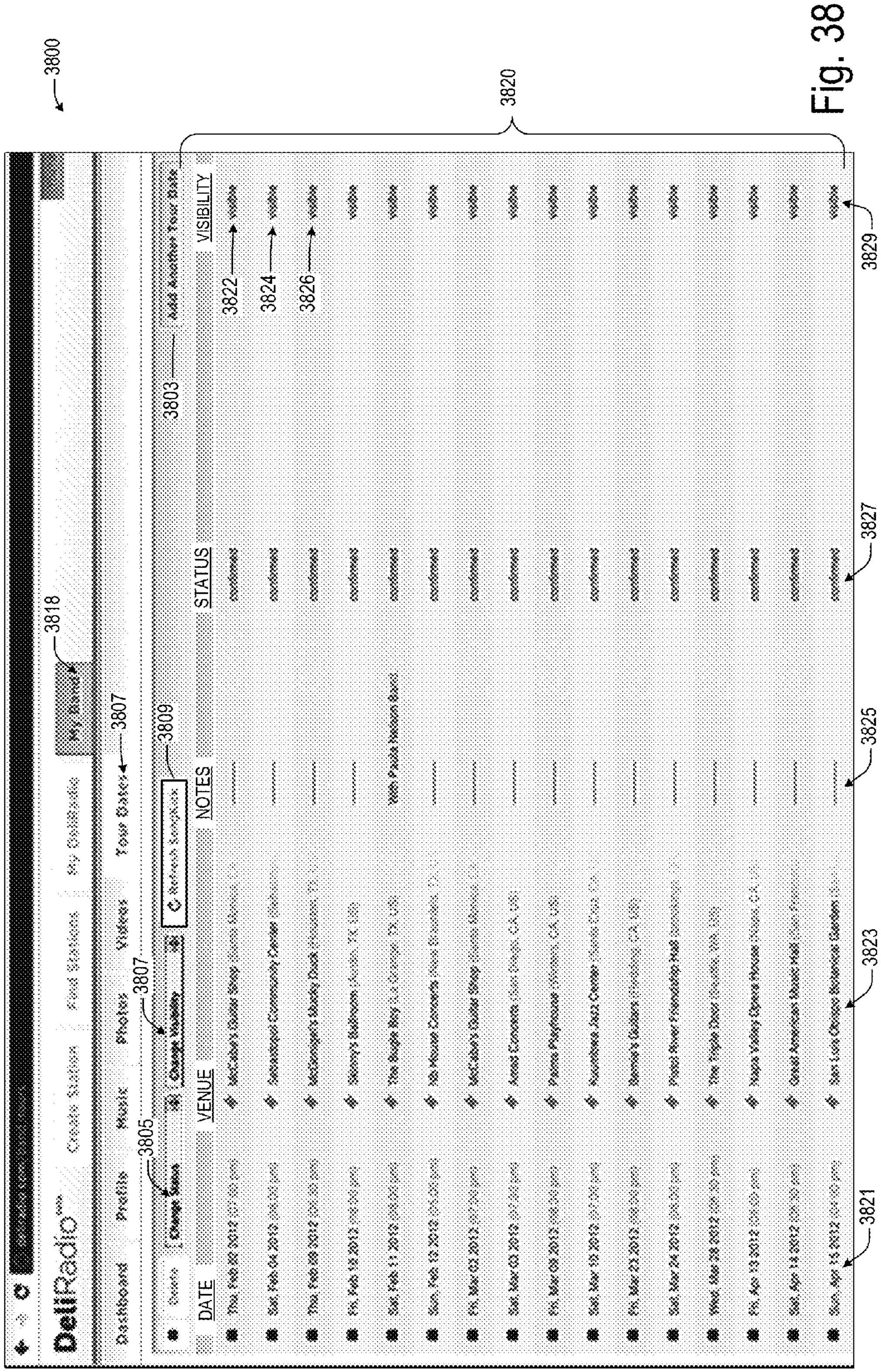

FIG. 38 shows an example screenshot of a My Band Tour Dates GUI 3800 in accordance with a specific embodiment. In at least one embodiment, the My Band Tour Dates GUI may display a list upcoming tour dates for the user's band, and may be configured or designed to provides functionality for enabling the user to perform one or more of the following features/activities (or combinations thereof):

- Change the status of an upcoming show or shows to either confirmed or cancelled.
- Change the visibility of an upcoming show or shows to either visible or not visible.
- Call the database at Songkick.com to refresh the list of upcoming tour dates.
- Add another tour date.
- Delete one or more tour dates.
- Create Tour Station button, which generates a Tour Station Player GUI playing the songs by other bands on the bill for at least one upcoming show of the currently selected band's tour. The currently selected band may survey this playlist to identify promising opportunities for cooperative promotion of upcoming shows with other bands on the bill. The DeliRadio System automatically populates this playlist by one or more of the following methods (or combinations thereof): Searches the DeliRadio database; Searches the Web at large for songs by bands that match the search conditions; etc.
- Find Deals button: When pressed, this button causes the DeliRadio System to gather the dates and venue locations of upcoming shows and submit them to Google Maps, thereby generating a customized, dynamic map display showing the locations of one or more upcoming shows on the band's tour, as well as the most likely routes the band may take to travel from show to show. The system then uses this data to conduct a search designed to provide other types of information, content or functionality, such as, for example, one or more of the following (or combinations thereof): Results from sites such as Groupon.com or Yelp.com offering location and date-specific bargains available in at least one of the band's tour date locations on the date of the band's show in that location. The system automatically filters these search results to highlight bargains especially interesting to touring bands, such as, for example, one or more of the following (or combinations thereof): Discount motel accommodations; Discounts on meals at restaurants near major highways; Discount entry to museums, movies or other entertainment for tour off days; A list of gas stations near at least one tour venue, ranked by lowest price per gallon of gasoline, distance from venue, and distance from freeway on or offramps. User may also display these results plotted on a Google Map; etc.

Figure 39:
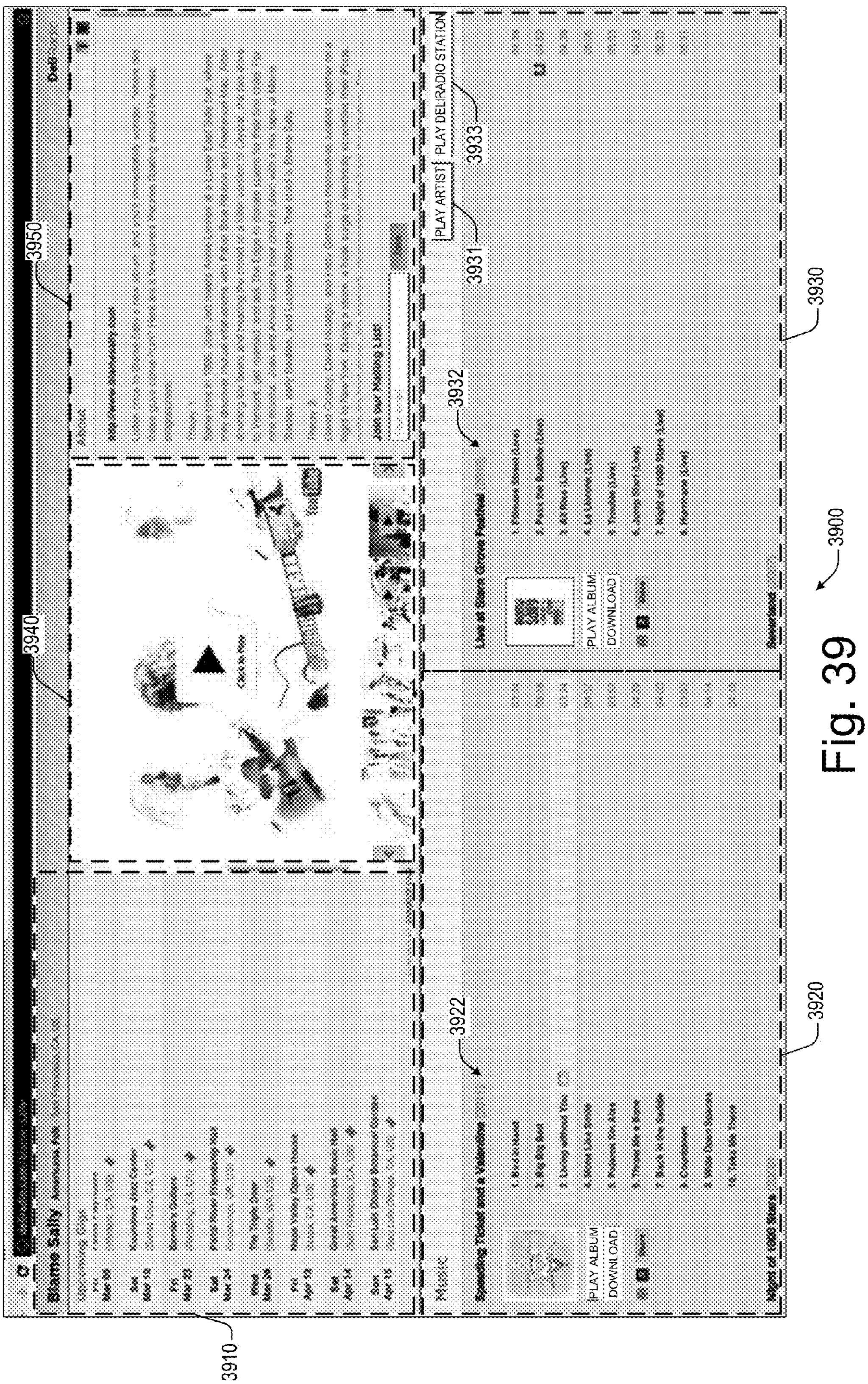

FIG. 39 shows an example screenshot of a DeliRadio Artist Profile Page 3900 in accordance with a specific embodiment. As illustrated in the example embodiment of FIG. 39, the DeliRadio Artist Profile Page may include a variety of information, content, and/or features relating to the artist/band, such as, for example, one or more of the following (or combinations thereof): upcoming gigs and tour date information, 3910, album/song information and related content (3920, 3930), images/video content 3940, artist description information 3950, Artist-related streaming DeliRadio Station button(s) (3931, 3933), etc.

Figure 40:
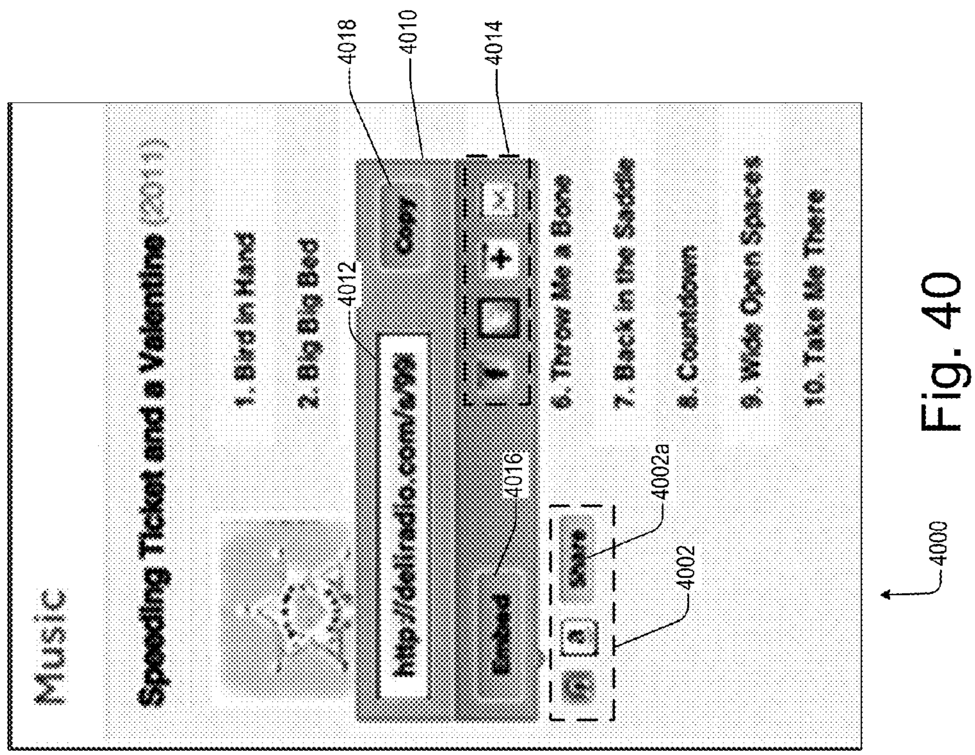

FIG. 40 depicts an example portion 4000 of the Artist Profile Page in accordance with a specific example embodiment. In this example embodiment, it is assumed that the user has clicked the Album Share button 4002*a*, thereby causing display of an Album Share GUI 4010. In at least one embodiment, the Album Share GUI may be configured or designed to enable the user to initiate or perform one or more of the following features/functions (or combinations thereof): Post the Album Share link to social network profiles; Email the Album Share link; Copy the Album Share link to the user's computer clipboard for later use; Embed an Album Player GUI playing tracks from this album in a website; etc. In some embodiments, the Album Share GUI may also be configured or designed to provide other types of information, content or functionality, such as, for example, one or more of the following (or combinations thereof): Exchange a download of the album for user's email address, and subscription to the artist's mailing list; Tweet directly at the band/artist. For example, in at least one embodiment, a link or button may be provided, which, when selected by the user, may open up Twitter window or GUI (and/or other type interface to social media servers/services) with the band's/artist's Twitter handle preloaded in the user ID text field, thereby enabling the user to directly tweet a desired artist/band. In some embodiments, the GUI may prompt the user to sign in via their existing Twitter account (and/or to create a Twitter account).

Figure 41:
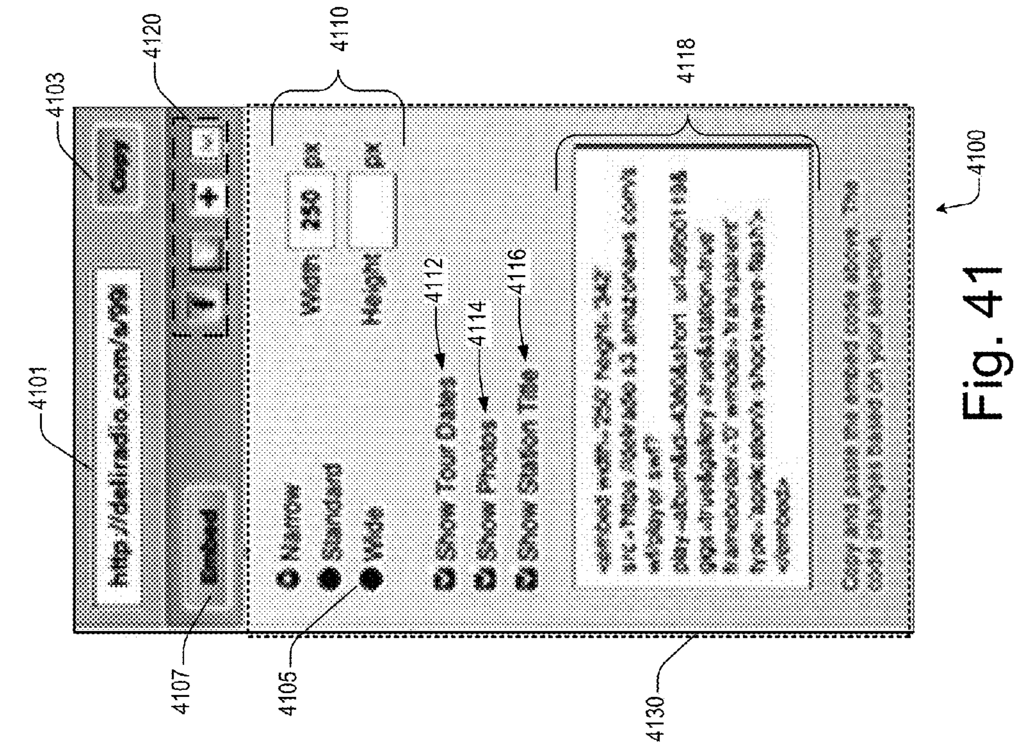

FIG. 41 depicts an example portion 4100 of the Artist Profile Page in accordance with a specific example embodiment. In the example embodiment of FIG. 41, it is assumed that the user has clicked the Embed button 4107 in the Album Share Window, thereby causing display of an Embed Album GUI 4130. In at least one embodiment, the Embed Album GUI enables the user to perform one or more of the following functions (or combinations thereof): Customize the dimensions of an Album Player GUI playing tracks from this album which may be embedded in a website; Customize the Album Player GUI to show one or more of the following (or combinations thereof): Show Tour Dates; Show Artist Photos; Show Station Title; Copy customized code which may be embedded in a website to create an Album Player GUI that plays tracks from the currently-selected album onto his/her computer clipboard; etc.

Figure 42:
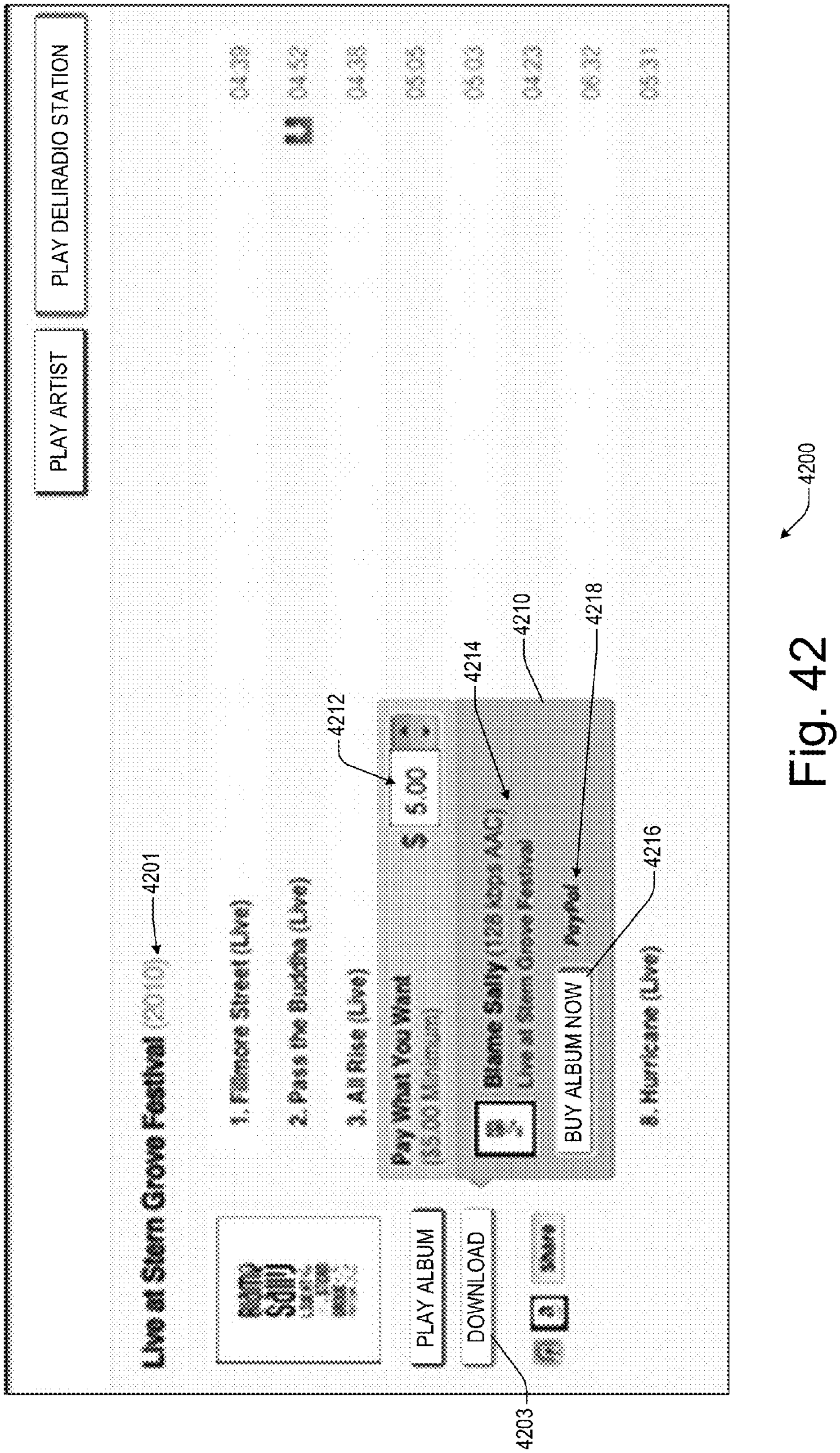

FIG. 42 depicts an example portion 4200 of the Artist Profile Page in accordance with a specific example embodiment. In this example embodiment, it is assumed that the user has clicked the Album Download button 42 of three, thereby causing display of an Album Download GUI 4210, which may be configured or designed to enable the user to initiate or perform one or more of the following (or combinations thereof): Enter any desired purchase price for the Album Download, which, for example, may be a predetermined minimum value set by the artist/band (e.g., Album Download minimum price=$5.00); Click the Buy Album Now button to purchase the Album Download immediately through PayPal. In some embodiments, the Album Download GUI may also be configured or designed to provide other types of information, content or functionality, such as, for example, one or more of the following (or combinations thereof): Exchange Album Download for user's email address, and subscription to the artist's mailing list; Allow user to purchase the Album Download instantly using another payment service of his/her choosing; Allow user to purchase the Album Download instantly using DeliPoints, a form of credits specific to the DeliRadio site, which the user may accrue in one or more of the following ways (or combinations thereof): Exchange real-world currency; Curate custom DeliRadio stations which are voted to the top of the Most Popular Stations Chart by DeliRadio users; Create remixes of songs uploaded to DeliRadio which are voted to the top of the Most Popular Remixes Chart by DeliRadio users; Achieve a top ranking on the Most Visits Chart for a specific DeliRadio venue; Achieve a top ranking on the Most Albums Purchased Chart; Achieve a top ranking on the Largest Amount Of Real-World Currency Spent On Album Downloads Chart; Achieve a top ranking on the Largest Amount Of DeliPoints Spent On Album Downloads Chart; Etc.

Figure 43:
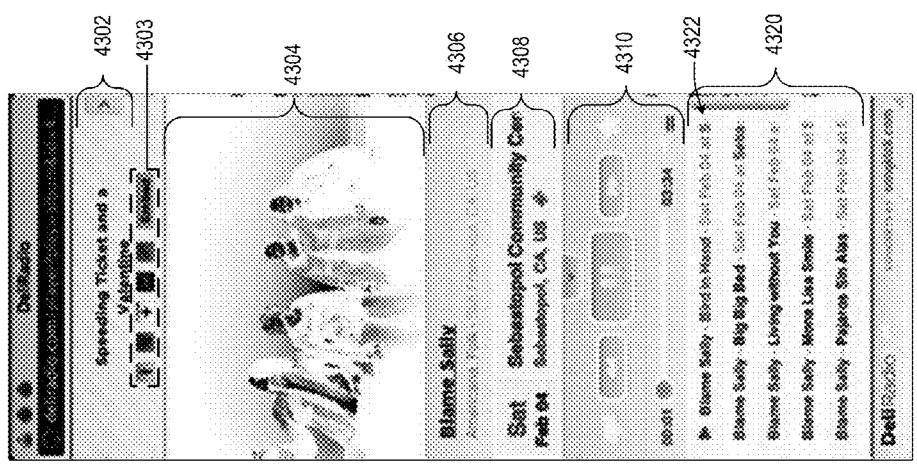

In the example embodiment of FIG. 43, it is assumed that the user has clicked the Play Album button, thereby causing display of an Album Player GUI 4300. The DeliRadio Player GUI is a feature unique to the DeliRadio service, offering streaming radio device that displays upcoming show information for a band while that band's song(s) stream to the listener. It also may show the gig(s) and/or tour events that are closest to the user, by geo-locating the user, and using the user's geolocation information to identify upcoming gigs (or tour events) within a specified distance from the user's location. According to different embodiments, the Album Player GUI may be configured or designed to provide functionality for one or more of the following features (or combinations thereof):

- Plays the songs comprising the selected album. User may listen to the songs in the order listed, or randomly access any song of his/her choosing.
- Enables users to click through and view any of the photos posted by the currently-playing band on their profile.
- Enables users to share the station to his/her social network profiles, email it to a friend, copy the station URL, or obtain the necessary code to embed the actual player on another website.
- Enables users to nix the Artist or Track, thereby instructing the system not to play the Artist or Track for the user in the future. According to different embodiments, the user may also Star the Band, Station, Album, and/or Track(s) currently playing, thereby adding it to the user's list of favorite bands, stations, tracks, etc.
- Displays a hyperlinked band name which users may click to visit the band's Artist Profile Page.
- Shows information about the currently-playing band's next performance, such as, for example, one or more of the following (or combinations thereof): date, venue name and location, and a link to buy tickets to that show.
- Display lyrics to the song currently playing, with display synced to song audio.
- Display guitar tablature or other musical notation for the song currently playing, with display synced to song audio.
- Display a slideshow of merchandise being offered for sale by the band. User may click on image of at least one item of merchandise to purchase that item.
- Display a User Interactivity GUI allowing the user to interact with the music. In one embodiment, the User Interactivity GUI includes, for example, a range of graphic elements, such as, for example, one or more of the following (or combinations thereof): pads, keys, rotary controllers, sliders, faders, and buttons. These elements are mapped to a sound-generating device, such as, for example, the MIDI synthesizer component in the user's computer. By interfacing with these elements, the user may generate his/her own musical or sonic accompaniment to the track currently playing. In one embodiment, the User Interactivity GUI also enables the user to dynamically remix the song currently playing, allowing him/her to change various aspects of the track, such as, for example, one or more of the following (or combinations thereof): instrument volumes, instrument panning, effects (reverb, delay, etc.). This remix functionality enables the user to isolate different elements of the track for study or enjoyment, as well as generate a variety of different remixes of the track, at least one of which may be saved.
- User-generated accompaniments and remixes may be displayed on the user's profile page, where they may be streamed, ranked by users, and purchased. These user-generated tracks may also be entered into the DeliRadio System, where they may be returned alongside the original track in search results.

Figure 44:
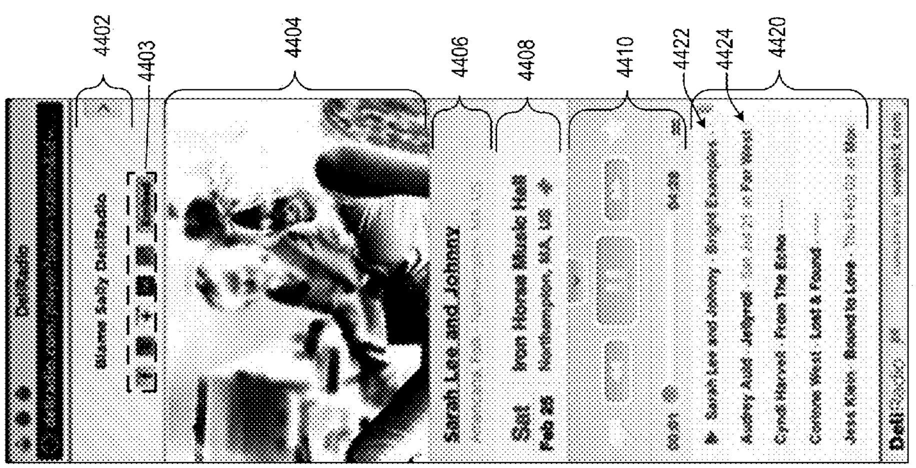

In the example embodiment of FIG. 44, the music player generated by clicking the Play DeliRadio Station button has loaded, creating a Handpicked by Artist Player GUI which provides functionality for one or more of the following features (or combinations thereof):

- Plays the songs comprising the Handpicked by Artist station, comprising songs in the system which have been algorithmically associated with the artist upon whom the station is based. User may listen to the songs in the order listed, or randomly access any listed song of his/her choosing.
- Enables users to pause/restart playback, adjust playback volume, and skip from point to point within the song
- Display a list of songs handpicked by the currently-playing artist generated by an artist-directed system search of the web at large (e.g. outside the DeliRadio System), which the user may then listen to in the order displayed, or randomly access and listen to selected songs.

Figure 45:
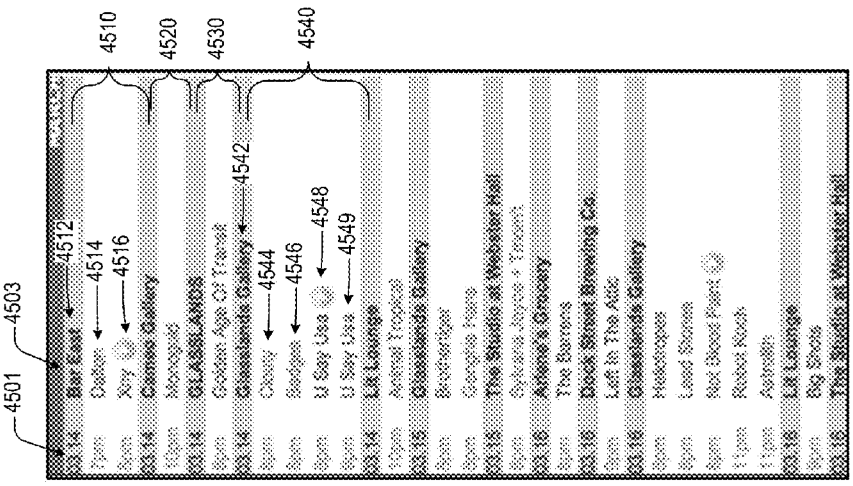

FIG. 45 shows an example screenshot of a Blogger Tool GUI 4500 in accordance with a specific embodiment. By embedding the DeliRadio System BloggerTool javascript in the <head> of their HTML pages, website operators may use DeliRadio System to provide playable links next to the textual mention of any Artist Name that currently has music available for public streaming on the DeliRadio System. Clicking on a play link will launch the DeliRadio Pop-Out Player that may either play the single artist that was clicked on, or a DeliRadio Station comprising all artists with DeliRadio music on that web page. A single web page may include multiple instances of the DeliRadio System BloggerTool.

Figure 46:
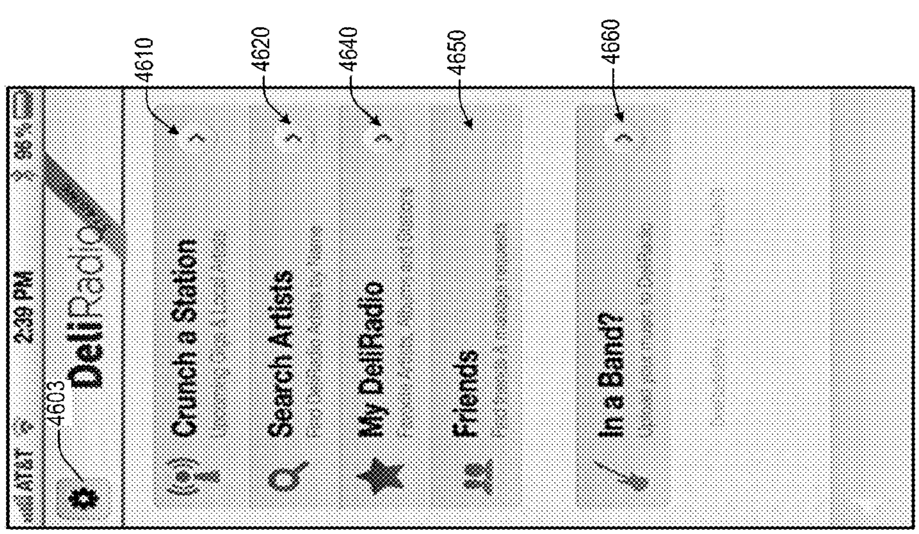

The specific example embodiment of FIG. 46 depicts the Home Screen GUI of the DeliRadio Mobile Application. This GUI provides functionality for one or more of the following features (or combinations thereof):

- Settings button 4603 enables users to access settings for the application.
- Crunch a DeliRadio Station 4610 enables users to enter various criteria and initiate a filtered search of the DeliRadio System database, thereby causing display of a DeliRadio Station playing songs selected by that search.

Search Artist 4620 enables users to search for DeliRadio artists by name and/or other criteria.

My DeliRadio 4640 enables users to access his/her collection of favorite artists, albums and stations.

Friends for 650 enables users to find friends in the DeliRadio System and manage friend requests.

In a Band? 4660 enables users to upload his/her music to the DeliRadio System. In at least one embodiment, this feature may allow a user to initiate a music file upload (e.g., to DeliRadio System) by providing instructions for the DeliRadio System Server to automatically access and acquire the specified music file(s) from a URL and/or cloud-based storage service.

Speaker button enables users to adjust speaker output volume and/or toggle mute.

In at least one embodiment, when a user crunches a DeliRadio Station and clicks on a particular artist—the Artist Page GUI may include sharing functionality and/or the ability to go to the artist/band's Facebook page.

Figure 47:
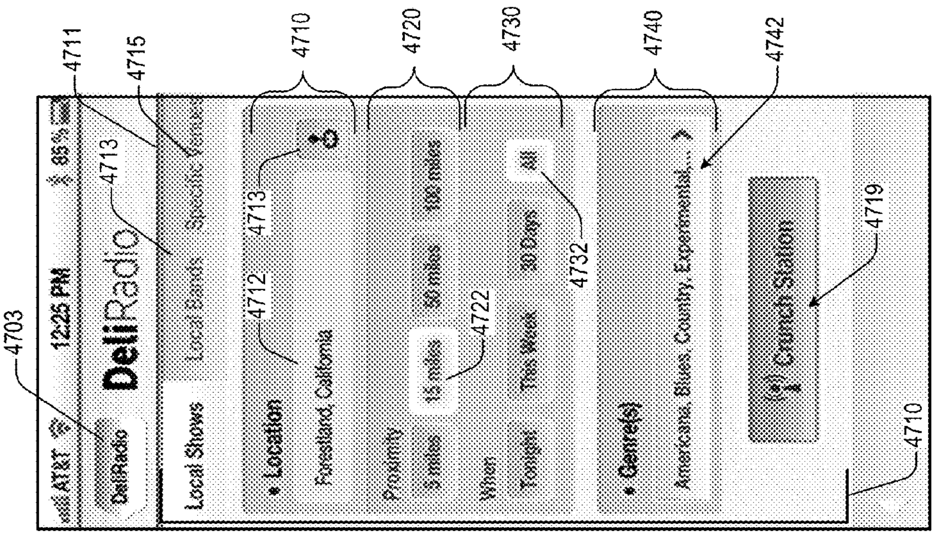

In the specific example embodiment of FIG. 47, it is assumed that the user has selected Crunch Station 4719 on the Home Screen, thereby opening the Local Shows Tab GUI. This GUI enables the user to create a DeliRadio Station playing music uploaded to the DeliRadio System which is automatically selected during a search of the DeliRadio System database filtered by user-selected criteria. The Local Shows Tab GUI enables users to perform one or more of the following functions (or combinations thereof):

Enter a desired location

Select a desired proximity of upcoming local shows to the entered location

Select a time period during which the upcoming shows may occur

Select desired musical genre(s) for the upcoming shows

Click the Crunch Station button to initiate the filtered search

Figure 48:
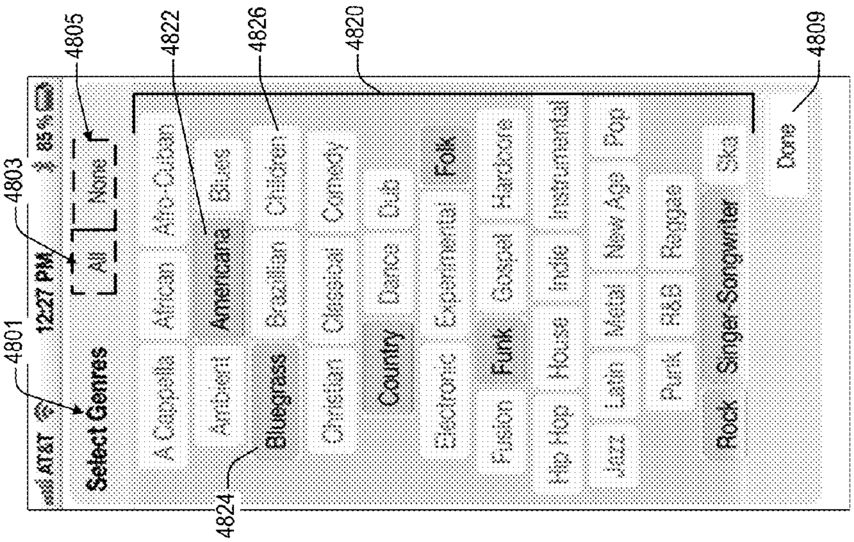

In the specific example embodiment of FIG. 48, it is assumed that the user has clicked several individual genre buttons to select these genres.

Figure 50:
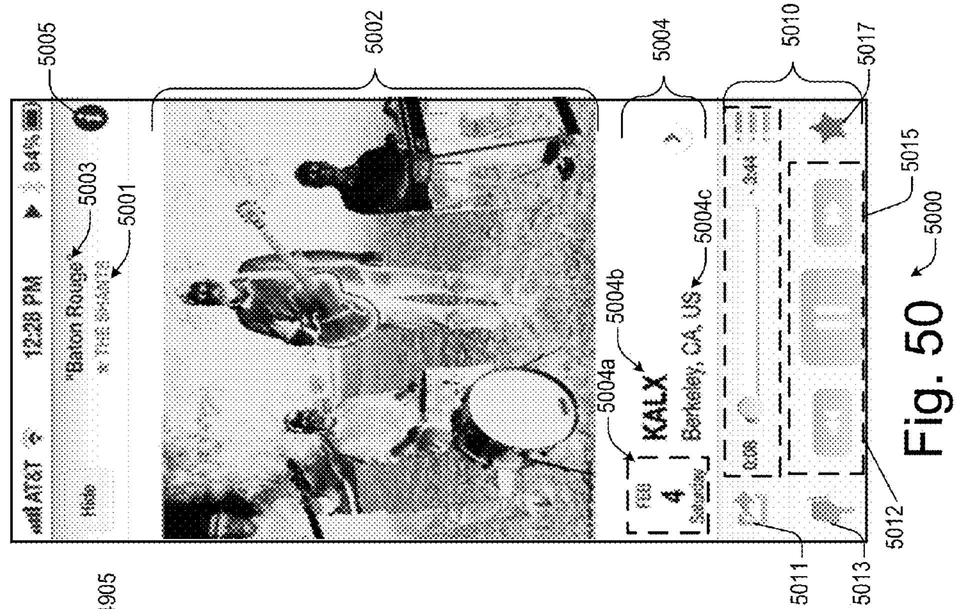
Figure 49:
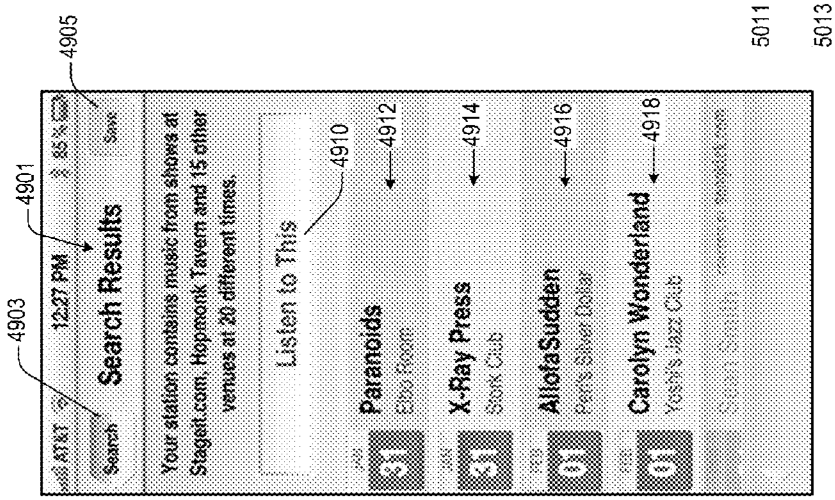

The specific example embodiment of FIG. 49 depict a Search Results Screen GUI displaying the results of the filtered search initiated by the user. This GUI displays a short text blurb that mentions multiple local venue names and tells the user how many venues and how many show times were returned by the search. The GUI also provides functionality for one or more of the following features (or combinations thereof):

Lists the upcoming show dates returned by the search, along with the band and venue names associated with at least one date Search button that enables users to return to the Local Shows Tab GUI Save button that enables users to name the station based on the search results and save it to his/her stations list Listen to This button that immediately generates a DeliRadio Station based on the search results The specific example embodiment of FIG. 50 depicts a DeliRadio Station GUI, currently playing a song. The Station GUI provides functionality for one or more of the following features (or combinations thereof):

Plays songs matching the criteria used to create the station. User may listen to the songs in the order listed, or randomly access any listed song of his/her choosing.

Shows information about the currently-playing band's next performance, such as, for example, one or more of the following (or combinations thereof): date, venue name and location, and a link to buy tickets to that show.

Figure 51:
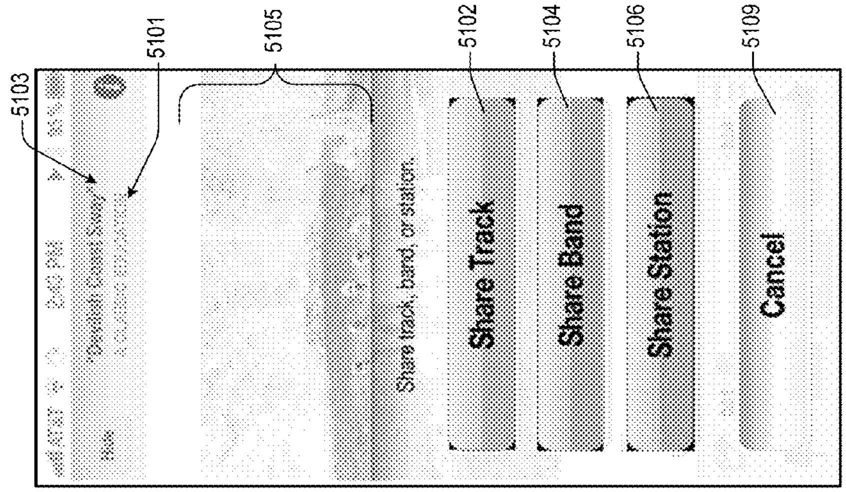

In the example embodiment of FIG. 51, it is assumed a DeliRadio Station is currently playing, and that the user has clicked the Share button thereby causing display of a Sharing Window allowing user to perform one or more of the following functions (or combinations thereof): Share Track; Share Band; Share Station; Cancel the sharing process; etc.

Figure 52:
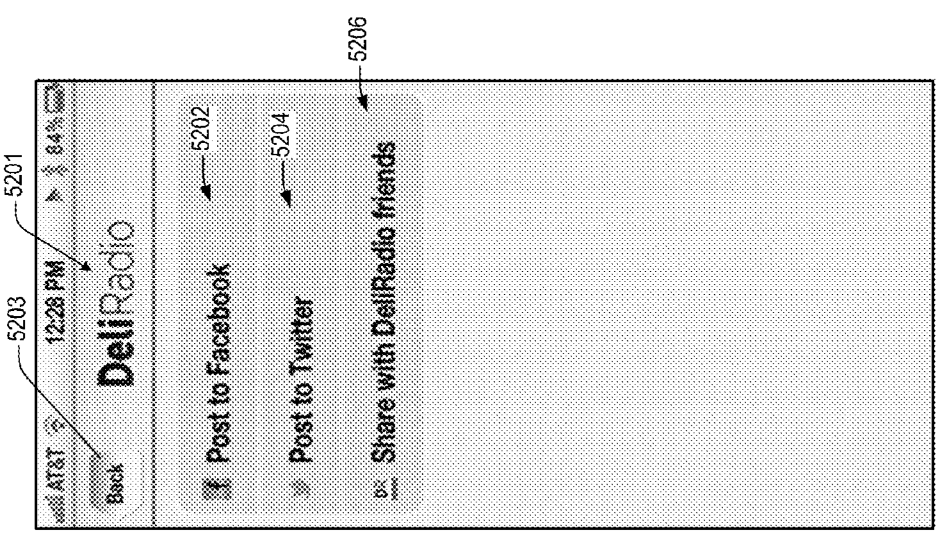

In the specific example embodiment of FIG. 52, it is assumed that the user has clicked the Share Band, Share Track, or Share Station button, thereby displaying the Share Options Screen GUI, allowing user to perform one or more of the following functions (or combinations thereof): Post to Facebook; Post to Twitter; Share with DeliRadio System Friends; etc.

Figure 53:
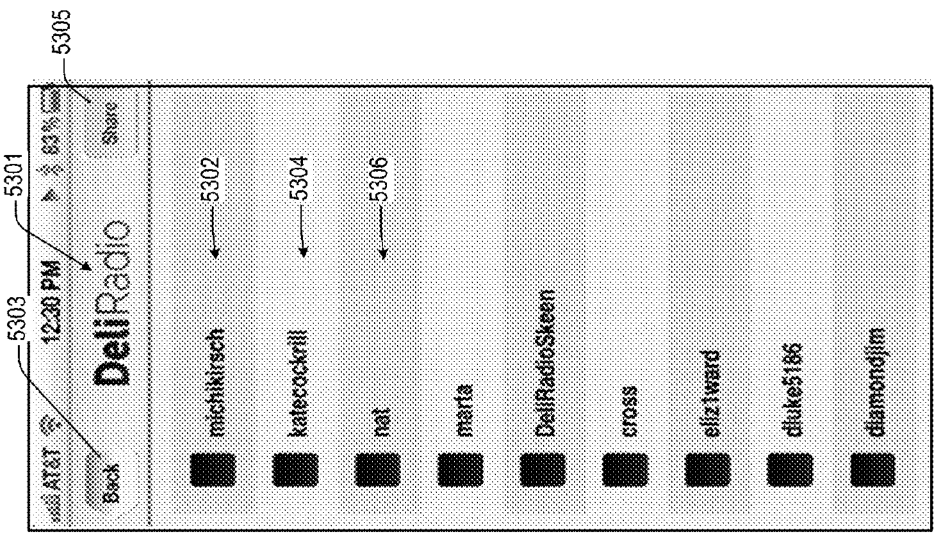

In the specific example embodiment of FIG. 53, it is assumed that the user has clicked the Share with DeliRadio Friends button (e.g., 5206, FIG. 52), thereby displaying the Share with DeliRadio Friends GUI which enables the user to click checkboxes to share the currently playing song with DeliRadio friends.

Figure 54:
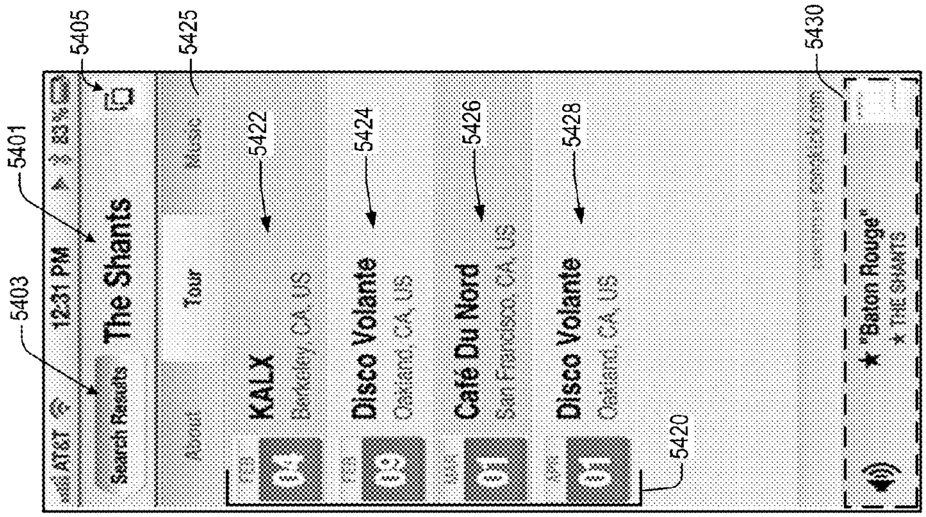

FIG. 54 shows an example screenshot of an Artist Tour GUI 5400 in accordance with a specific embodiment. In the specific example embodiment of FIG. 54, it is assumed that the user has tapped the Upcoming Gig GUI 5004 (FIG. 50), thereby causing the display of Artist Tour GUI 5400 which displays a list of upcoming tour dates for the currently playing artist (e.g., The Shants), along with the venue names and locations of upcoming gigs for that artist.

Figure 55:
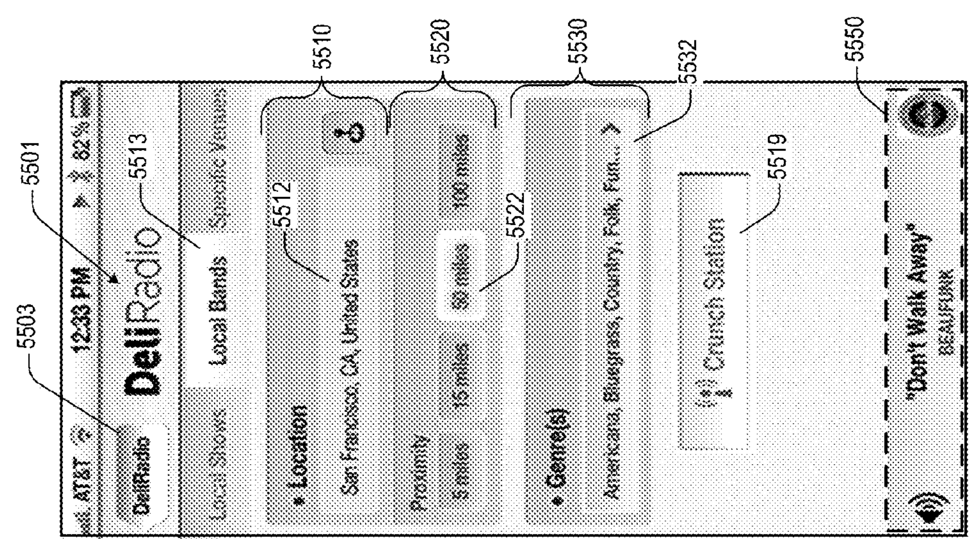

In the specific example embodiment of FIG. 55, it is assumed that the user has selected Crunch Station on the Home GUI, thereby opening the Local Bands Tab GUI 5500. This GUI enables the user to create a DeliRadio Station playing music uploaded to the DeliRadio System which is automatically selected during a search of the DeliRadio System database filtered by user-specified criteria. The Local Bands Tab GUI enables users to perform one or more of the following functions (or combinations thereof):

Enter a desired location

Select a desired proximity of upcoming local shows to the entered location

Select desired musical genre(s) for the upcoming shows

Click the Crunch Station button to initiate the filtered search

In at least one embodiment, the Local Bands Tab GUI may display Return to Active Station GUI 5550 which includes a Return to Active Station Icon along with other information such as, for example: the name of the currently playing track and band, the associated album cover image, etc. This GUI also indicates whether the user has previously Starred the currently playing track or band. The user may click on this GUI to return to the currently playing station.

Figure 56:
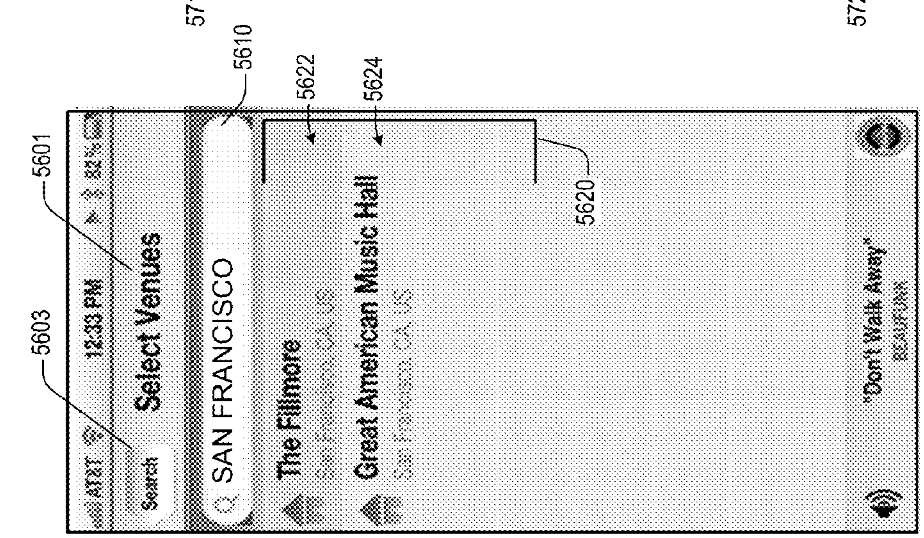

In the specific example embodiment of FIG. 56, it is assumed that the user has selected multiple venues, thereby displaying the Select Venues GUI which provides functionality for one or more of the following features (or combinations thereof): Search button enables users to return to the Specific Venues Tab GUI; Search Field enables users to perform another search for a specific venue; Displays a list of previously selected venues; etc.

Figure 57:
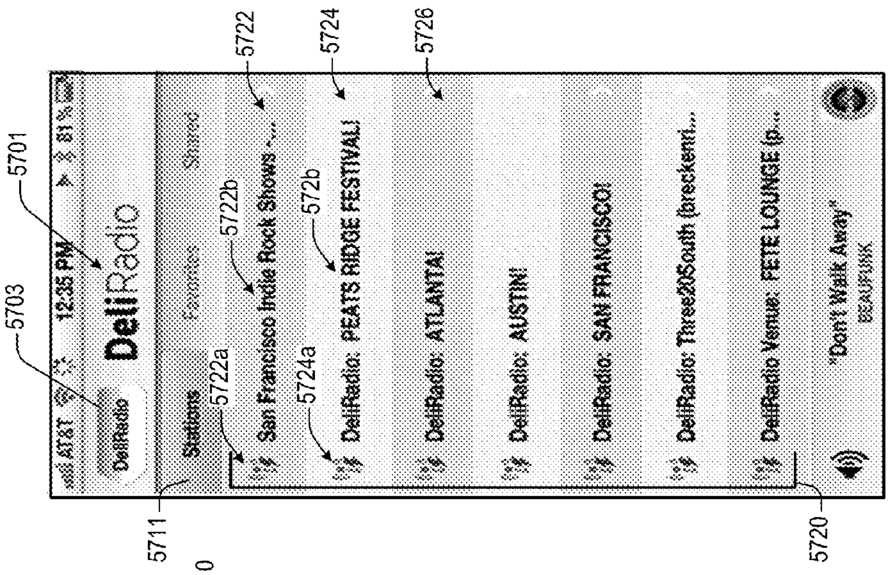

The specific example embodiment of FIG. 57 depicts the My DeliRadio Mobile Application GUI. It is assumed that the user has selected the Stations Tab, thereby displaying a list of stations which the user has Starred, adding them to his/her favorites list.

Figure 58:
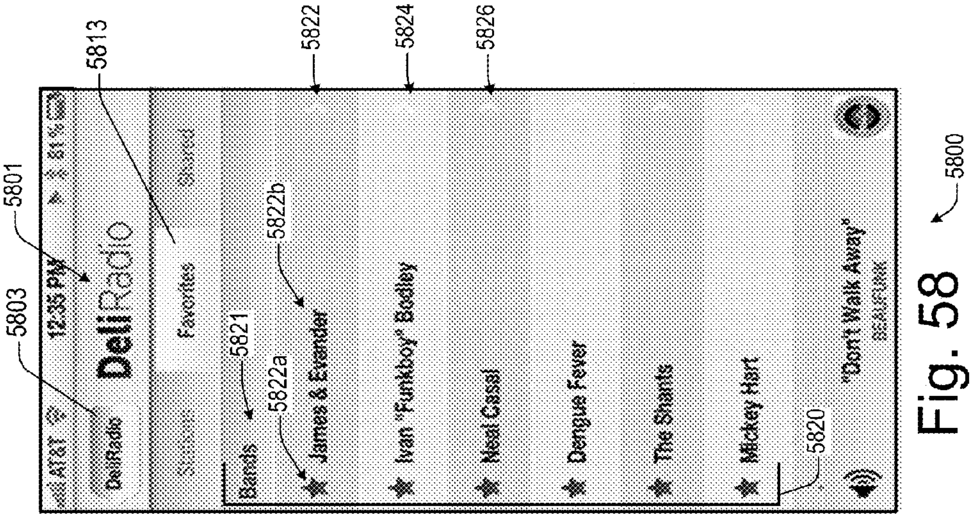

In the specific example embodiments of FIG. 58, it is assumed that the user has clicked the Favorites Tab 5813, thereby displaying a list of bands, albums and tracks which the user has Starred, adding them to his/her favorites list.

Figure 59:
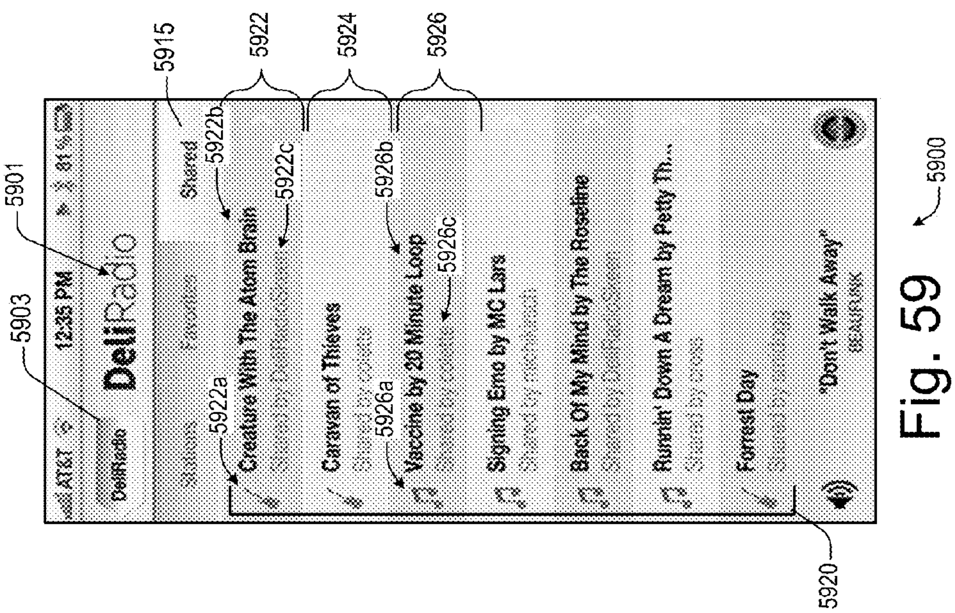

In the specific example embodiment of FIG. 59, it is assumed that the user has clicked the Shared Tab 5915, thereby displaying a list of bands, albums and tracks that have been shared with the user.

Figure 60:
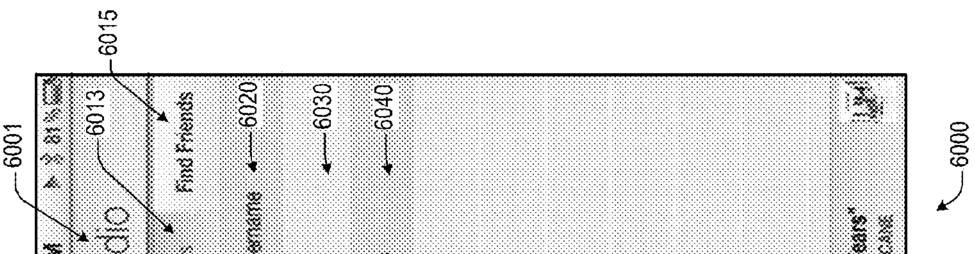

The specific example embodiment of FIG. 60 depicts the Find Friends GUI 6000. This GUI provides functionality for one or more of the following features (or combinations thereof): Search for friends of the user by DeliRadio System username; Search for Facebook friends of the user who are also on DeliRadio System; Search for the user's address book contacts; etc.

Figure 61:
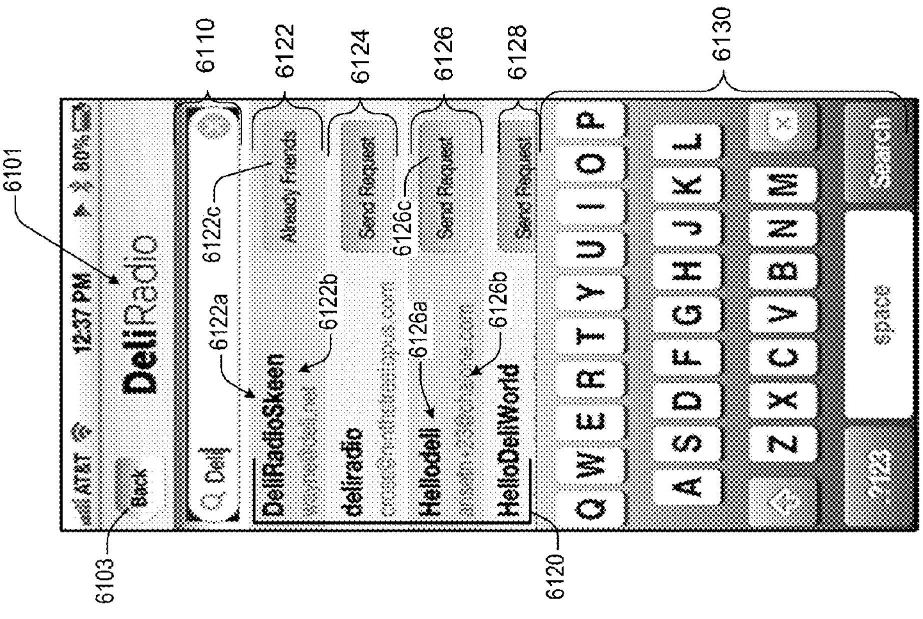

In the specific example embodiment of FIG. 61, it is assumed that the user has selected Search by DeliRadio Username option in the Find Friends GUI, thereby displaying the Search by DeliRadio Username GUI 6100. It is further assumed that the user has begun to type a DeliRadio username into the search field, causing the Auto-Fill Prompt to return a list of usernames matching the text that has already been entered.

Figure 62:
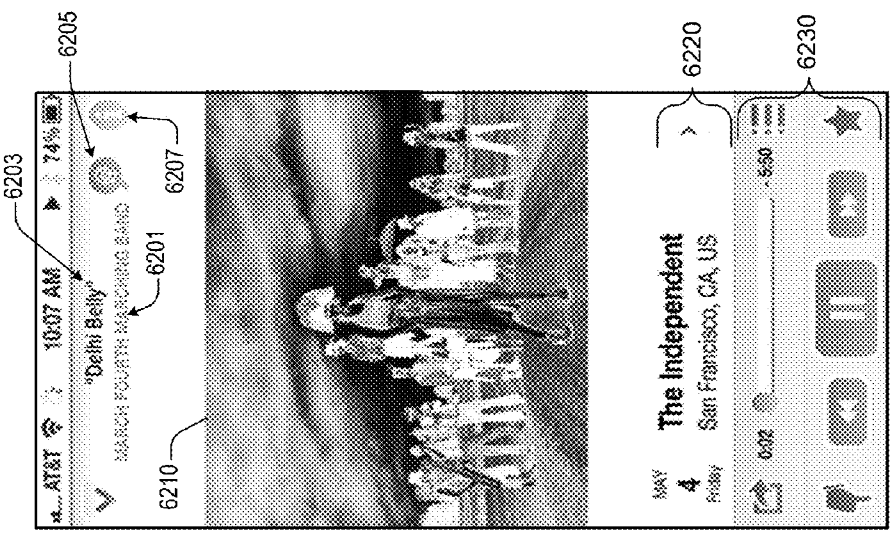
Figure 63:
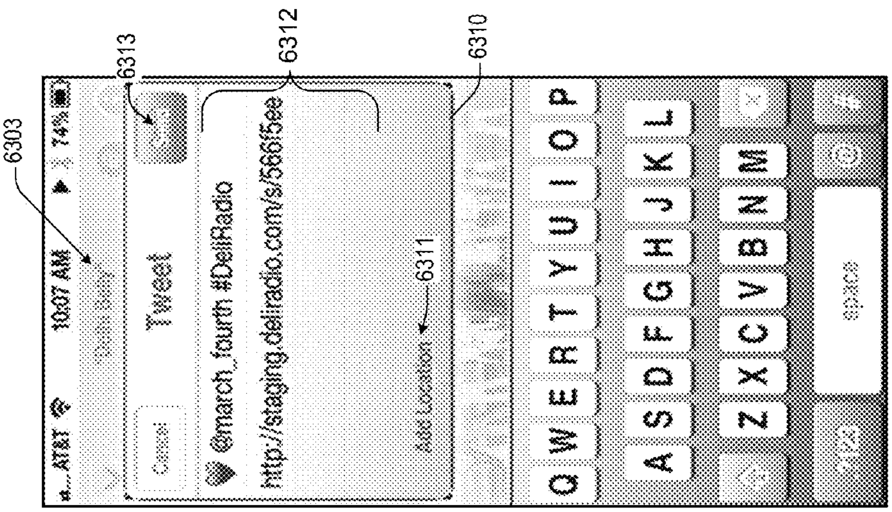

FIG. 62 shows an example screenshot of a DeliRadio Mobile Application Player GUI 6200 in accordance with a specific embodiment. As illustrated in the example embodiment of FIG. 62, the Mobile Application Player GUI 6200 includes a "Tweet @" icon 6205. If an artist has entered their Twitter handle in their DeliRadio Artist Profile, a DeliRadio System listener who is streaming the artist's music via the DeliRadio Mobile Application may, with a single click (e.g., on Tweet @ icon 6205), send a Twitter message (i.e., "tweet") directly at the artist's Twitter handle, with an automatically generated (or personalized) comment and a link to the artist's DeliRadio Station (as illustrated, for example, in FIG. 63). Any Twitter user who "follows" the DeliRadio System user sending the tweet, who follows the artist on Twitter or who follows DeliRadio System on Twitter will see the tweet in their "feed." Any Twitter user who clicks on the link for the artist's station may view or access the artist's upcoming concert dates.

Figure 64:
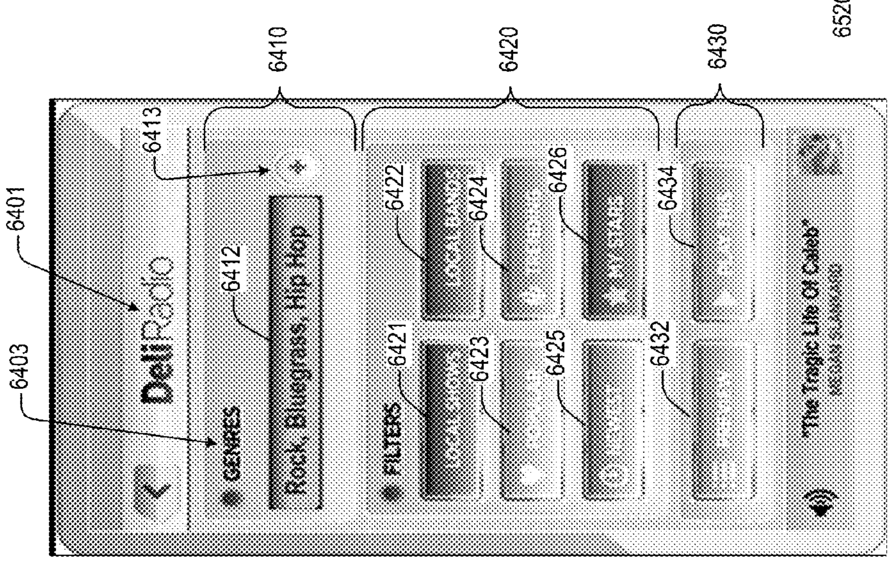

FIG. 64 shows an example screenshot of a DeliRadio QuickPlay GUI 6400 in accordance with a specific embodiment. In at least one embodiment, the DeliRadio QuickPlay GUI may provide functionality for enabling a user to select their favorite genres, and select what type of playlist they would like to hear: Local Shows 6421, Local Bands 6422, Popular 6423, Trending 6424, Newest 6425 and My Stars 6426. In one embodiment, clicking "PLAY THIS" 6434 will automatically start a stream of the relevant tracks. In at least one embodiment, the Popular and Trending options (6423, 6424) provide the user with access to information about artists, songs, stations, and/or venues based on popularity and trending data, such as, for example, play counts and the number of stars a particular artist has received from other listeners. Newest option 6425 will play the most recent submissions to the DeliRadio System, and 'My Stars' will play any matching artists from the user's own collection of Starred Artists. In one embodiment, Local Bands and Local Shows options (6421, 6422) may display matching bands, based, for example, on timeframe and radius around the user's last known location. Preview option 6432 may display a list of all the artists that match.

Figure 65:
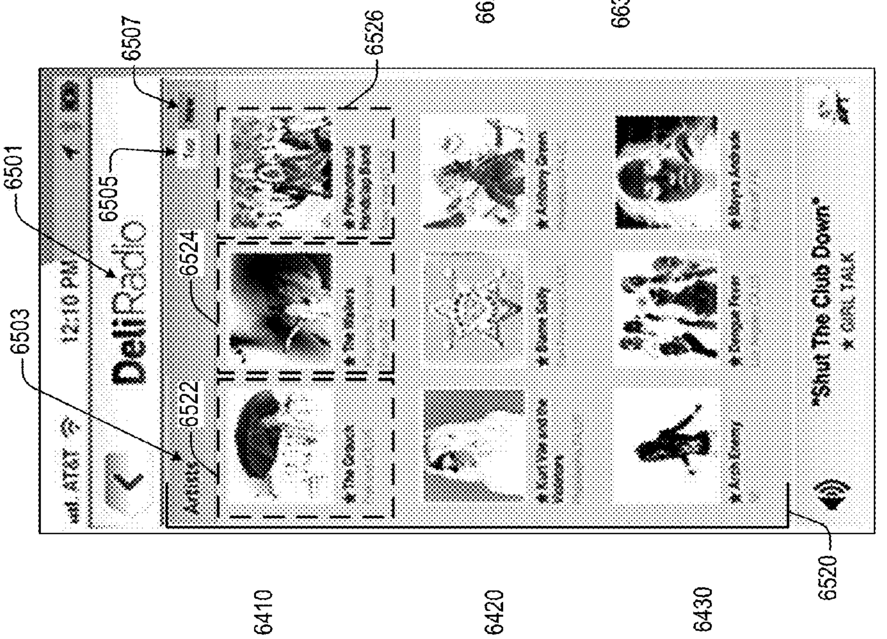

FIG. 65 illustrates an example screenshot 6500 configured or designed to display Featured Content via the DeliRadio Mobile Application. In one embodiment, the DeliRadio Mobile Application may display a section to users that promotes nearby, notable, and upcoming shows, venues, artists, and festivals. Featured content may be selectively presented, based on a user's listening history, geolocation, preferred genres, as well as additional criteria described and/or referenced herein.

Figure 66:
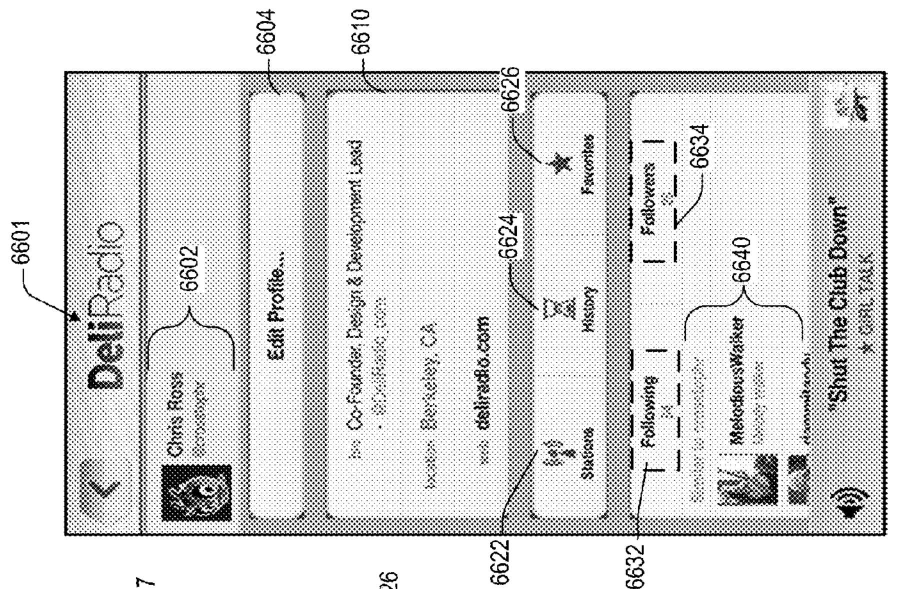

FIG. 66 shows an example screenshot of a User Info GUI 6600 in accordance with a specific embodiment. In at least one embodiment, the User Info GUI may be configured or designed to display social information/content via the DeliRadio Mobile Application. According to different embodiments, the User Info GUI may be configured or designed to include functionality for providing a user with the ability to look up details about DeliRadio friends and/or users, including, for example: Real Name, Location, Bio, Twitter Handle, Recent listening history, favorites (starred content), stations that user has created, etc.

Figure 67:
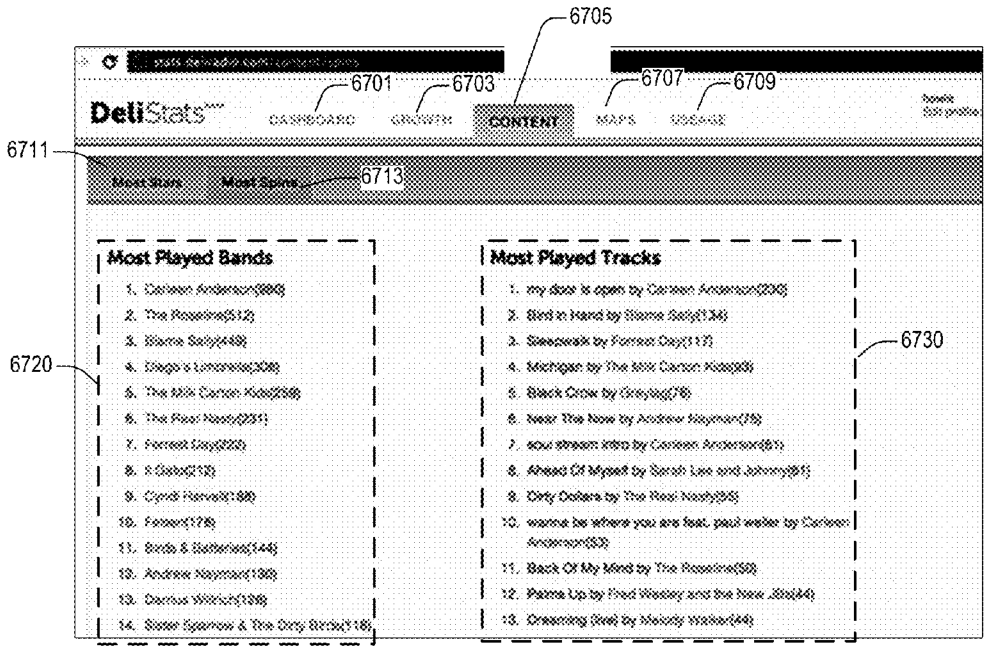

The specific example embodiment of FIG. 67 depicts the Content Tab GUI 6705, which features two sub-tabs: Most Stars and Most Spins. This specific embodiment depicts the Most Spins Tab GUI 6713, which displays a list of the top 20 Most Played Bands and a list of the top 20 Most Played Tracks, along with the names of the bands associated with those tracks. In both lists, the band name is a hyperlink, which, when clicked, may open the DeliRadio System band profile for that band in a new browser tab. The user may also click the Most Stars Sub-Tab, or the Dashboard, Growth, Maps, or Usage Tabs to open GUIs providing other functionalities.

Figure 68:
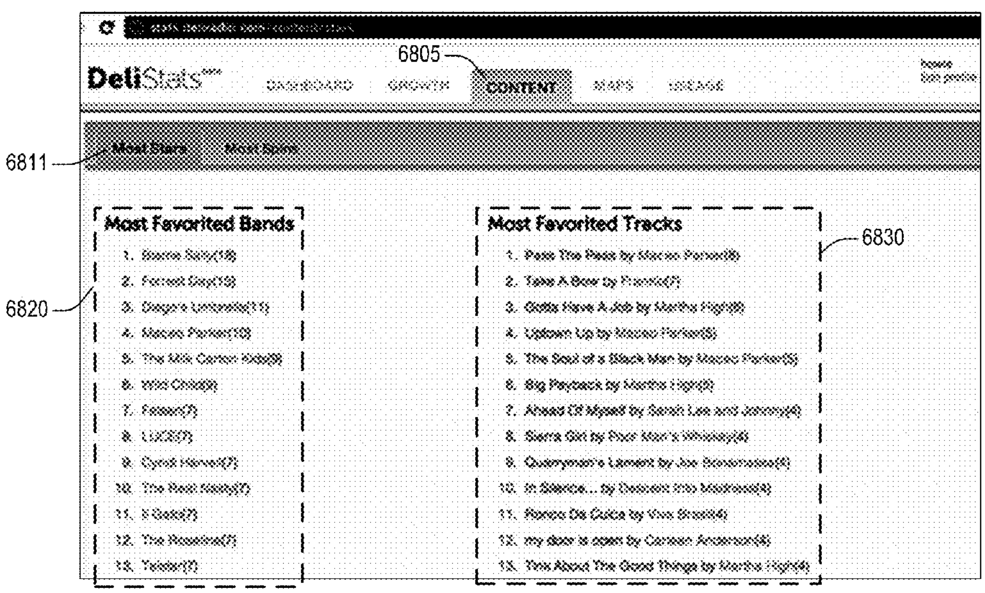

The specific example embodiment of FIG. 68 depicts the Content Tab GUI 6805, which features two sub-tabs: Most Stars and Most Spins. This specific embodiment depicts the Most Stars Tab GUI 6811, which displays a list of the top 20 Most Favorited Bands and a list of the top 20 Most Favorited Tracks, along with the names of the bands associated with those tracks. In both lists, the band name is a hyperlink, which, when clicked, may open the DeliRadio Artist Profile Page for that band in a new browser tab. The user may also click the Most Spins Sub-Tab, or the Dashboard, Growth, Maps, or Usage Tabs to open GUIs providing other functionalities.

Figure 69:
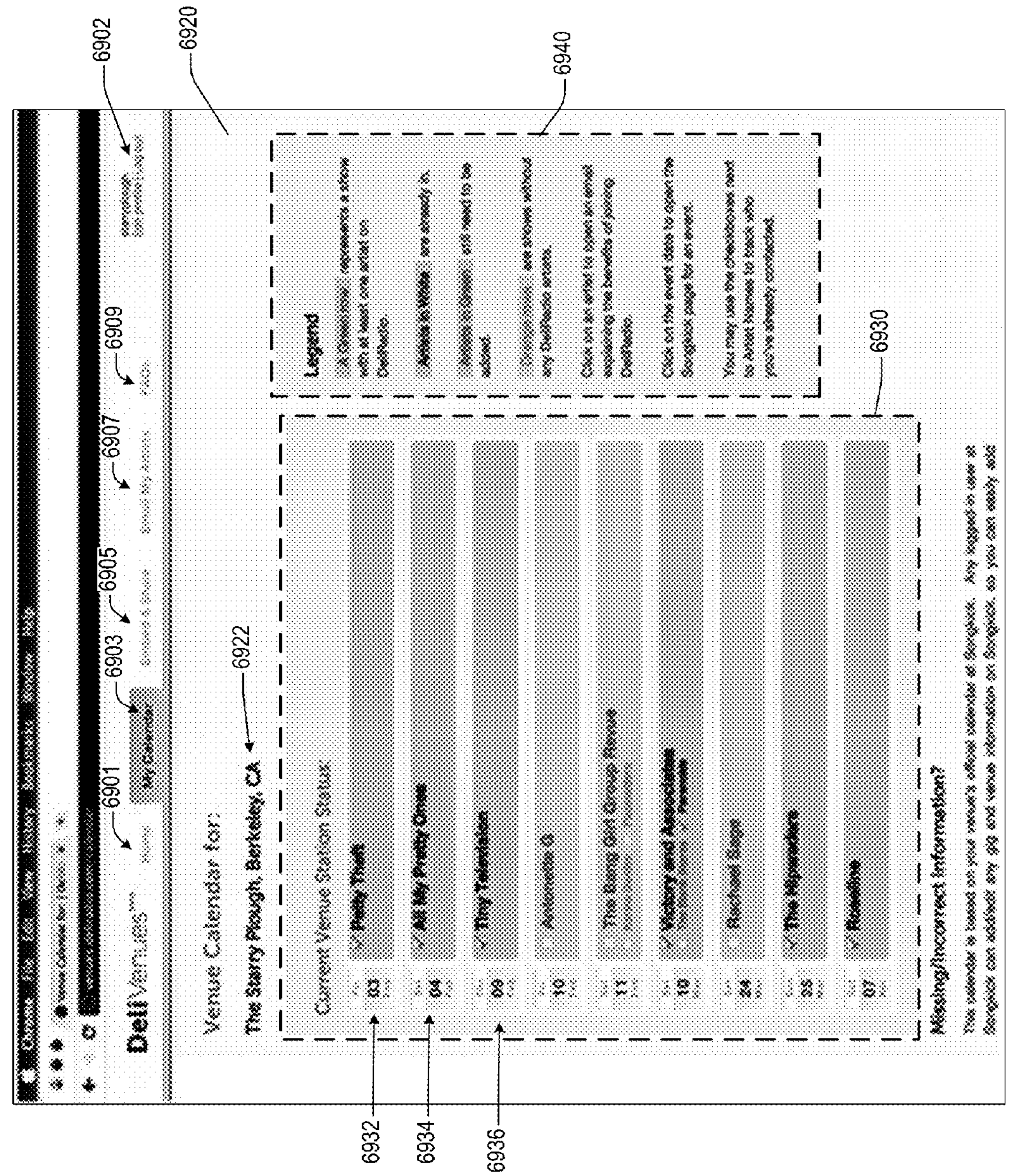

FIG. 69 shows an example screenshot of a DeliVenue(s) GUI 6900 in accordance with a specific embodiment. The specific example embodiment of FIG. 69 depicts the My Calendar Tab GUI 6903, which provides functionality for enabling a user to import upcoming show information from the currently selected venue's profile at 3$^{rd}$ party venue/show information sites such as songkick.com. This information is displayed as a list of upcoming calendar dates, along with the names of the bands performing on those dates.

Figure 70:
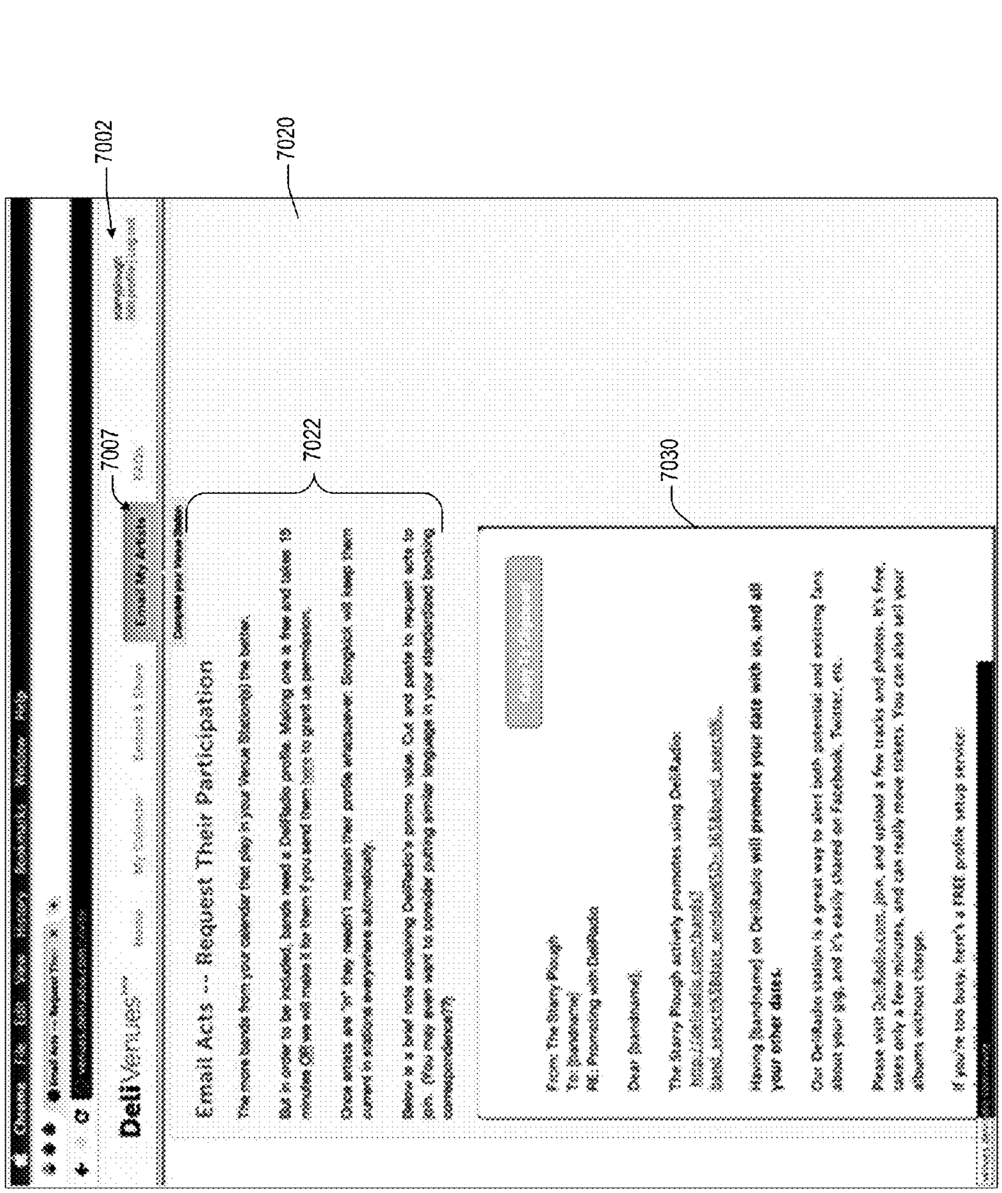

The specific example embodiment of FIG. 70 depicts the Email My Artists Tab GUI 7007, which features a sample email, pre-populated with the name of the user's venue, a hyperlink to the venue's DeliRadio calendar page, and a hyperlink to DeliRadio's automatic band profile setup service, and including text inviting a band to join the DeliRadio System. The user may make any desired alterations to the text, and may also click the Copy To Clipboard button to copy one or more sample email text to his/her computer clipboard. Note that selecting the Email My Artists Tab generates a popup modal Complete your Venue Station prompt. The user may also click the Home, My Calendar, Embed & Share, or FAQs Tabs to open GUIs providing other functionalities, click the Edit Profile hyperlink to edit his/her DeliRadio profile, or click the Log Out hyperlink to log out of the DeliRadio System.

Figure 71:
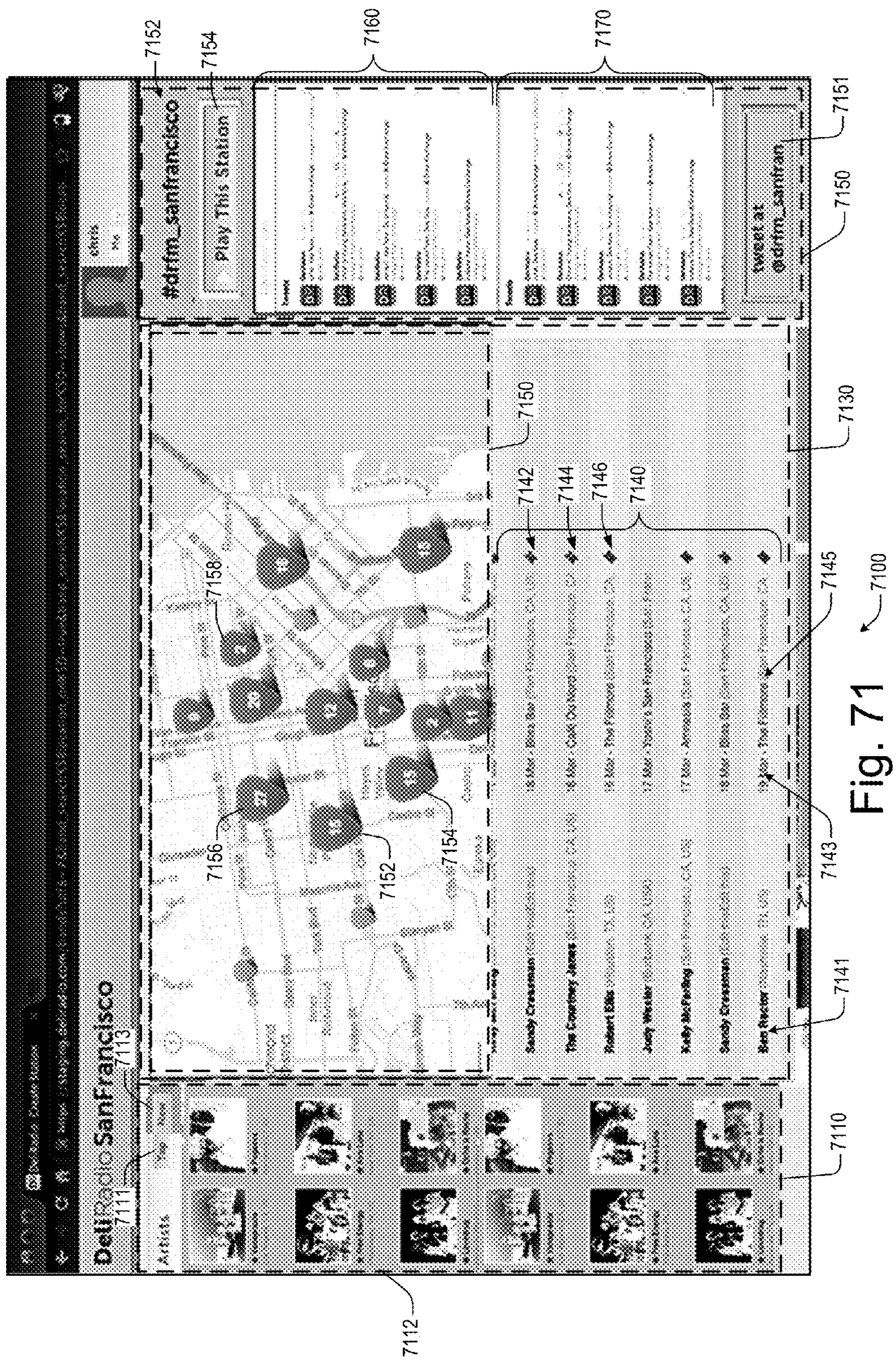

FIG. 71 shows an example screenshot of a DeliRadio Station Webpage GUI 7100 in accordance with a specific embodiment. In the example embodiment of FIG. 71, the DeliRadio Station Webpage GUI may enable any station created in DeliRadio System to be represented by its own customized "webpage", which may include various types of content such as, for example, one or more of the following (or combinations thereof): interactive maps, a customized twitter feed, information about upcoming shows, etc. Such features and functionalities enable the Station Web page to be configured as an "automated blog". In some embodiments, the DeliRadio Station Webpage GUI may also include functionality for enabling users to post content on the Station Webpage (similar to that of traditional blog-type webpages). According to different embodiments, examples of different types of content and/or features which may be included on a DeliRadio Station Webpage may include, but are not limited to, one or more of the following (or combinations thereof): Show reviews; Pictures; User/station creator may tweet; Others (e.g., station followers) could tweet to this channel; Bands identified as being associated with this station could also tweet; Forums and Chats such as, for example: Social media; Twitter feed; Unique Twitter handle; etc.

In at least one embodiment, any DeliRadio City/Neighborhood/Venue "Shows Near" or "Bands From" station may have a more comprehensive display via that station's own unique, automatically updating website. This website display is the "AutoMagic Blog." In one embodiment of the AutoMagic Blog—the DeliRadio user who controls the station/blog may receive their own unique Twitter handle for that station/blog (e.g. @drfm_oakland). Information displayed may include, but are not limited to, one or more of the following (or combinations thereof): (1) a map showing the specified radius for the station; (2) the station's venue and/or artist search results overlaid on that map, with associated playable links; (3) the station's search results of artists and concerts presented in list form; (4) artist profiles of each artist in the search results; (5) a DeliRadio Embedded Player which plays the search results for that station; (6) a customized "outgoing" Twitter feed of all tweets from the Blog's owner; (7) a customized "incoming" Twitter feed representing a real time search of all tweets by Twitter users who include in their tweet a hashtag for the blog (e.g. #drfm_oakland). The Blog's owner could "re-tweet" from their official Blog handle any tweets containing the hashtag, thus creating a method for Twitter users to tweet comments and a method for the Blog owner to officially recognize those comments by retweeting them; (8) a "play button" for the outgoing Twitter feed that uses technology to "scrape" any DeliRadio Station links, allowing each tweet to be played as a DeliRadio Station, or all tweets in the feed to be played as a separate station; (9) a "play button" for the incoming Twitter feed that uses technology to scrape any DeliRadio Station links, allowing each tweet to be played as a DeliRadio Station, or all tweets in the feed to be played as a separate station; (10) editorial content related to the artists and venues currently displayed, either linked in from outside websites or created within the Blog itself by the Blog owner.

Figure 72:
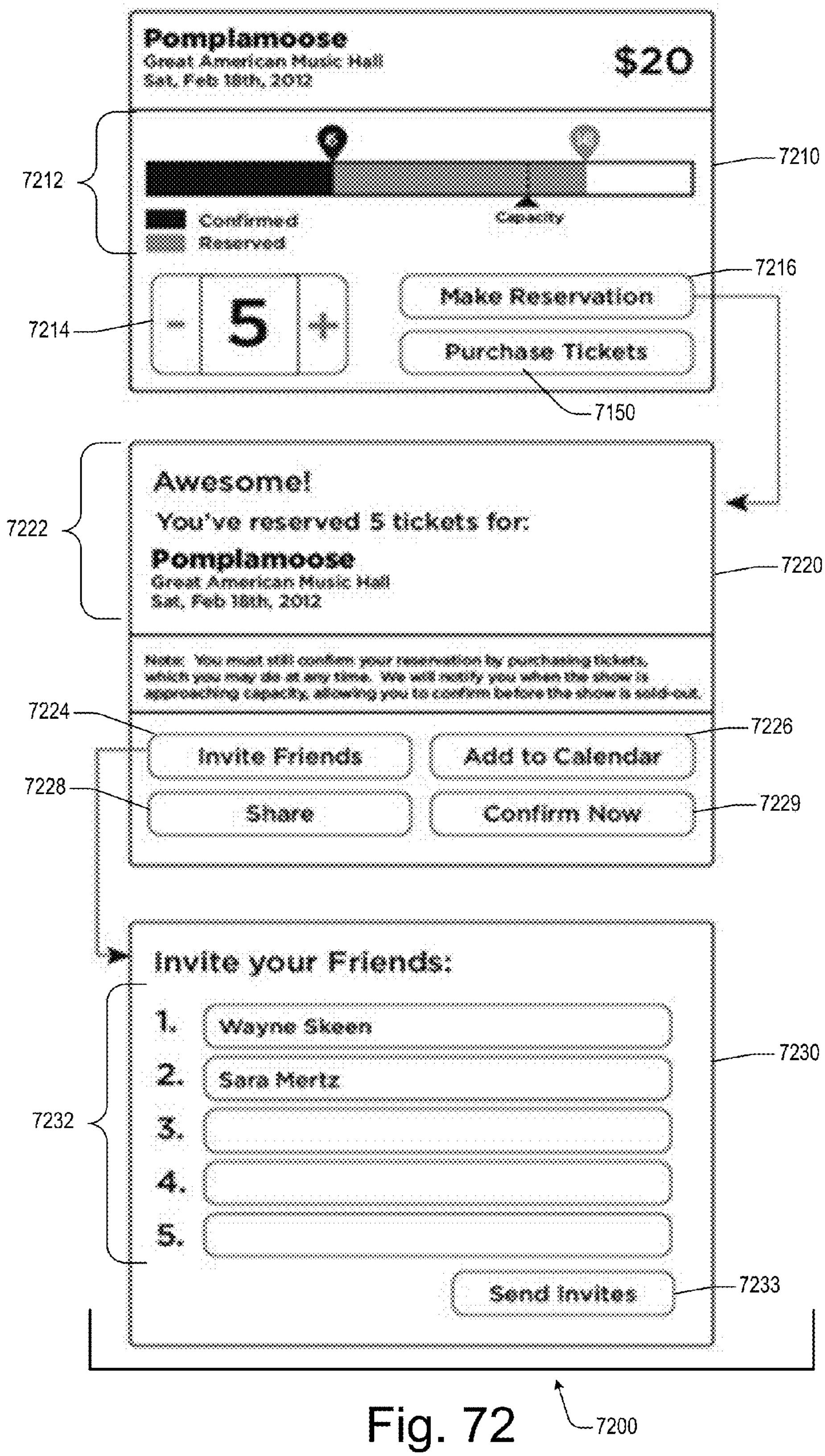

FIG. 72 shows example screenshots of a sequence of several Reservation GUIs which may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3rd party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining. The TRPS would multiply the venue's AUT by a "super percent" multiplier (e.g., 100+ %), thus creating the Reservation Allotment for the event. One reason for the super percentage multiplier is that not all reservations may be converted to a ticket purchase.

In at least one embodiment, once the Reservation Allotment is available in the TRPS, DeliRadio users may be able to view a Concert Page for a particular event (e.g., 7210). On the Concert Page, the user may view (e.g., in real-time) information (e.g., 7212) relating to the total number of tickets sold for that event, and the number of reservations available. DeliRadio users may be able to indicate the quantity of tickets to be purchased/reserved (e.g., via GUI portion 7214), and elect to purchase tickets 7150 for immediate ticket purchase and/or elect to make reservations 7216 (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make reservations.

As illustrated in the example embodiment of FIG. 72, at 7220 is assumed that the user has initiated the process of reserving tickets for a selected show at a specific venue. In at least one embodiment, the user may be presented with options for performing additional tasks such as, for example: invite friends 7224; add to event to calendar 7226; post or share information relating to the user's ticket reservation activities (e.g., in the DeliRadio System and/or at one or more social networks); confirm ticket reservations 7229; purchased the reserved tickets; make additional ticket reservations/purchases; pre-purchase items of merchandise available at the upcoming show; elect to receive updates relating to the selected show; elect to join the mailing list of the artist/band and/or venue which will be hosting the show; etc.

In at least one embodiment, when making the Reservation, the Reservation Host may be able to designate other DeliRadio users (Reservation Recipients) to receive an invitation to accept the Reservation (e.g., as shown at 7230). This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group. In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Various benefits/advantages of the MMMS System TRPS may include, for example: the limited quantity of Reservations; the limited time window in which to convert Reservations into Ticket Buys; and/or the socially broadcast nature of the Reservation (allowing one or more DeliRadio users to see the status of one or more Reservations for a given show at any time.

Figure 73:
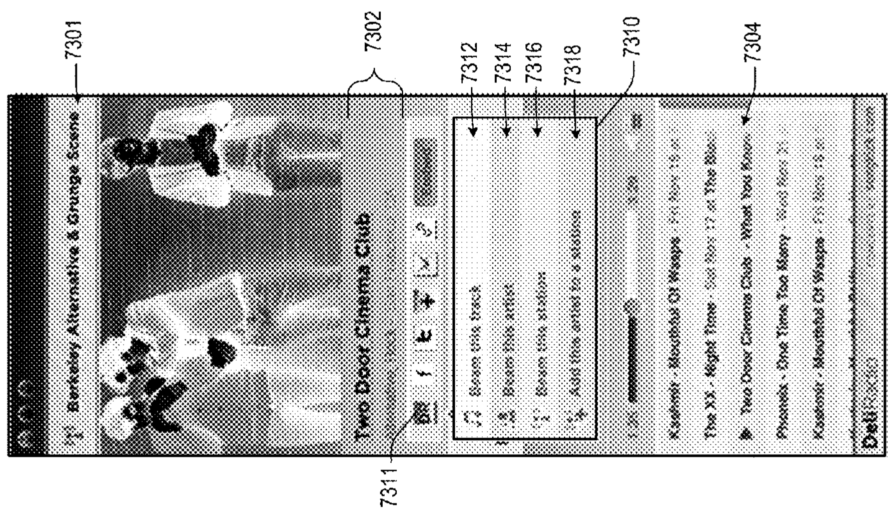

In the specific example embodiment of FIG. 73, it is assumed that the user has clicked the DeliRadio button 7311, thereby causing display of a GUI 7310 which presents the user with a list of options related to the currently selected track, artist, or station. In at least one embodiment, GUI 7310 may provide functionality for enabling the user to initiate or perform for one or more of the following activities (or combinations thereof): Beam this track 7312, which enables the user to pick one (or more) users from their DeliRadio System Friends and send a message with the currently playing track attached; Beam this artist 7314, which enables the user to pick one (or more) users from their DeliRadio System Friends and send a message with a link to the artist profile page for the currently selected artist attached; Beam this station 7316, which enables the user to pick one (or more) users from their DeliRadio System Friends and send a message with a link to the create station page for the currently selected station attached; Add this artist to a DeliRadio Station 7318, which enables the user to add the currently selected artist to a user-created station; etc.

Figure 74:
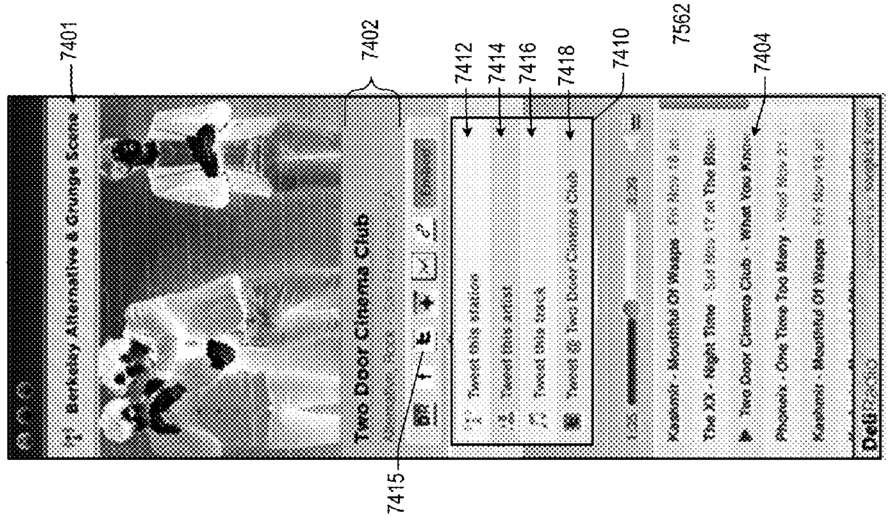

In the specific example embodiment of FIG. 74 it is assumed that the user has clicked the Twitter button 7415, thereby causing display of a Twitter Share GUI 7410 may provide functionality for enabling the user to initiate or perform for one or more of the following activities (or combinations thereof): Tweet this station; Tweet this artist; Tweet this track; Tweet @ the currently selected artist; etc.

Figure 75:
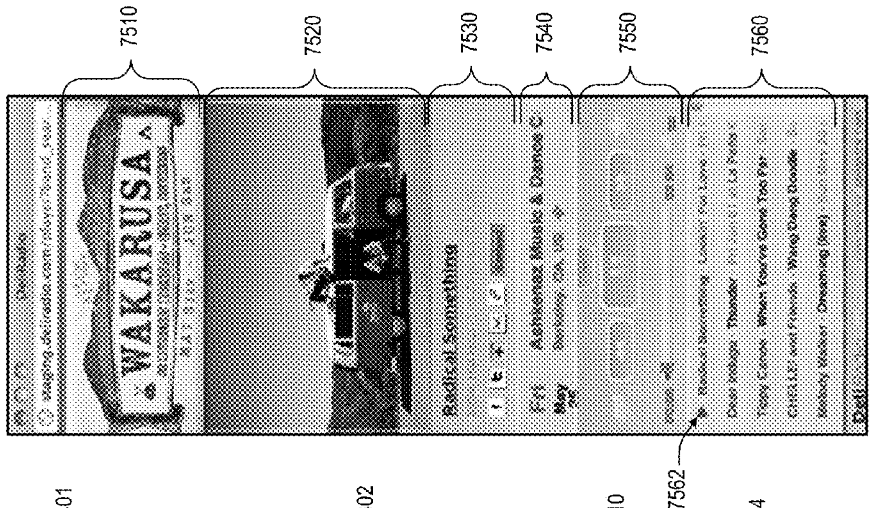

FIG. 75 shows an example screenshot of a Themeable/Brandable Player GUI 7500 in accordance with a specific embodiment. Graphics/Banners may be inserted in the DeliRadio Player GUI, with the graphic/banner including a clickable image associated with a URL designated either by DeliRadio System or a third party. In the specific example embodiment of FIG. 76, clicking on the "Wakarusa Festival" graphic 7510 could route a user to the Wakarusa website or any other website designated by DeliRadio System or the third party.

Figure 76:
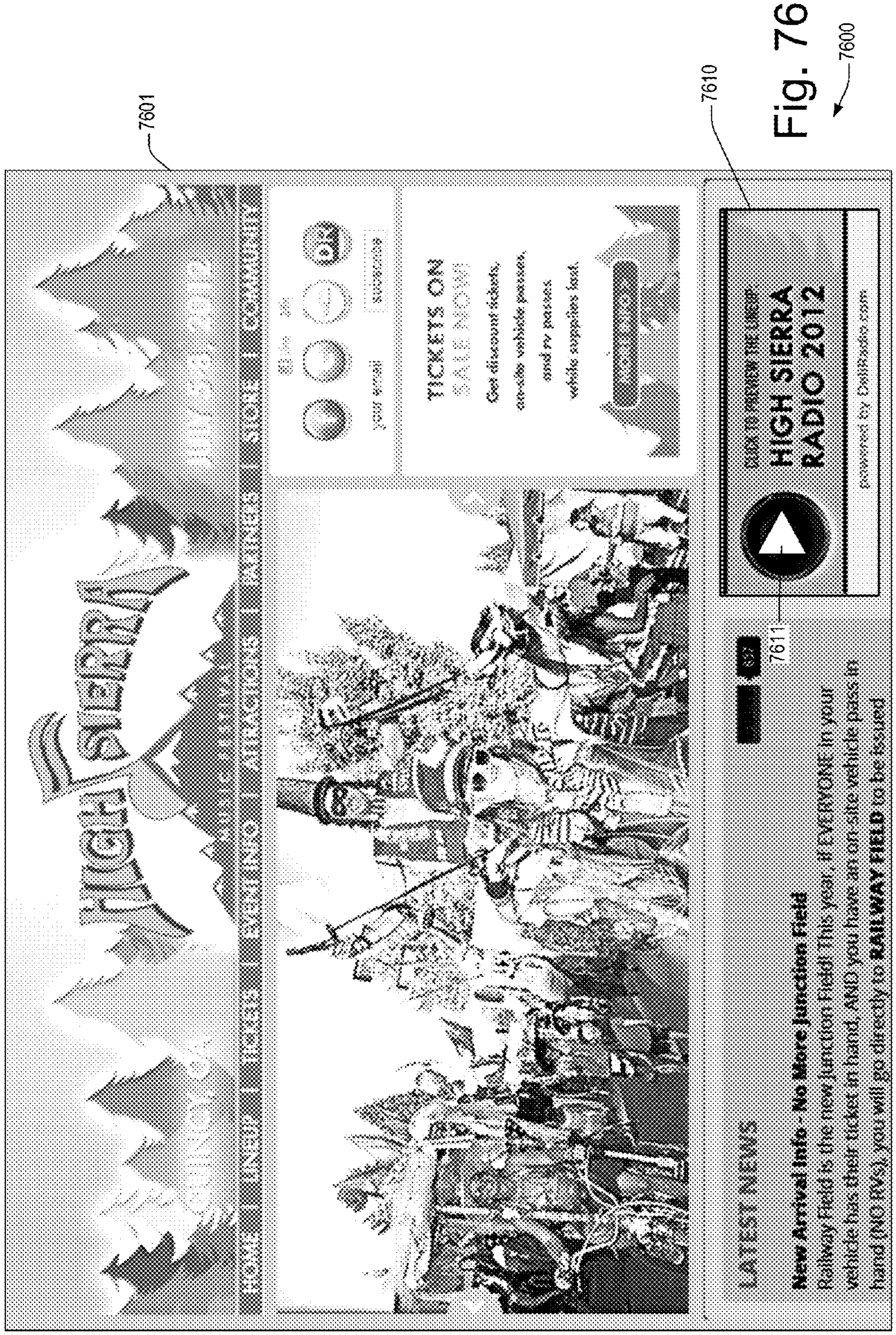

FIGS. 76 and 77 illustrate example screenshots of customizable DeliRadio Station Button GUIs and Player GUIs in accordance with a specific embodiment. In at least one embodiment, the DeliRadio System precludes functionality for providing customers. venues, and/or other third parties to embed customizable DeliRadio Station Button GUIs (e.g., 7610, FIG. 76) on external, third party websites. The customizable DeliRadio Station Button GUI may include a "Play" button (7611) for enabling visitors to the external website to play a streaming DeliRadio Station that has been created and customized for that particular website. For example, as illustrated in the example embodiment of FIG. 76, organizers of the High Sierra Music Festival may log create a customized "High Sierra Radio 2012" DeliRadio Station (e.g., via the DeliRadio System GUIs described herein) which plays songs from artists/bands that will be performing at the High Sierra Music Festival. In one embodiment, the DeliRadio System may generate and provide a set of code or script which may be used for embedding a customizable DeliRadio Station Button on one or more desired page(s) of the High Sierra Music Festival website. The embedded, customized "High Sierra Radio 2012" DeliRadio Station Button may be linked to the High Sierra Radio 2012 DeliRadio Station. Persons visiting the High Sierra Music Festival website may click on the "Play" button 7611 to listen to the High Sierra Radio 2012 DeliRadio Station, which, for example, may be streamed from the MMMS Server System. In at least one embodiment, the Custom Button Link does not stream the user's DeliRadio Station directly from a streaming widget on the third party site, but rather the Custom Button Link may be implemented as a graphic link of a "play button," specifically customized to resemble the look and feel of the third party site, and when clicked by a user, automatically opens a separate window of a customized DeliRadio Player GUI (e.g., 7700, FIG. 77) at the user's device. In at least one embodiment, the customized DeliRadio Player GUI facilitates playing of the customized DeliRadio Station at the user's device. Thus, for example, in one embodiment, the Custom Button Link serves as a "white label" solution for third parties with specific needs for a graphically customized streaming music player on their website.

Other Features/Benefits/Advantages

According to different embodiments, at least some MMMS System(s) may be configured, designed, and/or operable to provide, enable and/or facilitate one or more of the following features, functionalities, benefits and/or advantages (or combinations thereof):

Tour Dates

Automatically Sync Artist's Tour Dates—

One advantageous feature of the DeliRadio System is that the DeliRadio System does its best to keep an artist's tour dates updated automatically. DeliRadio System syncs with the events database Songkick to pull in an artist's existing dates, add new dates, and keep track of changes to this info as they occur. To get started, the artist visits their Band Profile Page and clicks the blue "Sync Now" button in the Songkick section. This may bring up a list of all artists at Songkick that match the artist's name. The artist then selects all the correct matches, and clicks "Save". If the artist then clicks over to their Tour Dates page, the artist finds that the DeliRadio System is now tracking all the artist's gigs automatically from that time on. (As long as Songkick knows about the artist's dates).

Custom Dates—

Artists may also add custom events on DeliRadio System, for things like House Concerts or informal events that Songkick may not know about. Artists can click the 'Add Another Tour Date' button and set the proper Date and Time. Then the artist can type the name of their Event or Venue into the 'Venue' box, and select 'Use Custom Venue'. Artists can also add notes about an event, and use the URL field to direct the artist's fans to a site where the fans may learn more about the artist's event.

DeliRadio Stations Overview

Dynamic vs. Static—

There are different types of DeliRadio Stations a user may create, each with unique properties and powers. Dynamic stations (the yellow ones) may include a constantly shifting set of bands, according to the parameters of the station. For instance, if a user uses the Filter Panel on the left side of the website to create a DeliRadio Station that plays 'Shows within 15 miles in the next 2 weeks' then that's a dynamic station, and may update over time. On the other hand, a user may create a 'Static Station' which contains a fixed set of bands that the user controls. Users can drag bands in and out of their static station to fine-tune exactly what the user wants to hear, or to promote a certain event or occasion.

Venue Stations—

Users may also create a dynamic station that plays music by artists with upcoming concerts at one or more venues that the user specifies. Users can hand pick their favorite local venues, add them to a DeliRadio Station and stream away, and then check out the tour dates in the music player and grab some tickets to see the user's favorite artists live.

Embedding and Sharing—

Users may also embed any DeliRadio Station on any website. Users can also share their favorite DeliRadio Stations right on Facebook with DeliRadio System's embedded player, or click the embed link at the top to get a code the user may paste into their website. Also built in to the player are easy social sharing options. By clicking the Facebook or Twitter icon, the user can post to their fans and followers, or get a permalink that the user may include in any other kind of communication.

Dynamic Stations

Continuously Updating Dynamic Stations—

When a user saves a DeliRadio Station as a Dynamic Station, what the user is really doing is saving their search criteria. These same criteria will be used anytime the user clicks "Play," but the resulting list of bands may update over time as more bands and shows become active in DeliRadio System. A good example of a Dynamic Station is "All Shows within 15 miles of San Francisco, this week." If the user clicks "Play" on this station today—it may play all bands with upcoming shows within 15 miles of San Francisco, as of this week. If the user clicks "Play" on this station 6 months from now—it may play rock bands with upcoming shows within 15 miles of San Francisco, as of that week 6 months from now. Dynamic Stations are always fresh and up-to-date. No matter when a user tunes in. No matter how the user arrives at the station—from a Twitter link, an email link, a Facebook post, a player embedded on a website, etc.

Filter Choices—

Users may set several types of filters for their Dynamic stations, including:

Show Filters:

- Upcoming shows near a Specific Location
- Geographic Radius for upcoming shows
- Time Frame for upcoming shows
- (optional Genre Filter)
  - Example Station: Indie Rock Shows within 50 miles of Chicago in the next 2 Weeks Band Hometown Filters:

- "Bands From" a Specific Hometown
- Geographic Radius for Hometowns
- (optional Genre Filter)
- Example Station: Hip Hop+Electronica Artists hailing from 15 miles around Madrid Venue Filters:

- Upcoming shows at Specific Venues
- Time Frame for upcoming shows at those Specific Venues
- (optional Genre Filter)
  - Example Station: Shows This Week at Slims+Cafe Du Nord+Great American Music Hall in San Francisco Genre/Tag Filter:

- A user can check the boxes for the genres of music and tags they want included in their search—from "A Cappella" to "World" and everything in between.
- A user can also check the boxes for the genres of music and tags they want to specifically exclude from their search.
- A registered user can save their genre and tag selections/exclusions as a "preset" to save time when they want to create another station using the same genre/tag filters.
- A user can add the Genre Filter to any of the above searches—or just do a Genre Filter by itself for a "location agnostic" Genre Station
  - Example Station Hardcore+Metal+Punk—Worldwide Custom Stations Custom Stations (or "Static Stations" as they are also known) are a powerful feature of DeliRadio System that allows a user specific control over the contents of the user's stations. A user may think of a Static Station as a playlist, but one that holds entire artists instead of specific tracks. Here's how a user can create their very own Custom Station: 1. Create a new, empty station by clicking the "+" at the top of the "My Stations" sidebar; 2. Drag & Drop in the artists that the user wants in that station; 3. That's it! The user can share and embed to their heart's content.

Record Label/Management/Booking Rosters—

Record labels, management companies and booking agencies may easily create a Static Station that just plays the artists on their roster (while displaying photos and upcoming tour dates of course!). Click here for "Ninth Street Opus Radio". Embedding the stations on a label's or management company's homepage or other media site is simple and easy.

Festival Lineup—

Festivals small and large may benefit from a DeliRadio Station. Same as labels, managers and bookers—just create a Static Station of the bands playing the festival, embed that puppy on the festival website and share via Facebook, Twitter and email blasts. Check out the 2012 Folk Alliance Radio Station.

Embed that Station

Any time a user is playing a DeliRadio Station, the user may use the 'Embed' button at the top to generate codes to display the player on their own website. A user may select size, color and content options, and then copy and paste the code into their website. In at least one embodiment, the DeliRadio System provides easy to use functionality for enabling an artist to display photos, videos, music, tour dates and social links anywhere the artist wants on any website or webpage managed by that artist. Once an artist embeds a DeliRadio Station playing their music on their website, it may automatically alert the artist's fans to the artist's upcoming concerts, promotes the artist's music sales and may be easily shared to social networks. DeliRadio System is actively developing lots of great new features and options for the embedded players.

Listen Locally

Live and Local—

The easiest thing to do is just listen in to who's playing nearby. A user can hear bands playing shows within a couple miles in the next couple weeks. Or tweak the parameters for something specific, like 'Hip Hop and Funk Shows this weekend'.

Hometown Radio—

Its also fun to listen to the artists that actually live near the user. The ones a user might meet at the corner store. By switching the left-hand dial to 'Bands From', a user can explore their surroundings like never before. Check out "Brooklyn Represents", playing a wide variety of artists that are based there.

Venue Stations—

Usually, booking agents and venue promoters are pretty reliable filters for the massive amount of music around all day. A user can listen in on the upcoming calendar for one specific venue, or tune in to a combo-station the user makes for themselves. How about "Mission Rock Radio," a collection of 13 great, small clubs in and around the Mission District in San Francisco?

Promote a Show

The best way for an artist to promote a show is to make a mini-station that only contains the 2 or 3 bands sharing the stage that night. An artist can create a Static Station by clicking the plus (+) icon at the top of the 'MyStations' sidebar to create a new (empty) station. Using the 'Artist Search' function, the artist then finds the bands that are playing the show, and then drags them into the artist's DeliRadio Station. Once the artist's DeliRadio Station is ready to go, they can then share the DeliRadio Station using the links at the top of the player. Posting to Facebook creates an embedded player than shows off all the bands, and provides ticket links to the fans of the artist who posted the station, and to fans of the other bands in the lineup. Tweeting the station is also very effective. Even if they're on the go, fans and followers may click on the station link on their phones and listen to the DeliRadio Station via the DeliRadio Mobile Applications. One of the advantageous things about DeliRadio System is that it promotes an artist's show even if the artist doesn't do anything! DeliRadio System's dynamic, location based radio may automatically deliver an artist's music direct to those listeners who have created their own personalized stations with similar tastes and genres.

Promotion Overview

DeliRadio System was designed with the Artist in mind Artists will find a new breed of promotional tools in DeliRadio System, with more arriving all the time. One of the basic concepts is that by tracking an artist's tour dates and automatically including an artist in the custom stations that listeners generate every day, DeliRadio System automatically puts the artist's music, dates, and ticket links in front of the people that care the most. Here are some of the many additional ways that an artist may use the tools that DeliRadio System provides to promote the artist and their tours:

Share—

First, the artist should share their DeliRadio Station(s) far and wide—Facebook, Twitter, email blasts, comment sections on articles about the artist, etc. Basically—any time an artist shares their music or promotes a show, they can use the DeliRadio System player.

Embed—

Second, the artist should embed their DeliRadio Station(s) on their website. There's no other streaming player that also promotes an artist's shows & helps the artist sell tickets. And DeliRadio System has a dozen more features on the way that may help an artist effortlessly power their online musical presence.

Cross-Promote—

Third, it's easy to arrange cross-promotions with like-minded bands on DeliRadio System. Artists can create a custom station with other artists, and then have all the artists in that DeliRadio Station post the DeliRadio Station to their social networks.

Connect—

Fourth, by "friending" people on the DeliRadio Mobile Application, artists can share music that way. Encourage users to pass it on!

Sell More Tickets

The Basics: On DeliRadio System, an artist's show dates get just as much love as their music. DeliRadio System auto-imports an artist's dates daily from Songkick.com—so an artist should make sure everything's up to date on Songkick. And any dates in the DeliRadio System get fed right into that artist's DeliRadio Station—with a link to buy tickets! Anyone listening to that artist can see that artist's shows and can buy tickets with just a couple clicks. Click the plus (+) in the MyStations area to create a new (empty) station. Using the 'Artist Search' function, find the bands that are playing the show, and then drag them into the DeliRadio Station. Once the DeliRadio Station is ready to go, hit play and then share that the DeliRadio Station with the Facebook link at the top of the player. The artist can also tweet the station on Twitter and ask their followers to re-tweet.

Sell Artist's Music

In addition to iTunes and Amazon download links—DeliRadio System gives artists the tools to sell downloads directly to fans. In one embodiment, all an artist needs is a PayPal account. In one embodiment, a percentage of download revenue goes straight to the artist's PayPal account. In some embodiments, DeliRadio System may collect a percentage of download revenue. Artists have the option to sell their music for less, while putting more in their own pocket. When logged in as an artist at the DeliRadio System: 1. Click the "My Band" tab; 2. Click the "Profile" tab; 3. Enter the artist's PayPal email address; 4. Click the "Music" tab; 5. In the "Albums" column on the right—click "+" to create a new album—or click the "blue pen" to edit an existing album; 6. When the album window opens—check the box to "Allow Download of Album"; 7. Choose: "Free Download," "Pay What You Want" (artist sets the minimum price) or "Fixed Price" (artist sets the fixed price).

Connect and Share

Once a user has installed the DeliRadio Mobile Applications, they should first log into their DeliRadio System account. Head to the 'Friends' section of the app, and then click 'Find Friends'. From here, a user may cross-check their address book against the database of DeliRadio System users to see if that user's friends are already on, or do the same comparison against that user's Facebook friend list. If the user knows their friends DeliRadio System username, they may also search for them directly. As soon as a user's friends have accepted their requests to link up on DeliRadio System, the user will be ready to beam music back and forth from phone to phone. From the music player, a user can simply tap the 'Share' icon and select whether they would like to share the Track, Album, or Station. Then the user gets a choice of posting to Twitter or Facebook, or beaming it directly to their friends on DeliRadio System with a personalized message. Once a user beams a track, their friend may be notified, and may listen to what the user shared with a single click. No matter where they are. When a user receives a shared item from a friend, the user may see a red badge on the DeliRadio System app icon, showing the number of new, "unread" items the user has. The badge number may also include any pending friend requests the user has received. Users may find all their incoming shared items under the 'My DeliRadio System.' They may be marked orange in the list until the user plays them.

For Live Music Fans

Get Tuned In. DeliRadio System allows a user to listen in to their local music scene any night of the week.

Live Stations—

DeliRadio System provides an awesome way to search & preview a user's musical surroundings on any given night. Crunch a DeliRadio Station with "All Pop and Punk within 5 Miles tonight" or "Reggae Jazz Fusion in the next two weeks", or maybe just "Electronic bands from Baltimore." The user can simply use the DeliRadio System filter panel to dial in what they're looking for, then crunch that station. Users may browse the results, or just click play to hear a DeliRadio Station with all the bands.

Venue Stations—

Booking agents & venue promoters are actually pretty reliable filters for the massive amount of music around all day. Listen in on the upcoming calendar for one specific venue, or tune in to a combo-station the user makes themselves.

Festival Stations—

So many names on the festival rosters, how can a user know who to seek out once they're at the festival? Users can browse through and put together their own personal Coachella 2012 Highlights Radio. And take it on the road with them.

For Venues & Festivals

Custom Venue/Festival Stations—

DeliRadio System lets venues and festivals easily generate an embeddable radio station that only plays that venue's or festival's upcoming calendar, with no extra work for the venue or festival. It couldn't be any easier; DeliRadio System and the bands have already done the work for the venue or festival. Venue owners can go to DeliRadio System, type in their venue and click crunch! Or get more fine-tuned by adding a genre filter.

Festival/Venue Dashboard—

DeliRadio System has also created a dashboard for Venues to help venues get the most out of the promotional tools that DeliRadio System offers. Head over to venues.DeliRadio System.com to request an account. DeliRadio System will get a venue set up and provide additional tips and tools to manage that venue's Venue Station. Venues can also see how much of their current lineup is represented on DeliRadio System, reach out to booked bands not yet in DeliRadio System, and see how the venue may embed DeliRadio System on their own website.

How Else May Artists Use DeliRadio System

- Artist can use DeliRadio System to sell music on iTunes and Amazon.
- Artist can use DeliRadio System to sell music via their PayPal account.
- Artist can use DeliRadio System as an Electronic Press Kit for promoters and press outlets. An artist's DeliRadio System Profile is a good-looking website that contains all the artist's music, photos, videos, tour dates, bio, etc. EPKs usually don't have tour dates, so the artist has an advantage here.
- Artists can embed their Artist Station, Cross-Promo Stations and Tour Stations right on their website. Not only does it stream the artist's music, it also shows their tour dates with links to buy tickets plus the artist's photos.
- Artists can also use DeliRadio System to find co-bill bands and venues in a city the artist wants to play in. Just do a "shows near" search OR a "bands from" search OR a "venue" search or that city.

Functionality Festival Promoters

Embedded Festival Radio—

When a festival is ready to announce their lineup, they can do it in style with their own customizable embeddable Festival Station. They may place this wherever they like to show off all the awesome bands at their festival.

Labels, MGRS & Bookers

DeliRadio System offers a variety of solutions for labels, managers and bookers, looking to promote and distribute their artist's music and tour dates. For starters, DeliRadio System provides an easy way for artists to sell digital downloads via PayPal. Customers buy the music downloads directly from the artist or label. In one embodiment, the DeliRadio System may collect a percentage of the revenue from the artist's music sales. Whether a label's, manager's or booker's bands are touring or not, DeliRadio System helps promote their music catalog automatically. Once bands are in DeliRadio System, they may automatically appear whenever they meet the criteria for a DeliRadio Station, like: "Live in Austin: Next Two Weeks" or "Bands from Brooklyn". In at least one embodiment, the DeliRadio System is also designed from the ground up to help promote the shows of an artist on the roster of a label, manager or booking agent. First, any time DeliRadio System is playing an artist, their upcoming tour dates (and ticket purchase links!) are displayed right on the player. Second, DeliRadio System displays the most relevant upcoming show to the listener: Not necessarily the very next show, but the show that's happening CLOSEST to where the user is currently listening. Plus DeliRadio System has built in special tools for labels looking to easily manage a larger number of artist accounts on DeliRadio System. Labels may create stations that only play artists on their label, which may be easily embedded on their own website, with a variety of options and customizations. DeliRadio System recognizes the important place that Labels, Managers and Bookers play in the music ecosystem, and are constantly working on new tools and technology to enhance & simplify the process of connecting the audience to the artists they want to support.

Neighborhood DJS

Music bloggers and online versions of city news weeklies can put together a custom station with their local picks and then broadcast it to their listeners and friends online. They can tweet a show or a track, or embed their entire station on their blog or weekly. DeliRadio System has got a lot of great ways to spread the word about that awesome new band and let them know about the show right down the road. In addition, DeliRadio System may help bloggers, weekly editors and online tastemakers listen around and find the next great thing to pass on to their listeners. Crunch a DeliRadio Station using the 'Bands From' option, (instead of 'Shows Near') and get some of the newer, smaller or otherwise non-touring hometown acts that may rock just as hard as the rest. They can also add a genre filter to their station to make it more relevant to their tastes. This does of course may require that the bands may need to be in DeliRadio System to participate, but usually it's easy to convince them to spend 20 minutes setting up their profile in exchange for the awesome promotion, that keeps working for them with little ongoing effort.

Fine-Tune Permissions

Once an artist is done uploading their music, they may adjust how they would like at least one track to be played within the DeliRadio System Universe. By default, tracks that an artist uploads may and may be played on any station that contains that artist. Artists have several options for what happens after this. For example, tracks marked with the Green Music Note may be playable on DeliRadio System. If the artist would like to upload music for purchased digital download only, deselect this choice, thereby disabling the track from DeliRadio System. It may still be available as part of album purchases. Tracks marked with the 'Singles' icon may be given preferential treatment on DeliRadio Stations. The DeliRadio System will play these tracks first. When the DeliRadio System runs out of 'Singles', the DeliRadio System will start playing the rest of the artist's enabled music. Tracks marked with the 'Free Download' icon may be made freely available on the artist's Band Profile page.

Official DeliRadio Stations

Each DeliRadio System artist has one special station, displayed in green in their My Stations sidebar. This is that artist's official DeliRadio Station, and fans of the artist may play this station from the artist's Profile Page and from the DeliRadio Mobile Application. It's a great way to share some new music with the artist's fans and promote the artist's latest shows and tracks as well. If bands agree to work together in this way, it may be a powerful cross-promotional tool where everybody wins. To add bands to an artist's official station, an artist can simply grab a band from the search result and drop it on station. Artists may click on the station in the sidebar to edit/delete the bands. Tracks may be played in a random order from all the bands in the artist's official DeliRadio Station.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating electronic commerce via a computer network, the method comprising causing at least one processor to execute a plurality of instructions for:

determining a first set of filter criteria for use in performing a database search for music-related information matching the first set of filter criteria, the first set of filter criteria including geolocation filter criteria indicating a first geographic location, the first set of filter criteria further including geographic proximity criteria indicating a first geographic proximity parameter;

identifying, using the geolocation filter criteria and geographic proximity criteria, a first set of artists or bands ("artists/bands") that are scheduled to perform at least one live performance within a first geographic region, wherein the first geographic region includes the first geographic location and adjacent geographic locations which are within a specified proximity to the first geographic location, as defined by the first geographic proximity parameter;

identifying, using the identified first set of artists or bands, a filtered set of songs or tracks ("songs/tracks") which are performed by or recorded by at least one of the artists/bands of the first set of artists/bands;

dynamically creating, using the filtered set of songs/tracks, a filtered streaming media playlist, wherein the filtered streaming media playlist includes a first portion of selected songs/tracks from the identified filtered set of songs/tracks; and generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected songs/tracks associated with the streaming media playlist.

2. The computer implemented method of claim 1 further comprising causing the at least one processor to execute additional instructions for:

streaming songs/tracks of the filtered set of songs/tracks to the end user's electronic device.

3. The computer implemented method of claim 1 further comprising causing the at least one processor to execute additional instructions for:

automatically and dynamically determining the geolocation filter criteria based on the end user's current geographic location.

4. The computer implemented method of claim 1 further comprising causing the at least one processor to execute additional instructions for:

receiving a first set of input from the end user, the first set of input including the geolocation filter criteria specifying the first geographic location.

5. The computer implemented method of claim 1 further comprising causing the at least one processor to execute additional instructions for:

receiving a first set of input from the end user, the first set of input including the geolocation filter criteria specifying the first geographic location, the first set of input further including the geographic proximity criteria specifying the first geographic proximity parameter.

6. The computer implemented method of claim 1 further comprising causing the at least one processor to execute additional instructions for:

automatically identifying a current geographic location of the end user's electronic device;

using the identified geographic location of the end user's electronic device as the geolocation filter criteria; and wherein the identifying of the first set of artists/bands includes identifying, using the identified geographic location of the end user's electronic device, the first set of artists or bands ("artists/bands") that are scheduled to perform at least one live music performance within the first geographic region, wherein the first geographic region includes the identified geographic location of the end user's electronic device.

7. The computer implemented method of claim 1 further comprising causing the at least one processor to execute additional instructions for:

automatically identifying a first metropolitan region associated with a current geographic location of the end user's electronic device; and using the identified first metropolitan region as the geolocation filter criteria; and wherein the identifying of the first set of artists/bands includes identifying, using the identified first metropolitan region, the first set of artists or bands ("artists/bands") that are scheduled to perform at least one live music performance within the first geographic region, wherein the first geographic region includes the first metropolitan region.

8. The computer implemented method of claim 1 further comprising causing the at least one processor to execute additional instructions for:

receiving a first set of input from the end user, the first set of input identifying a first metropolitan region as the geolocation filter criteria;

using the identified first metropolitan region as the geolocation filter criteria; and wherein the identifying of the first set of artists/bands includes identifying, using the identified first metropolitan region, the first set of artists or bands ("artists/bands") that are scheduled to perform at least one live music performance within the first geographic region, wherein the first geographic region includes the first metropolitan region.

9. The computer implemented method of claim 1 further comprising causing the at least one processor to execute additional instructions for:

receiving a first set of input from the end user, the first set of input including first venue filter criteria identifying a first venue; and wherein the identifying of the first set of artists/bands includes identifying, using the geolocation filter criteria and the venue filter criteria, the first set of artists/bands that are scheduled to perform at least one live performance at the identified first venue.

10. The computer implemented method of claim 1 further comprising causing the at least one processor to execute additional instructions for:

receiving a first set of input from the end user, the first set of input including first date range filter criteria identifying a first date range; and wherein the identifying of the first set of artists/bands includes identifying, using the geolocation filter criteria and the date range criteria, the first set of artists/bands that are scheduled to perform at least one live performance within the first geographic region and within the identified first date range.

11. The computer implemented method of claim 1 further comprising causing the at least one processor to execute additional instructions for:

receiving a first set of input from the end user, the first set of input including first date range filter criteria identifying a first date range;

automatically identifying a current geographic location of the end user's electronic device;

using the identified geographic location of the end user's electronic device as the geolocation filter criteria; and wherein the identifying of the first set of artists/bands includes identifying, using the geolocation filter criteria and the date range filter criteria, the first set of artists or bands ("artists/bands") that are scheduled to perform at least one live music performance within the first geographic region and within the identified first date range, wherein the first geographic region includes the identified geographic location of the end user's electronic device.

12. A computer implemented method for facilitating electronic commerce via a computer network, the method comprising causing at least one processor to execute a plurality of instructions for:

identifying a first streaming media playlist, the first streaming media playlist including a first set of songs or tracks ("songs/tracks"), the first set of songs/tracks including a first music track which is performed by or recorded by a first artist or band ("artist/band");

determining a first artist/band identifier for identifying the first artist/band;

dynamically determining user geolocation criteria for identifying a first geographic location of a first end user;

determining, using the user geolocation criteria and the first artist/band identifier, if the first artist/band is scheduled to perform at least one live performance within a first geographic region, wherein the first geographic region includes the first geographic location and adjacent geographic locations which are within a first proximity to the first geographic location;

if it is determined that the first artist/band is scheduled to perform at least one live performance within the first geographic region, causing event information relating to the at least one live performance to be presented to the first end user via a first end user's device; and generating, using information relating to the first streaming media playlist, a first set of instructions for causing a streaming media graphical user interface ("Streaming Media GUI") to be displayed at the first end user's device, wherein the first set of instructions include instructions for configuring the Streaming Media GUI to enable an end user to initiate, via interaction with the Streaming Media GUI, a streamed playback of one or more of the first set of songs/tracks associated with the first streaming media playlist.

13. The computer implemented method of claim 12, wherein the event information includes venue information relating to a first venue associated with a first live performance of the at least one live performance.

14. The computer implemented method of claim 12, wherein the event information includes:

first event information including venue information relating to a first venue associated with a first live performance of the at least one live performance; and second event information including venue information relating to a second venue associated with a second live performance of the at least one live performance.

15. The computer implemented method of claim 12 further comprising causing the at least one processor to execute additional instructions for:

streaming at least one music track from the first streaming media playlist to the first end user's device.

16. A computer implemented system for facilitating electronic commerce via a computer network, the system comprising at least one processor operable to execute a plurality of instructions for:

determining a first set of filter criteria for use in performing a database search for music-related information matching the first set of filter criteria, the first set of filter criteria including geolocation filter criteria indicating a first geographic location, the first set of filter criteria further including geographic proximity criteria indicating a first geographic proximity parameter;

identifying, using the geolocation filter criteria and geographic proximity criteria, a first set of artists or bands ("artists/bands") that are scheduled to perform at least one live performance within a first geographic region, wherein the first geographic region includes the first geographic location and adjacent geographic locations which are within a specified proximity to the first geographic location, as defined by the first geographic proximity parameter;

identifying, using the identified first set of artists or bands, a filtered set of songs or tracks ("songs/tracks") which are performed by or recorded by at least one of the artists/bands of the first set of artists/bands;

dynamically creating, using the filtered set of songs/tracks, a filtered streaming media playlist, wherein the filtered streaming media playlist includes a first portion of selected songs/tracks from the identified filtered set of songs/tracks; and generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected songs/tracks associated with the streaming media playlist.

* * * * *